United States Patent [19]

Keele et al.

[11] Patent Number: 5,455,926
[45] Date of Patent: Oct. 3, 1995

[54] VIRTUAL ADDRESSING OF OPTICAL STORAGE MEDIA AS MAGNETIC TAPE EQUIVALENTS

[75] Inventors: Richard V. Keele; Craig D. Mautner, both of San Diego; Tracy J. Thorpe, Encinitas; Sidney R. Thompson, San Diego; Michael C. Goodsell, Chula Vista; Philip J. Erdelsky, San Diego, all of Calif.

[73] Assignee: Data/Ware Development, Inc., San Diego, Calif.

[21] Appl. No.: 265,514

[22] Filed: Jun. 20, 1994

Related U.S. Application Data

[63] Continuation of Ser. No. 633,265, Dec. 19, 1990, abandoned, which is a continuation of Ser. No. 177,761, Apr. 5, 1988, abandoned.

[51] Int. Cl.[6] .................................................. G06F 12/00
[52] U.S. Cl. ........................ 395/404; 395/439; 395/412; 364/952.31; 364/952.6; 364/959.3; 364/961.4; 364/961.2; 364/966.4; 364/DIG. 2
[58] Field of Search ....................... 364/DIG. 1, DIG. 2; 395/400, 425, 500

[56] References Cited

U.S. PATENT DOCUMENTS

| | | | |
|---|---|---|---|
| 4,465,901 | 8/1984 | Best | 178/22.08 |
| 4,682,305 | 7/1987 | Ishikawa | 364/900 |
| 4,727,512 | 2/1988 | Birkner et al. | 364/900 |
| 4,766,581 | 8/1988 | Korn et al. | 369/30 |
| 4,775,932 | 10/1988 | Oxley et al. | 364/200 |
| 4,775,969 | 10/1988 | Osterlund | 369/53 |
| 4,812,981 | 3/1989 | Chan et al. | 364/200 |
| 4,843,544 | 6/1989 | DuLac et al. | 364/200 |
| 4,947,367 | 8/1990 | Chang et al. | 364/900 |
| 4,953,122 | 8/1990 | Williams | 364/900 |
| 5,119,291 | 6/1992 | Flannagan et al. | 395/275 |
| 5,247,646 | 9/1993 | Osterlund et al. | 395/425 |

Primary Examiner—Thomas G. Black
Assistant Examiner—Maria N. Von Buhr
Attorney, Agent, or Firm—William C. Fuess

[57] ABSTRACT

An optical disk storage system emulates a magnetic tape subsystem by virtual addressing of data recorded on write once optical disk media having a predetermined group of available sectors for rewriting a disk ID, a predetermined plurality of bands of available sectors for rewriting a virtual tape directory to virtual tape VSNs, and, available sectors for rewriting virtual tape maps and rewriting user records, the tape maps have data portions for simulating tape marks and interblock gap and for addressing blocks of data within the virtual tapes, the virtual tape directory has pointers for pointing to tape maps, and the system rewrites the tape directory, tape maps and user records so as to function as a rewritable magnetic tape.

41 Claims, 15 Drawing Sheets

VIRTUAL ADDRESSING OF OPTICAL STORAGE MEDIA AS MAGNETIC TAPE EQUIVALENTS

This is a continuation of application Ser. No. 07/633,265 filed Dec. 19, 1990, now abandoned, which application is itself a continuation of application Ser. No. 07/177,761 filed Apr. 5, 1988, now abandoned.

TABLE OF CONTENTS

CAPTION PAGE
TITLE PAGE
TABLE OF CONTENTS
  REFERENCE DESIGNATIONS
  ACRONYMS
SPECIFICATION
  REFERENCE TO RELATED APPLICATIONS
  FIELD OF INVENTION
  BACKGROUND OF THE INVENTION
  BRIEF DESCRIPTION OF THE DRAWINGS
  SUMMARY OF THE INVENTION
    System Overview
    Emulation Overview
  DETAILED DESCRIPTION OF THE PREFERRED EMBODIMENT
    System Configuration
      Controller
      Controller Chassis
      Optical Disks
      Optical Disk Drives
      Operator Consoles
      Jukebox
      Power Supply
      Single Board Computer
      VMEGate
      Channel Interface Board
      SCSI Board
      Cache Memory
      Serial I/O
      Magnetic Media Controller
      Hard Disk Drive
      Floppy Disk Drive
    Operation
      Operation Modes
      Error Handling
      Emulation
      Optical Disk Layout
        Disk ID Sector Format Table
        Tape Directory Format Table
        Tape Map Format Table
        Tape Map Data Format Table
        Data Record Format Table
      Disk Directory
        Disk Table C Definitions/Structures Table
        Starting Block Computation Table
        Disk Entry C Language Table
    Operator Interface
      Simulated Panels
      Normal or Test Operations
      Online or Offline Operations
      Changing Control Unit Channel Address
      Rewinding a Virtual Tape
      Unloading a Virtual Tape
      Placing a Drive in READY Position
      Creating, Deleting and Editing Virtual Tapes
      Mounting a Virtual Tape
      Loading and Ejecting a Disk
      Accessing the Disk Directory
      Inserting and Removing Disks
      Write-Protecting a Disk
      Loading the Microprogram
      Removing or Restoring Power
    VMEGate Description
      Architecture
      Installation
        VME bus Memory Map Table
      I/O Channel Connection
      Microcode
      Channel Data Line Definitions
      Interface Sequences
      SBC Software Interface
      Writable Control Store Memory
      Registers
        VMEGate SBC/VME Address Table
      Command Validator Memory
    SBC Software
    Buffers
      Jukebox Command Buffers
      Channel Address Buffers
      SCSI Block Buffers
      Data Buffers
      Interrupt Communication Buffer
      Initialization Buffer
      Command Buffers
    VMEGate Initialization
    VMEGate Commands
    Channel Commands

REFERENCE DESIGNATIONS

10 Mainframe Optical Storage Transport (MOST)
12 IBM Mainframe Host Computer
14 MOST Controller
16 Optical Disk Drives
17 SCSI Interface Port
17a Drive SCSI Interface Bus
17b SBC SCSI Interface Bus
18 Jukebox
19 Jukebox RS 232 Port
20 Optical Disk
22 Power Supply
23a +5 VDC Power Line
23b +12 VDC Power Line
23c −12 VDC Power Line
24 Primary Operator Console
25 Primary Operator Console RS232 Port
26 Remote Operator Console
27 Remote Operator Console RS232 Port
28 Printer
29 Printer Port
30 Phone Instrument
31 Phone line
32 Cabinet
34 I/O Channel
34a Tag Port
34b Bus Port 34ai Tag In lines
34ao Tag Out lines
34bi Bus In lines
34bo Bus Out lines
36 VMEGate
38 Cache
40 Single Board Computer (SBC)
42 Small Computer System Interface (SCSI) Board
44 Serial I/O Board
45a&b Serial I/O to RS232 Port cables
46 VME Bus
46a VME Bus Address lines
46b VME Bus Data lines
46c VME Bus Control lines
48 Magnetic Media Handler
50 Hard Disk Drive
52 Floppy Disk Drive
54 SBC I/O Board
56 Modem
58 SBC/Modem lines
60 SBC/Modem lines
62 Channel I/O Board
64 Channel Interface Board (CIB)
66 VMEGate to Channel I/O Board Cables
68 Channel I/O Board to CIB Cables
70 Jukebox I/O Board
72 Serial I/O to Jukebox I/O Cable
78 Clock Generator
80 Writable Control Store (WCS)
82 Address Buffer
84 Sequencer Multiplexer
86 Sequencer
88 Microword Transceivers
90 Data Out Register
92 Data In Register
94 Command Register
96 Map Port
98 16 Bit Test Multiplexer
100 Test Multiplexer Register
102 Swap Register
104 Pipeline Register
106 Processor Destination Decode
108 Processor Special Function Decode
110 Processor Source Decode
112 Literal Buffer
114 Port Multiplexer
116 16 Bit Slice Arithmetic Logic Unit (ALU)
118 Ram Address Register
120 Scratch Pad Memory
122 Scratch Pad Data Memory
124 Command Multiplexer
126 Command Validator Memory (CVM)
128 Command Buffer
130 Address Transceiver
132 23 Bit Address Counter
134 Address Modifier Register
136 Start Status Register
138 Interrupt Vector Register
140 Data Transceiver
142 Data In Port FIFO
144 Source Buffer
146 VME Data Buffer
148 VME Bus Control Register
150 Interface Destination Decode
152 Interface Special Function Decode
154 Interface Source Decode
156 Bus In Register
158 Control Registers
160 18 Bit VME Word Counter
162 17 Bit Channel Byte Counter
164 Internal Status Register
166 Bus Out Register
168 Data Out Port FIFO
170 Bus Out Buffer
172 Initial Selection Channel Reset Circuit
174 Tag Out Buffer
176 Automated Data Transfer Circuit
178 Bus In Buffer
180 Tag Out Register
182 Tag In Register
200–222 VMEGate Microcode
202–212 Microcode Idle Loop
200 Initialization
202 CMD Saved Determination
204 SBC CMD Determination
206 Offline Determination
208 Initial Selection Determination
210 Status Pending Determination
212 Channel Reset Determination
214 UnSave IP CMD Processing
216 SBC CMD Processing
218 Channel CMD Processing
220 Pending Status Processing
222 Channel Reset Processing
300 Disk ID
302 ID Bytes
304 Disk Type
306 Disk Label
308 Reserved
310 Disk ID LBA Space
312 LBA 0
314 LBA 32
316 Tape Directory LBA Space
318 Tape Directory
320 Tape Directory Band LBA Space
322 ID Byte
324 abc Tape Data
326 Continuation Byte Pointer
328 ID Bytes
330 VSN
332 Sector Count
334 Tape Map Pointer

336 Tape Length
338 Pool Type/Write Protect
340 Tape Map
342 ID Bytes
344 Sector Count
346 Volume Serial Number (VSN)
348*abc* Map Data
350 Type Identifier
352 Accumulative Length
354 Block Length
356 Record Pointer
358 Record Offset
360 Offset
362 User Record
400–416 Boot Module
420–448 VMEGate Interrupt Handler Module (VIHM)
450–472 Jukebox Interrupt Handler Module (JIHM)
480–516 SCSI Interrupt Handler Module (SIHM)
520–546 100 Microsecond Interrupt Handler Module (OIHM)
550–586 Quarter Second Interrupt Handler Module (QIHM)
600–660 Keypress Module

ACRONYMS

BOT Beginning of Tape
CAB Channel Address Buffer
CMD Command
CIB Channel Interface Board
CCW Channel Control Word
CPU Central Processing Unit
CVM Command Validator Memory
DASD Direct Access Storage Device
ECC Error Correcting Code
EOT End of Tape
FIFO First In First Out
FBA Fixed Block Architecture
I/O Input-Output
IBG Interblock Gap
IBM International Business Machines Inc.
ICB Interrupt Communication Buffer
JCB Jukebox Command Buffer
JIHM Jukebox Interrupt Handler Module
LBA Logical Block Address
MOST Mainframe Optical Storage Transport
OIHM One-Hundred Millisecond Handler Module
QIHM Quarter Second Interrupt Handler Module
SBB SCSI Block Buffer
SCSI Small Computer System Interface
SIHM SCSI Interrupt Handler Module
TM Tape Mark
VIHM VMEGate Interrupt Handler Module
VSN Volume and Serial Number
WORM Write Once Read Many

SPECIFICATION

Reference to Related Applications

The present patent application is one of four related patent applications filed on the same date and having nearly the same specification and drawings. U.S. patent application Ser. No. 07/177,491 was filed Apr. 5 1988, by Keele et al, and entitled OPTICAL DISK SYSTEM EMULATING MAGNETIC TAPE UNITS, now abandoned, which was continued into application Ser. No. 07/678,547 filed Mar. 28 1991, now abandoned, which was continued into application Ser. No. 08/270,109, still pending. U.S. patent application Ser. No. 07/177,943, was filed Apr. 5 1988, by Keele et al, and entitled DYNAMIC DRIVE ALLOCATION OF OPTICAL STORAGE DRIVES AS MAGNETIC TAPE EQUIVALENTS, now abandoned. U.S. patent application Ser. No. 07/177,926 was filed Apr. 5 1988, by Keele et al, and entitled ORGANIZATION OF DATA STORAGE ON OPTICAL MEDIA TO PROVIDE MAGNETIC TAPE EQUIVALENTS, now abandoned.

FIELD OF INVENTION

The present invention relates to mass storage of computer systems. Particularly, the present invention relates to an optical disk system including a plurality of optical disk drives in a jukebox to emulate the function of a plurality of magnetic tape drives. The optical disk system includes various features such as virtual addressing and dynamic drive allocation.

BACKGROUND OF THE INVENTION

The storage systems of International Business Machines Inc. (IBM) and its plug compatible imitators are first described along with IBM's overall storage strategy. The place for Write Once Read Many (WORM) optical storage of the present invention is then identified and characterized with possible optical implementations including benefits and disadvantages. IBM mainframe computers have an Input/Output Channel, referred to at times as the I/O Channel or simply the Channel, to which the peripheral devices attach for communication with the computer. The attached peripheral typically include high capacity magnetic tape and disk drives.

The assignee of the present invention, (Data/Ware Development Inc. San Diego Calif.), first offered an I/O Channel Tester as an IBM channel attached product. The I/O Channel Tester was needed to simulate peripherals in order to debug and test IBM I/O channels. The I/O Channel Tester is unique in that it forces errors on command. The I/O Channel Tester is a generic control unit emulator. The I/O Channel Tester was designed for the plug compatible mainframe manufacturers. The unit is able to emulate the operation of byte/block/selector type controllers from ten kilo bytes per second to three mega bytes per second.

The Peripheral Automatic Channel Emulator (PACE) is assignees's second channel product. PACE emulates an IBM I/O Channel using a personal computer as its host. PACE allows peripheral manufacturers to do development and test without an expensive mainframe. PACE is capable of data streaming transfers at three mega bytes per second. PACE is a mainframe-in-a-box used by plug compatible peripheral developers and manufacturers in place of mainframe I/O channels. PACE attaches to an IBM personal computer and provides full channel emulation, byte/block/selector up to three or four-point-five mega bytes per second. In addition to the PACE, diagnostic programs for standard peripherals including 3211, 3420, 3480, 3380 have been developed. A program equivalent to IBM's FRIEND diagnostic called PAL has also been developed.

The Channel Monitor is the third channel attached product developed by the Assignee. Like a logic analyzer, the Channel Monitor is able to capture and display the sequences used to control a peripheral and to transfer data. The Channel Monitor is an intelligent tool, attaches directly to the bus and tag cables, and is preprogrammed to understand the protocol of the I/O Channel. This makes it easy to use for field service and installation test. The Channel Monitor is a specialized logic analyzer for the IBM I/O channel. This device is also useful for characterization of control units.

The Assignee's fourth product is the VMEGate and evolved from the IBM I/O Channel test equipment. Combining the industry standard VME bus with the bit-slice channel technology evident in the I/O Channel Tester and PACE, the VMEGate was the first system providing a flexible, user programmable channel attachment mechanism for Original Equipment Manufactures. The family of VMEGates includes both channel and control unit emulations.

The Assignee's fifth product, the PCGate, is similar to VMEGate in that it makes channel attachment available on a standard bus. In this case, the channel attachment is to an IBM PC bus. PCGate permits attachment of an IBM PC to a mainframe computer directly at the bus and tag level. This results in a dramatic improvement in transfer speed, from the fifty-six kilo bits per second available with the previous SDLC techniques to three hundred kilo bytes per second.

Plug compatible peripheral designs for the IBM I/O Channel require IBM I/O Channel experience and knowledge and the importance of reliability and conformance to IBM conventions. Incompatibility with different mainframe models, different operating systems and various third party peripherals have frustrated the mainframe users. The present invention is primarily focused on the IBM mainframe computer direct-channel-attached marketplace. The following section describes the IBM storage hierarchy and the individual items of equipment which make up this hierarchy. This establishes the baseline for the introduction of optical storage and the present invention.

The mainframe storage hierarchy consists i) of main memory, ii) auxiliary memory such as cache and solid state disk, iii) rotating disk, iv) reel and cartridge tape, and v) hardcopy such as microfilm and paper. This hierarchy is arranged according to functionality, i.e. the upper level storage mechanisms are the most accessible. In general, the upper levels are also the most expensive, the fastest, and the most volatile both by nature and by design. Any new mechanism must find its place in this existing hierarchy.

The top of the storage hierarchy is occupied by semiconductor memory directly addressable by the computer's CPU (central processing unit). The original IBM 370 architecture used a twenty-four bit addressing scheme providing access to sixteen megabytes of real memory. This became a serious constraint on larger systems, and led to the introduction of the IBM XA computer. The IBM Extended Architecture XA computers provide a thirty-one bit address providing access to two-point-one giga bytes. This expansion of CPU memory size was necessary to balance the increase in executed instructions per second. The advent of more powerful central processors necessitated the addition of more available memory.

The original IBM Operating System (OS) was a real storage operating system. In 1972 IBM produced the OS/SVS operating system which provided Single Virtual Storage (SVS) addressing for the first time. In 1974, IBM introduced the OS/MVS operating system having Multiple Virtual Storage (MVS) addressing on the IBM 370 computer which then provided multiple virtual storage address spaces of sixteen megabytes to each of several concurrent system users. As larger processors came online it became more difficult to balance an MVS system. The XA computer is designed to better utilize resources and make it easier for users to balance work loads. The Extended Architecture, XA, computer is a combination of System-370/XA hardware and MVS/XA software designed to efficiently manage the system resources of the processor, virtual storage, real storage, and I/O. Auxiliary memory is semiconductor memory accessible over the I/O Channel. This includes solid state disk and cache. This memory is accessed through I/O instructions and is consequently less accessible than main memory. Because there are no mechanical delays (e.g. seek delay) associated with auxiliary memory, it is faster than other I/O devices. Cache is designed to keep frequently used data close at hand. The size of cache has been increasing and a cache speed increase is easier to achieve than a speed increase directly from the disk. Cache can eliminate rotational latency and speed access to subsequent datasets much like the solid state disk. The solid state disk uses semiconductor memory in place of rotating media but otherwise appears as a magnetic disk. It fits in the hierarchy between main memory and DASD. The solid state disk is an example of a product which fills a specific need and fits well into the hierarchy.

The next level in the hierarchy is occupied by rotating disk memory, that is, Direct Access Disk Storage (DASD). Most applications programs use DASD for I/O because it is fast and readily accessed. DASD and all lower levels of the hierarchy are accessed via the IBM I/O Channel.

The evolution of disk storage for IBM mainframes follows key technology improvements. IBM Model 2311 was announced in 1960 with conventional head technology. The 3330 drive introduced in 1970 for the IBM 360 computer moved the heads into the disk pack with improved reliability. IBM Model 3350 was announced in 1973 with Winchester head technology. The 3350 represents the first true sealed Winchester type drive. The clean environment allowed lower flying heights and higher density and speed. IBM Model 3370 was announced in 1973 with Whitney head technology. The 3370 was the first thin film disk. Made in 1979, thin film improves performance by improving head and media performance, not by lower flying heights. The bit density of the 3370 and 3380 is higher than the older Winchester drives.

DASD does have disadvantages. Because of its rewritable nature, data can be lost. The tight tolerances which make the media dense and fast also make it susceptible to head crashes and lost data. Magnetic disks are required to be backed up onto magnetic tape in order to restore data after a failure. This is one of the primary uses for magnetic tape.

DASD uses non-removable media. In order to maintain the tolerances needed for high density it was necessary to build a unified head-disk-assembly integral to the subsystem. Data must be transferred to another media if it is to be stored offline, i.e. aged data must be transferred to magnetic tape. This is another primary use for magnetic tape. DASD is expensive. Although the cost per megabyte of online storage has decreased steadily over the years, users must still remove aged datasets.

The close tolerances required to achieve high density and high speed make the disks susceptible to environmental fluctuations. DASD is physically large, requiring 2 or 3 tiles for a five giga byte system, plus the required free space for maintenance access. The 3370 and 3380 use different recording formats but can share the same type 3880 storage controller. These two formats are important to the introduction of optical storage for IBM mainframes. The two competing formats are Fixed Block Architecture (FBA), used in the 3370, and Count Key Data, used in the 3380.

Like Count Key Data DASD, the FBA disk drives provide high speed random access to datasets. In general, the performance of the 3370 devices is equivalent to their Count Key Data counterparts. The distinction of FBA is the way in which datasets are recorded on the disk and their locations managed. For fixed block architecture devices, tracks and records are formatted at the time of manufacture. The user does not specify the length of the data area. Records are specified for selection by relative block numbers. The device is formatted into a continuous sequence of numbered blocks and arranged at evenly spaced sector locations. The subsystem converts the block number to the track address and sector location.

The 3380 is a Count Key Data drive. With count, key and data device types, the programmer decides the length in bytes of each physical record. The I/O Channel programmer writes certain control information for each record in the pattern that is predefined for the count, key, and data format. All count, key, and data tracks are formatted beginning at the index point and ending at the following index. Each track has the same basic format: track home address and track descriptor record, followed by user records. One or more user records, with count, key and data, are written following the descriptor record. Each of the Count, Key and Data areas is separated by a gap. The count area contains the location of the data area that follows. The location is specified by the track address (cylinder and head numbers) and record number. The count area also specifies the length of the key and data areas. The optional key area is used to identify the data, while the data area contains the user's logical records. The number of records on a track vary according to the length of each of the data areas. With count key data devices the channel sends a seek command to position the access mechanism to a track. Once on track the desired record must be located. This is accomplished by a command that causes a search for the record identifier. The desired record identifier is compared to the record numbers in the count area of records on the track until a match is achieved.

Even though FBA does not allow users the freedom to decide where on a disk surface information will be stored, some argue that FBA is more efficient than count key data because it reduces the amount of disk space required for housekeeping functions. While count key data allows users to place their most active files where they can be quickly accessed, the housekeeping for count key data can be unwieldy, and the small gaps that count key data requires between fields consume storage capacity. Eventually the gaps can actually occupy more space than the data. Like their FBA counterparts, the 3380s have the advantages of high speed and update in place. They also share the deficiencies of the FBA drives by the requirement for backup to nonvolatile media, the lack of removability of the disk pack itself, high cost, stringent environment and large physical size.

The next level in the hierarchy is occupied by magnetic tape. Tape has seen fewer changes over the years than disk. Chief among the advantages of tape are its standard format and transportability. The media is removable and can be shipped from place to place. The media is also inexpensive.

Tape does have a number of significant disadvantages. Access is limited to serial searching of the media. For this reason most data is transferred from tape to disk prior to processing. The data also cannot be easily updated in place, a record once written cannot be replaced by a record of different length.

Another disadvantage is that the tape media is expensive to store because it requires a controlled environment to halt deterioration. Deterioration of magnetic media is a major concern in archiving. Several mechanisms contribute to the deterioration of media over time. Chief among these are the aging due to humidity and stress temperature changes. Humidity has the effect of weakening the tape and allowing the magnetized portion to separate from the backing. Changes in temperature cause the tape and the hub to change size at different rates. This causes stress in the pack. It is often advisable to periodically rewind tapes to relieve stress.

Perhaps the most limiting disadvantage of the tape is the amount of time lost in manual operations. Manual operations on magnetic tape are a major source of errors in computer centers. In general, the operators are required to locate, mount and store tape reels based on the six digit volume-serial number (VSN) located on the case. Transposition of numbers, mislabeling and misfiling often lead to mounting of the wrong reel. In a labeled environment, the tape management program will catch such errors and prevent further processing. An amend will occur and the job will be rerun at a later time. In a no label or bypass label environment, data loss will almost always occur with highly unpredictable results, sometimes not evident at the moment.

The 3420 reel tape line has been the standard for years. Because of the stability of the technology, it has been relatively easy for the plug compatible manufactures to copy the 3420. The longevity of the nine track tape is in part due to the industry standardization on this format. Data written on one machine can almost always be recovered by another machine even when different manufacturers, e.g. when Digital Equipment Corporation (DEC) and IBM, tapes are involved. There are of course issues of conversion of code (ASCII vs EBCDIC) and number representation, but in general the data can be read into the machine to make such conversions possible. The long history of these drives makes them an obvious choice for many tasks requiring long term storage.

The performance of the 3420 reel tape drive has increased over the years. The 3420-8 is a two-hundred inches per second machine which at six-thousand-two-hundred-and-fifty bits per inch, transfers data at one-point-two-five mega bytes per second. However, the transfer speed is deceptive since it is influenced by and sometimes swamped by other factors. Chief among these are the mounting and dismounting manual operations and sequential access inherent in a tape mechanism. A typical mount or dismount requires time. A rewind may occupy sixty seconds. Access to the tape itself, if it is in an archive for instance, may be measured in the tens of minutes. The lost time is lost channel time and lost drive time. Drives can be viewed as relatively inexpensive devices whose time can be wasted. Channel time is more precious because the channel is a shared resource and slow performance can impact other tasks. Thus, the most important loss of tape performance comes from sequential access and interblock gaps.

An interblock gap (IBG) separates two datasets on a tape. These IBGs are required to allow an area for the drive to come to rest between reads and writes. The IBGs consume both time and storage. There is a relationship between the effective transfer data rate expressed in mega bytes per second and the block size expressed in kilo bytes. The transfer rate rapidly increases to a maximum rate as the block size increases. The IBG for 3420 drives is the equivalent to a two kilo byte block. The actual transfer speed of the drive drops to one-half when the block size is reduced to the IBG length.

The 3480 cartridge tape drive advantages are firstly the cartridge itself, which is small in size and totally protected, and secondly the high speed and small size of the transport. The 3480 offers several advantages over of the reel system from the operator's point of view. The cartridge is smaller, thus occupying less shelf and cart space. The tape is fully protected in the cartridge and is never exposed or handled. The machine is fully autoloading and is available from IBM with a simple loader. The drives include a large display which is used to cue the operator for tape mounts and dismounts and to indicate drive status.

The 3480 achieves sustained three mega bytes per second transfer speeds through its high density eighteen track recording system. This is an important feature in backup situations since it allows speed matching between DASD and tape. As the number of strings of DASD increases, the amount of data required to be backed up on tape increases as well. This is in general a daily process, and ties up both I/O Channel time and operator time. The 3480 cartridge is designed to ensure that it will hold the entire contents of a twenty-four-hundred foot reel to make conversion easier.

Like the 3420 reel, the 3480 cartridge does need to be rewound and mounted. These operations are time consuming. If speed is the issue, then rewind time must be considered since it occupies the time of the drive (although not the channel). At three mega bytes per second, a two-hundred mega byte tape requires sixty-seven seconds to read. Nearly this same amount of time will be required to rewind this tape. The total drive data rate drops by one-half. Load and unload time amounts to about five seconds each. Compared to the rewind time this is small. If only a small portion of the tape needs to be read, then the load, search, rewind, unload times can be significant. Like the 3420, the 3480 uses an interblock gap to separate data records. The IBG length for the 3480 is four kilo bytes, twice that of the 3420.

The 3480's advantages over the reel 3420 are many. It is more transportable than the equivalent reel capacity and is better protected. The tape format includes a new block id function which will allow rapid access to data areas with little CPU involvement. The operator functions are much improved, with a display system which prompts the operator to mount and dismount cartridges. A path selection function is provided to assist in management of shared tape. Finally, the cache speeds access to data by keeping many tape motion delays isolated from the CPU and I/O Channel.

The disadvantages of tape media do carry over into the 3480 cartridge. It remains a sequential access mechanism with the difficulty of updating in place, and storage costs remain high due to the environmental restrictions on the media itself. The 3480 specification are generally: A one-half inch, eighteen track, high density tape that is enclosed in a compact cartridge for protection and automatic threading; Small tape cartridges four-by-five-by-one inches with storage capacity of two-hundred mega bytes; A tape drive that moves the tape without the need for capstans or vacuum columns; A fast search capability that allows a program to position a tape to a specific block without constant processor or control unit supervision; A message display on each tape drive to present operating system messages to the operator; Reduced physical and mechanical complexity; Superior error correction and better reliability; and Data transfer rates of up to three mega bytes per second.

The two dominant hardcopy mechanisms occupy the bottom of the hierarchy. Paper is the only true archival media. This stems not from the character of the media itself but from the character of the machine required to read the media. It is assumed that any media written more than twenty years prior will be unreadable because no machines will be available to read it. The use of paper will remain high for this reason. It is readily used, inexpensive and uniquely convenient in that it can be altered by the user.

Microfilm enjoys the advantage of paper in that with simple optics it can be human readable. Microfilm can be considered to be true archival media. Unfortunately this characteristic is also a disadvantage because, in general, what is human readable is not machine readable. Microfilm is consequently an output media, not readily transferred back to the machine for further processing. It is not as convenient as paper because it requires a machine for magnification and cannot be altered by the user. However, it is readily stored, and conveniently indexed for retrieval.

Several alternate storage systems have been made available. Each system is designed to occupy a niche in the hierarchy. StorageTek announced their 4400 Automated Cartridge System, a fully automated, 3480 cartridge based information storage and retrieval system. StorageTek expects the 4400 to fill the gap between online DASD and offline tape, and has coined and trademarked the term Nearline to describe their product. The StorageTek 4400 is an important offering because it uses the 3480 cartridge. The IBM 3850 Mass Store System suffered from the fact that it used a unique media requiring conversion from tape or access from DASD. StorageTek has eliminated this objection by using the 3480 cartridge. The 4400 uses a bar code system to label cartridges. These bar codes are read by a robotic picker. StorageTek offers a software package to provide for a full access mechanism.

The IBM 3850 Mass Store System provided up to four-hundred-and-seventy-two giga bytes of storage. The data was stored on unique cartridges, and when requested by the processor was transferred to DASD for processing. The processed data was then transferred back to the cartridge for storage. Cartridges were stored in a honeycomb arrangement and accessed via a picker. First the host computer issues commands to a Staging adapter for accessing data on DASD which conform to the command set for the IBM 3330 Disk storage devices. The staging adapter in connected to both a DASD and a cartridge storage. The staging adapter transfer information on the cartridge storage to the DASD storage for host computer use. The host computer sends Mass Storage System instructions to a Mass Storage Control Unit for data cartridge selection. The DASD storage stores Mass Storage Control tables for look up to the data cartridge. The Mass Storage System provides cartridge tape storage but appearing to the user as conventional DASD storage.

Tape, contained in the data cartridges, was used for data storage, while disk was used to make the data available to the CPU for processing. The storage, retrieval and management of the data in the cartridges was handled by the mass storage system and was transparent to the user. User programs operated as if the data always existed on disk. Introduced over eleven years ago the system was not a success. Early problems with microcode and users skepticism about the cartridge combined to kill the product. No further work on the 3850 is planned. The major contribution of the 3850 was the software developed to support it. The Hierarchical Storage Manager (HSM) developed for the 3850 forms the basis for much of the storage management software available now.

Remote Storage has been used at user terminals. A trend in storage which should be considered is the distribution of storage to user networked personal computers and low end mainframes. Significant software will be required to allow efficient well managed distributed storage. The IBM storage management of datasets as they migrate between disk, tape, and mass storage devices is becoming a major problem. Users will be able to do it only with help from the system itself. IBM and independent software competitors are hard at work preparing products that transparently and automatically arrange data files in hierarchical schemes, putting the most active ones on disk for instant access and keeping less-used files close at hand on cheaper storage devices.

IBM has announced the Data Facility family of program products. IBM is evolving to a system-managed storage environment based on Data Facility. These products include the Data Facility Product, the Data Facility Hierarchical Storage Manager, Data Facility Sorting package, and the Data Facility Data Set Services program. The Data facility family works with other IBM products for data security, timesharing, and relational database management. IBM announced a common interactive interface for the Data Facility family in the form of the Interactive Storage Management Facility. Based on the facilities of IBM's Interactive System Productivity Facility, the Interactive Storage Management Facility provides storage administrators and users with a series of interactive screens to choose from. They can also select datasets for certain operations. One of Interactive Storage Manger Facility's prime advantages is that it eliminates the need for creating and debugging Job Control Language code. Interactive Storage Manager Facility users can also review, copy and delete datasets. The Interactive Storage Manager Facility product provides a simplified syntax, prompts, defaults, help, and other features to improve productivity and to shield users from much of the complexity of the individual Data Facility programs.

IBM's Hierarchical Storage Manager keeps track of datasets as they move among disk, tape and, initially the 3850 mass storage device. Hierarchical Storage Manger staged datasets on disk after they were called out of the 3850 by an application program. Archive Storage Manager was enhanced with new facilities that enable it to better track the usage of individual datasets, storing them on the appropriate mechanical devices. With the Archive Storage Manager, users can define classes of datasets that are to be treated in different ways. The goal is to free disk space for high-priority data and to improve overall system and worker productivity. The user has no need to know where his data is because the Archive Storage Manager keeps track of where each dataset is and can move it as needed.

As peripheral controller software becomes more intelligent, and new storage and memory technologies add more levels to the overall storage hierarchy, IBM would like to manage storage at the logical level with all datasets appearing to reside on a single device.

Operating Systems need to have tape access. Understanding how the mainframe gets access to a particular data set is important when considering an alternate storage mechanism. Considering tape in particular, the task is to resolve the location of a particular dataset. In general this process involves consulting a catalog, maintained by MVS or an applications program, and determining the volume-serial number (VSN) of the tape which contains the dataset. A mount request is then generated to prompt an operator to mount the desired VSN. The system will then read the label on the tape to verify that the correct VSN has been mounted. This accomplished the job requiring the dataset located on the VSN will be run. The process has many variations depending on the operating system, the applications programs and the operating procedures of the individual data center. Under MVS with a package like UCC-One which is a product of UCCEL Corporation that solves tape management problems, the control is quite strict and should be error free. In a Vault Management environment the control is less automated and may be done primarily by manual cataloging. Each data center operates according to its own policies and procedures in this area.

There is a market place for optical storage devices. Within the storage hierarchy and the devices which implement it, there exists a place for WORM optical storage. Just as the solid state disk memory fits certain unique applications, WORM optical media fits certain applications. Optical storage is not expected to replace any existing storage mechanism. It will augment existing mechanisms and improve total system performance. So too, erasable optical has its place and will not displace WORM. Each storage media has its positive and negative aspects, as does WORM optical storage.

There are many reasons to use WORM optical storage in certain applications. On the positive side, optical offers high storage density, permanence, removability, long life, and low media cost. The high density of optical is achieved by using laser energy to read and write the media. The important observation is that this density is not achieved with the very low mechanical clearances of magnetic media. Head crashes are not a concern with optical, and neither is head/tape wear. Because the media is removable and easily stored, it is ideal for archiving data in place of tape, especially data that is of permanent long term value. Once written, the data is permanent and cannot be erased or rewritten. This is an important consideration for certain record keeping tasks. The optical storage media is inherently tamper-proof.

Optical storage media costs today are roughly twice that of tape media on a per megabyte basis. This assumes that tape is one-hundred percent utilized which is rarely the case in IBM systems. Media costs are expected to continue to decrease. As with other media, what is an advantage on one side is seen as a disadvantage on the other. This is true of optical as well. There are several criteria which mitigate against the use of optical media in the IBM environment. Perhaps the most significant to date has been the lack of a complete turnkey solution. Some frustrated users have resorted to their own implementations using Direct Access Control Units, and similar methods. This aspect of the problem is solved by the introduction of the present invention.

The write speed is the limiting factor because of the amount of energy required from the laser to mark the media. Higher revolutions per minute require higher laser power and reduce the mean time between failures. Write speeds are also influenced by the error correction mechanism. If a separate revolution is required to verify the data then the write speed can suffer due to rotational latency. If the correction is done on the fly then the error correction circuits must decide quickly if an error occurred sometimes resulting in unnecessarily rewriting sectors. Read speeds could be improved by creating a read only transport which spins at higher speed.

Applications which are suitable for optical storage include those which can be satisfied with a low speed device, and involve the storage of long lived data, and involve the storage of large volumes of data. Where all three factors are present optical is a good fit. Applications which are unsuitable for optical include those which require a high speed device, OR involve storage of short lived data, or involve storage of small amounts of data. Where any one of these three factors is present optical is a poor fit.

Many applications often cited for optical simply are out of reach with today's technology. The oft cited seismic data application is ideal from many respects: it is very high quantity, of permanent archival value, and write once. Unfortunately the collection of this data occurs at speeds in excess of one mega byte per second. The seismic data application is not a suitable application because of the high speed required during data collection. DASD backup fails the condition because the data is short lived. Backup tapes are generally retained for a short period, beyond which they lose their value.

Advantages of WORM optical are high density, permanent, tamper-proof, stable media and removable media. Disadvantages of WORM Optical are low speed, high media cost, write once and a lack of standardization.

A new optical controller could take full advantage of the optical storage mechanism, in particular the ability for random access to very large data bases. To accomplish these objectives the controller designer would define a set of I/O CCWs (Channel Command Words) commands for this new device. Seek commands would be included to achieve random access. A directory structure, like a Volume Table of Contents, would be defined which would conserve media. Ultimately, even a new access method would be defined and new host software written to utilize the new device. However, this software development would be a major undertaking. Several man years would be invested in developing software to use the new device. This new software represents a significant risk for vendor and customer alike. It is this software issue which motivates an emulation to interface the optical disk. An emulation has the advantage of existing software support from IBM, with the disadvantage that the emulation cannot make the best use of the new device's unique characteristics.

DASD emulation is the most desirable emulation because most applications software is written to utilize DASD. DASD is organized to allow efficient random access to large datasets. This is accomplished through the use of individual volumes set aside for each dataset. Consider the Volume Table of Contents used in count key data devices. Each volume contains a Volume Table of Contents of the datasets and of the unused space on the volume. The Volume Table of Contents is used to control the allocation of space on the volume, and to determine where a dataset is located. Within the Volume Table of Contents are records which name and describe individual datasets. The descriptions include the cylinder and head location and number of extents. When a dataset is written, the records in the Volume Table of Contents describing the dataset are updated to activate the new dataset record, and to reduce the free space remaining on the volume. It is this updating process which is most difficult to handle efficiently with WORM media.

One possible solution to the disk emulation is to stage data on magnetic or solid state memory prior to writing to optical disk. In this approach a volume would be held in staging memory until it was closed and then written to disk. The staging memory could be in main memory, as done by Perceptics' attachments on DEC computers. This requires special software and consumes main memory. This staging memory could be of considerable size, essentially a solid state disk acting as the front end cache to the optical disks. This is an expensive solution.

To solve the problems of DASD emulation a complex system is required. The problems include backup for the volatile staging memory with error recovery mechanisms. Emulating count key data drives would be excessively consumptive of media. Emulating FBA drives would be a better fit since the optical drives with SCSI (Small Computer System Interface) interfaces are FBA oriented. However, the future of FBA is uncertain. The added flexibility afforded to the user by DASD emulation is probably not worth the risks and cost. The eventual availability of erasable optical may simplify this problem, DASD may then be the emulation of choice.

Emulating the IBM 3850 Mass Storage System could be a reasonable choice because software exists to handle this machine. However, because only a few were sold, this software may not be supported. A vendor could find that the essential software was no longer available or had been modified. This seems an untenable situation. Emulating the StorageTek Automated Cartridge System ACS4400 also appears risky. Again the availability of software and the assurance of continued compatibility with IBM cannot be assured.

Most turnkey optical systems offered are configured as document servers with an interface such as Ethernet or RS232. Optical is used to store text and images, either coded or scanned, and access is primarily by end users at terminals who wish to view, copy, or edit the material. A similar approach could be used in an IBM environment by emulating a controller, the 3274 or 3174. For document handling this is a viable approach. The software required to utilize such an emulation would be extensive.

Emulating a tape drive is another choice. Unfortunately tape is most often used for DASD backup and for storage of aged data. In the IBM world only limited applications expect to work with data directly on tape. Typically data is first transferred to DASD, manipulated, and later returned to tape. From one aspect this is good because it makes the WORM nature of optical less objectionable. From the second viewpoint this is bad because it means that the random access nature of the optical media is rarely if ever used; data is streamed sequentially to DASD and accessed randomly once loaded. The process of moving data between tape and DASD consumes I/O Channel resources. Unfortunately this highlights a current weakness of optical with a relatively slow read/write transfer rate.

However, features available on the new 3480 drives make tape an attractive choice since they offset some of the weaknesses noted above. In particular, the 3480 associates a logical block id with each record. This logical block id permits searching for specific records without the need for a series of forward space file reads. Few programs that take advantage of the logical block ids use the tape drive offline searching capabilities. This may change as 3480s become more widespread. The 3480 also includes a cache memory. A similar concept can be used in optical to speed transfers across the I/O Channel.

The current IBM System 370 storage hierarchy consists of main memory, disk memory or Direct Access Storage Devices (DASD), reel and cartridge magnetic tapes, and hardcopy such as paper and microfilm. Within the retrieval levels of this hierarchy, only data stored on DASD is available at all times for online mainframe processing. Data recorded on magnetic tapes is generally stored offline. Major time delays are frequently associated with the transfer of tape data from the tape library onto DASD. DASD storage is fast but remains expensive, while tape library storage suffers from both slow access and the attendant media storage space constraints and costs.

Consequently, a need has existed for a compact form of high capacity storage that is retrievable online when additional use of the data in mainframe processing is required. Optical storage can satisfy this compact, high-capacity online storage need. By emulating 3480 cartridge tape subsystems, Write Once Read Many (WORM), non-erasable, removable, optical disk cartridge storage can be made conveniently available to IBM and compatible mainframes. The present applicant choose to emulate the 3480 tape subsystem. This is the most general purpose device, able to satisfy the broadest set of requirements. The present invention solves or reduces the disadvantages of the prior art mass memory systems.

SUMMARY OF THE INVENTION

Figure 1:
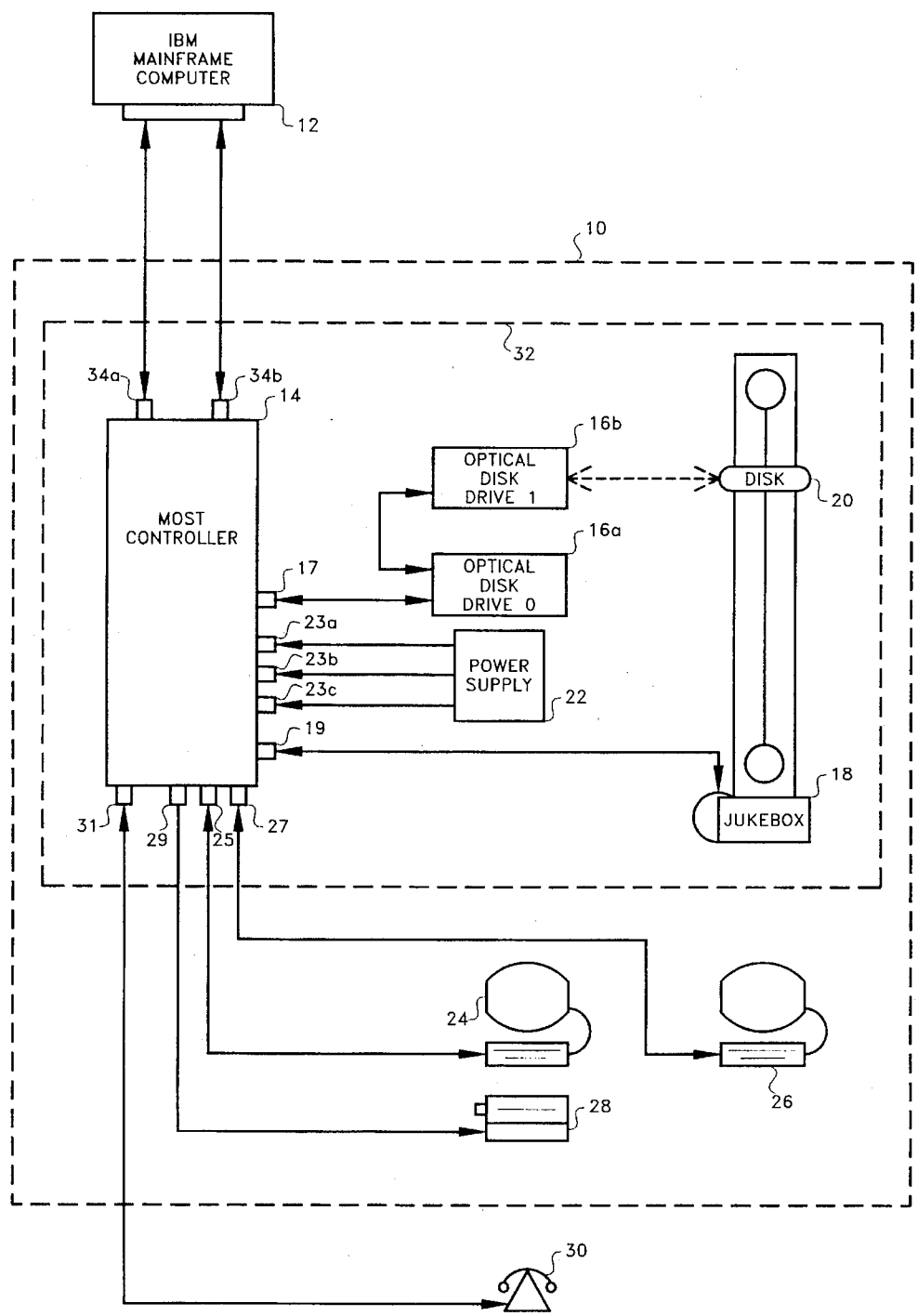
FIG. 1 is a block diagram of Mainframe Optical Storage Transport (MOST) at the system level.

An object of the present invention is to improve mass storage capabilities.

Another object of the present invention is to provide an optical disk system and method for emulating magnetic tape drives.

A further object of the present invention is to provide an optical disk system and method for emulating a set of magnetic tape drives using virtual tape data stored on optical disks.

Yet another object of the present invention is to provide an optical disk data organization system and method for efficiently storing data on an optical disks as a collection of virtual tapes.

Yet a further object of the present invention is to provide an optical disk virtual addressing system and method for emulating a set of magnetic tape drives though the translation of tape commands into disk seek operations.

Still a further object of the present invention is to provide an optical disk dynamic allocation system and method for emulating a set of magnetic tape drives mapped to a set of optical disk drives.

System Overview

The data storage hierarchy of IBM System 370 compatible mainframes is augmented by providing a system that offers plug compatible optical disk storage. The present invention is an optical storage library system requiring no changes to the IBM mainframe hardware or software. The optical disk system includes an automated media handler jukebox having storage slots to support optical disks. The system emulates 3480 cartridge tape drives and provides high speed random access archival storage. The system emulates the 3480 tape subsystem while eliminating the need for any changes to the mainframe host operating system or application software. The system response to the commands of the 3480 instruction set while using the automated jukebox with no required software changes in the host.

This system is referred to as a Mainframe Optical Storage Transport (MOST). MOST is a high performance IBM plug compatible storage system allowing mainframes to use optical mass storage. MOST emulates the operation of standard 3480 IBM magnetic tape systems, making very large amounts of online data, from two to eight-hundred giga bytes, available to IBM mainframes. The system is compatible with IBM's operating systems and offers a transparent interface between the host software and optical media.

Particularly, MOST is compatible with the IBM 3090 class processors and VM and MVS/XA operating systems executing on an IBM mainframe computer. The 3480 emulation approach results in optical mass storage system that is also compatible with IBM's DOS operating systems. This compatibility is achieved by emulating the IBM 3480 magnetic tape subsystem. Programs written for the IBM 3480 magnetic tape subsystem will operate with MOST without modification. Programs written for other tape subsystems, such as the 3420, may require some Job Control Language modification, the same as would be required if converting to IBM 3480 equipment.

MOST emulates the IBM 3480 tape subsystem, that is, it appears to an attached host computer to be a standard tape subsystem. By emulating the IBM 3480 Magnetic Tape Subsystem, MOST makes immediately available all program support intended for the IBM 3480. Conventional tape drive programming, including access methods, utilities, and job control language is supported. The Data Facility Product supported by IBM is compatible with MOST MOST is a mass storage system compatible with IBM mainframe computer systems. MOST provides multi giga byte storage with high speed access to any archival volume. MOST is a turnkey solution to optical storage for IBM mainframes. The 3480 emulation provides an optical attachment requiring no new operator skills, system programming, or modifications to existing software. MOST provides an integrated solution to data storage needs. MOST is compatible with programs available for the IBM System 370 mainframe with a 3480 tape subsystem. Most operator procedures are identical, allowing for immediate integration of MOST with an existing mainframe.

MOST can be used alone or in conjunction with 3420 or 3480 tape subsystems. MOST should be treated as a separate pool of 3480 equipment to ensure that only the desired data sets are stored on optical media. The addition of a MOST subsystem requires steps similar to adding a 3480 subsystem including: system generation and testing of the operating system and licensed programs that support the 3480 system; installing MOST subsystem units and testing them under control of the operating system; testing applications using the operating system, MOST subsystem, applications programs, and optical media; modifying data sets, if required, and application program Job Control Language that are to be used with MOST subsystem; and moving existing data from magnetic tape to optical disks.

MOST requires a block multiplexer I/O channel and may share that channel with other devices. Two and three megabyte streaming channels may also be used, with selected processors, for greater channel flexibility. Channel Unit Control Words must be assigned so that each drive has an identifier. A minimal amount of Job Control Language conversion is necessary to accommodate the IBM 3480 subsystem and hence MOST. Generally, the changes required are similar to those necessary whenever a different device type is added to an existing system. Conversion to the optical media requires that data be transferred from magnetic tape. This can be accomplished by copying existing data from tape to optical storage or by using optical storage in place of tape during the generation of new data.

MOST can be attached to nonstreaming block multiplexer channels with a 303X or 3042 attached processor, or 4341, 4381 and 308X processors of the computer. It can also be attached to two mega bytes per second streaming channels on the 4341 and 4381 processors. In addition, it can be attached to three mega bytes per second streaming channels on the 303X (with the data streaming feature), the 3042 (with the data streaming feature), and the 4341, 4381, and 308X processors. MOST is also compatible with the 3090 series and the 9370 family when a multiplexer channel is used.

MOST is designed for high volume online data manipulation. MOST provides cost effective replacement of a combination of DASD and conventional tape storage. MOST provides a bridge between online DASD and offline storage. MOST is useful to maintain a large volume of data, to frequently access records in a large volume of data, and, to permanently store data having long life.

MOST is configured in a range of models including small manually operated systems to large completely automated systems which eliminate the manual handling of magnetic tapes. MOST is an integration of optical storage into the IBM storage hierarchy and is compatible with user's needs and available technology. MOST is an integrated solution uniquely combining off the shelf equipment with new internal sophisticated software.

MOST has an advanced controller capable of data streaming rates through cache memory. Data streaming rates, up to four-point-five mega bytes per second are possible with the cache memory. The cache memory is microprocessor controlled in MOST to optimize data flow and throughput with a sustained data rate of two-hundred kilo bytes per second which is record length dependent.

MOST is operationally convenient for the user. It not only emulates the 3480 tape subsystem, but has a storage capacity ten times larger with the advantages of random access. MOST uses a standard twelve inch optical disk format having removable two-point-one giga byte media storing ten times the data of the 3480 cartridge tape. MOST is a low cost per giga byte storage solution with an archival life exceeding thirty years. MOST uses rugged optical disks enclosed in protective cartridges for greater protection and automatic loading. MOST is a storage mechanism permitting migration of datasets off of DASD without incurring long retrieval times. MOST reduces access time to data due to the high capacity of the media and the incorporation of robotic loading methods. The high speed robotic loading techniques permit rapid access to any optical disk within a large data library. MOST reduces operator labor due to the automatic mounting and dismounting of virtual tapes. The random access quickly locates a target virtual tape volume on any optical disk. MOST employs random access organization of data which takes advantage of the random access nature of the optical media.

MOST has an operator interface which replicates the functions of the IBM 3480 tape subsystem and provides important information to the operator in a standard format. The operator receives message displays for volume, status, and operator prompts. The readily comprehended operator interface emulates the 3480 and uses a minimum number of keystrokes to perform each function.

MOST has reduced media storage space due to the high density optical disk storage. MOST also requires less floor space due to the compact equipment size and high capacity media.

Emulation Overview

MOST records a collection of virtual tapes on optical disks. The emulation process stores "virtual tapes" on the optical disks. Retrieval of virtual tapes is faster than the retrieval of 3480 cartridges because of the robotic access to the disk library. Each disk cartridge can be visually identified by a disk number label on the edge of the cartridge. MOST maintains a volume and serial number directory on the optical disk of all of the virtual tapes recorded on the optical disk. Thus, each disk is self contained. The disk may contain one or many virtual tapes on each of its sides.

Each virtual tape has a Volume & Serial Number (VSN), a length, and a pointer to its tape map, which defines the structure and contains access control information for each data record. Each virtual tape has a volume and serial number according to IBM convention. Mount messages sent by the host computer to MOST are automatically interpreted and acted upon. If the requested virtual tape resides on a disk currently loaded in the optical disk drive, the virtual tape will be mounted through the action of the MOST controller. If the requested virtual tape resides on a disk which is not currently loaded in the optical disk drive, the disk will be retrieved through the robotics of the media handler.

Each optical disk contains a unique disk identification number assuring positive verification of the optical disk identity during disk handling operations. A disk id address space of thirty-one kilo bytes is reserved to maintain identification data for the optical disk. The large size of the disk id address space allows the disk to be reidentified up to thirty times. A tape directory recorded in predetermined bands of sectors maintains a directory of the virtual tapes stored on the disk. The bands of sectors allow the recording of updated tape directories for virtual tapes that were added, deleted or altered. After one band of sectors is used, an additional band will be set aside as necessary.

Each virtual tape that was recorded on a disk has associated with it a respective tape map. The tape directory listing the virtual tapes has pointers to the respective tape maps. The tape maps keep track of the physical structure of the virtual tapes. A tape map is used to determine the size and location of interblock gaps, tape marks and user records recorded on the optical disk.

Data is organized as a system of pointers and user records. The system of pointers includes the disk id, tape directory and tape maps. When an optical disk is loaded, the system of pointers is loaded in memory of the controller so that search operations can be quickly executed using semiconductor memory, and so that the read and write operations can then occur through disk seek operations. The loading of system of pointers into the memory increases system performance. The system of pointers and user records can be rewritten into unused portion of the optical disk so as to provide an equivalents to rewritable magnetic tape media.

Library management is carried out as in a magnetic tape environment. Each optical disk is considered to be a collection of "virtual tapes". Each of these tapes is given a volume and serial number and managed by the tape catalog system. Catalog systems are available from IBM as well as UCCEL and others.

The additional management function required by MOST is that of knowing on which optical disk a particular virtual tape is stored. This function is carried out by the MOST controller and is independent of and unknown to the host computer. A small, forty mega byte magnetic hard disk drive is housed within the MOST controller. This magnetic hard drive contains the information necessary to cross reference virtual tape volume and serial numbers to disk ids. MOST keeps account of optical disk both in jukeboxes and in storage racks.

In a tape environment, it is sometimes necessary to label tapes prior to processing. The labeling process writes the volume serial number on the tape, along with a file mark to prevent the tape from "running away" on the first read. Generally this is done by a host program such as IEHINIT. This same process can be performed in like fashion with MOST. MOST can label virtual tapes in an offline mode using a self contained version of IEHINIT.

Write once data is stored on the optical disk cartridges as a collection of 3480 virtual tapes, which are accessible by the host mainframe through the input-output channel. MOST provides a high speed search to quickly locate desired data. MOST implements the sequential tape commands as random accesses commands on the optical storage media to quickly traverse large data blocks. The virtual tapes contain the same user program data as the magnetic tapes.

The compact collection of readily accessible virtual tapes on the optical disk media saves time typically expended in the tape mount and demount operations, by eliminating the need for physical handling of numerous reels or cartridges. The data center operator selects, mounts, and demounts the virtual tapes in the optical disk collection electronically. A job control sheet may be used or, alternately, the operator may be prompted by volume and serial number messages sent from the mainframe.

The optical disk system is able to interpret and act on mount and demount messages directly, providing fully automated operation. In a jukebox configuration, thousands of virtual tapes can be handled automatically with no operator intervention. MOST uses conventional monitors with key boards as operator consoles to emulate the control panels of the virtual magnetic tape drives. The video screens display the control panels providing the operators with the touch and feel of a 3480 magnetic tape subsystem.

Control of the emulated 3480 tape transport is available to the operator. MOST maintains and operates on directories for the virtual tapes on the disk cartridges as well as a disk media directory for identification of the cartridges residing in the automated jukeboxes. Each optical disk has the capacity to store the equivalent of ten two-hundred mega byte 3480 cartridges. A greater number of partially complete magnetic tapes can be stored on the disk, resulting in a reduction in physical space requirements for media storage.

A jukebox provides automated robotic handling of optical cartridges equivalent to thousands of 3480 cartridges. In response to mount requests, the robotic jukebox media handler will automatically exchange optical disk cartridges between the disk drives and the appropriate jukebox slots in seconds. The disk media directory is stored on the magnetic hard drive and is automatically updated as optical disk cartridges are imported into and exported from the jukebox media handler. MOST maintains a one-to-one mapping allocation between virtual tape drives of the emulated magnetic tape subsystem and the attached optical disk drives. To increase system performance, the allocation is dynamically changed to minimize access time to requested data.

MOST is a data processing requirement for online access to large volumes of data. MOST provides increased capacity and high speed access to large volumes of data. By emulating the IBM 3480 magnetic tape system and storing mainframe generated data as collections of virtual tapes on removable optical disks, MOST is a practical means for rapid mainframe access to multi giga bytes of permanently stored records that are essential in numerous areas of business and government operations. These and other advantages will become more apparent from the following detailed description of the preferred embodiment.

DETAILED DESCRIPTION OF THE PREFERRED EMBODIMENT

System Configuration

Figure 2:
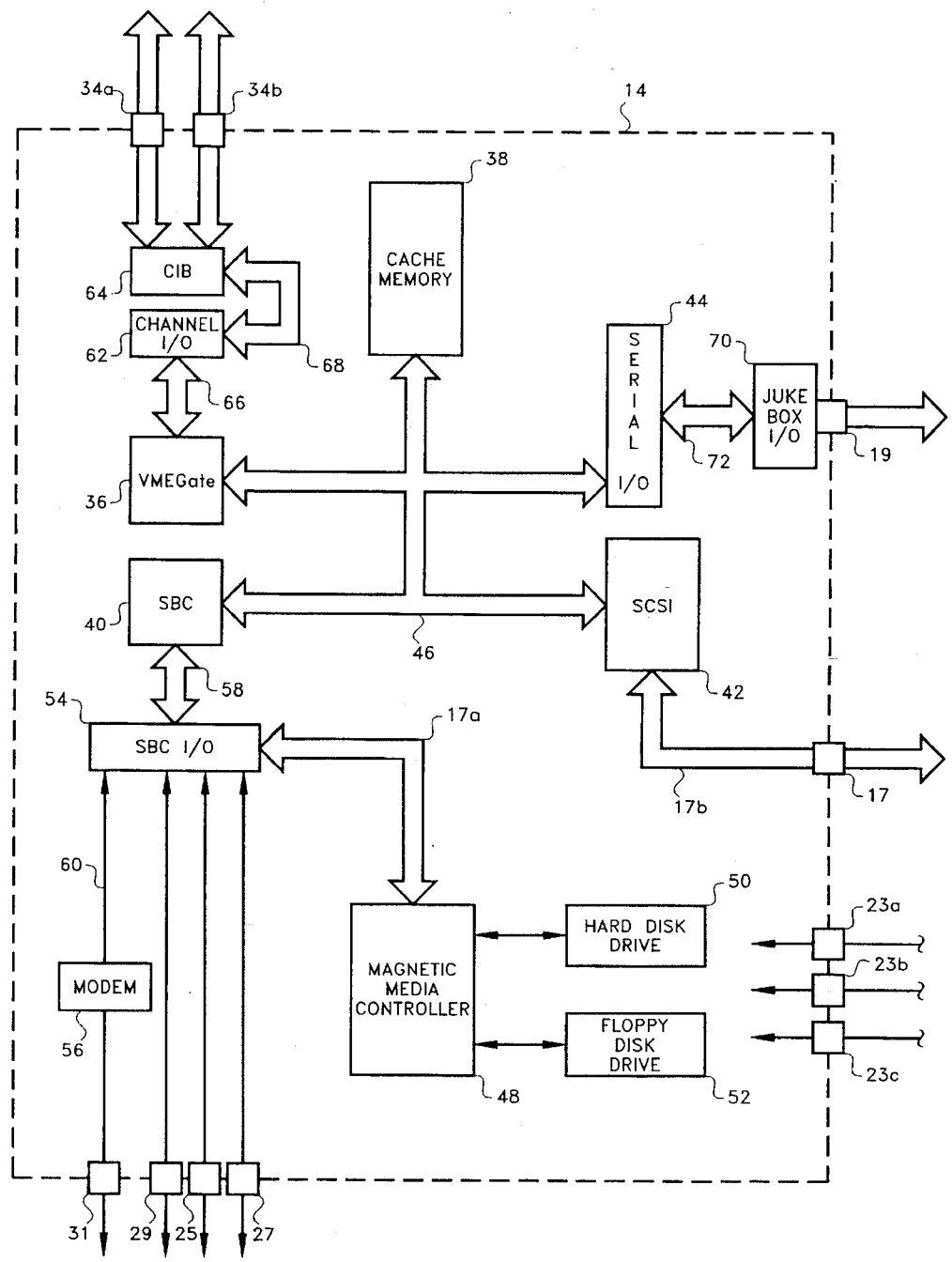
FIG. 2 is a block diagram of the MOST controller.

Referring to FIGS. 1 and 2, MOST 10 provides a transparent interface between IBM System 370 compatible mainframes 12 and optical disks 20. MOST 10 consists of a MOST Controller 14, optical disk drives 16 and optional jukebox (media handler) 18. MOST 10 utilizes optical disk storage for recording data. MOST 10 has a VME bus based MOST controller 14 which is a general purpose controller which attaches to IBM's block multiplexer through the input/output channel 34. MOST 10 connects to the IBM mainframe computer 12 via the I/O Channel comprising tag port 34a and data port 34b. The MOST controller 14 attaches to IBM's block multiplexer channels and emulates the operations of 3480 control units. The controller 14 provides a transparent interface to the I/O Channel by accepting and responding to I/O commands and appropriately controlling the optical disk drives 16.

The 3480 emulation is accomplished by the MOST controller 14 emulating an IBM 3480-A22 unit and mapping optical drives 16 into the 3480 B22 dual drives. MOST 10 provides the same operator interface as the IBM 3480 system. The jukebox 18 provides the functionality of the operator of the IBM 3480 subsystem. The jukebox 18 manages the optical disks 20 and performs the media mounts and dismounts.

MOST 10 includes at least one MOST controller 14, up to four jukeboxes 18, one to four optical disk drives 16 per jukebox 18, for a maximum of sixteen optical drives 16, a power supply 22 through power connectors 23a, 23b and 23c, one or two operator consoles 24 and 26, a printer 28 and a phone line connection 31 to a remote telephone instrument 30. The power supply 22 provides primary power necessary for controller operation. Supplied voltages are plus five VDC on port 23a, plus twelve VDC on port 23b, and ground on port 23c. The MOST controller 14, optical disk drives 16, jukebox 18, disks 20, power supply 22 are housed in a cabinet 32. A manually operated system would consist of one optical disk drive 16a in a pedestal configuration, providing two-point-one giga bytes of online storage.

MOST 10 is unique in that disks 20 are stored within the unit itself. The number of optical disk cartridges which can be housed within the jukebox cabinet 32 varies with the number of drives and number of jukeboxes 18. Optical media can of course be housed in other MOST units or on the shelf.

MOST 10 can be configured as one of two basic models. The jukebox configuration is where the automated high speed robotics perform all mount and dismount requests. The pedestal configuration is where the operator performs the mounts and dismounts in place of the media handler. The pedestal configuration can hold one to four drives and operates only in the manual mode.

MOST 10 configurations range from manually operated systems with one disk of two-point-one giga bytes of storage, to fully automated, robotically operated systems with eight-hundred giga bytes (three-hundred-and-eighty disks) of storage capacity. MOST 10 has either disk cartridge storage racks, not shown, or automated handling using the jukebox 18. The jukeboxes need not be filled with media. The MOST 10 family of optical systems can be configured to support various high capacity storage requirements. The smallest MOST configuration consists of one MOST controller, one operator console 24, a single optical disk drive 16 and a power supply 22. The largest MOST subsystem 10 contains one MOST controller 14 with two operator's consoles 24 and 26 and printer 28, sixteen optical disk drives 16, and four robotic jukeboxes 18 capable of providing eight-hundred giga bytes of data storage.

FIG. 1 provides a functional block diagram illustrating the relationship of the major MOST components. The physical placement of the major components of the MOST system 10 are in conventional cabinets 32. The standard MOST configuration includes the MOST controller 14, two optical drives 16, and an automated jukebox 18 with media storage for up to eighty-nine disks. The MOST controller 14 attaches to IBM input/output channels 34 directly on the tag and bus interface 34a and 34b.

Controller

The MOST controller 14 provides the integration for the entire storage system, including control of the optical drives 16, the jukebox 18, the operator consoles 24 and 26, and the interface for the input/output channel 34 to the IBM mainframe computer 12. FIG. 2 provides a functional block diagram illustrating the relationship of the major component of the MOST controller 14. MOST controller 14 includes VMEGate 36, cache memory 38, serial I/O 44, modem 56, magnetic media controller 48, SBC 40, SCSI I/O 42, SBC I/O 54, floppy disk drive 52, and hard disk drive 50. Control of MOST 10 is accomplished through the use of a single board computer 40 and appropriate software of the MOST controller 14.

MOST 10 contains a controller 14 for interpreting channel commands, controlling the data flow, and managing buffer operations. The MOST controller 14 communicates with the jukebox 18 via a single, asynchronous, full duplex, EIA serial communication standard, RS232 port 19 at ninety-six-hundred baud. The jukebox commands include motion commands, e.g. get or put cartridge, and special commands, e.g. test and query status. The MOST controller 14 connects the IBM channel 34 to the optical disk drive SCSI port 17, and to the RS 232 interface 19, while providing a plug compatible device emulation, thereby making eight-hundred giga bytes of online data available to IBM mainframes.

The MOST controller 14 is a software and microcode controlled device. This provides flexibility in that the controller 14 together with its attached devices can emulate different standard channel attached devices (3480 cartridge tape, 3420 reel tape, 3380 DASD, etc.) or other non-supported devices utilizing custom, vendor defined, channel Command Words (CCWs). Within MOST commands, statuses and sense data accepted and presented to the channel are completely software dependent. By down loading a different program from the integral floppy drive 52, MOST 10 can change its characteristics in order to emulate different channel attached devices.

In the preferred form of the invention, MOST 10 has been programed and coded to emulate the standard IBM 3480 tape drive. Optical drives 16 that are attached are emulated as online devices, while the remaining channel addresses are emulated as offline tape drives. The software for MOST also supports operator and diagnostic interfaces, a jukebox based library of optical disks 20, and a database residing on the integral forty megabyte Winchester hard disk drive 50.

A minimum configuration for MOST would normally comprise a single channel attachment 34, a SCSI interface 17 for the optical drives 16, two RS 232 ports 25 and 27 for the consoles 24 and 26, an RS-232 port 19 for the jukebox 18, a modem phone line 31, a power connection 23 for a power supply 22, and a parallel printer port 29 for a printer 28. MOST uses existing commercial off-the-shelf optical disk drives, media, jukebox, circuit cards and chassis components in the preferred form.

The VMEGate microcode is embedded in the controller 14. The VMEGate microcode and the SBC software are stored on floppy disks. This software is loaded on power up from the floppy disk drive. Only the boot software of the SBC is in SBC ROM. VMEGate microcode and SBC software updates can consequently be accomplished by loading new code from the floppy disk.

Controller Chassis

The MOST controller 14 is housed in an UL approved chassis, not shown. The chassis is normally mounted within the cabinet but can also be rack mounted or desk mounted with an attractive front bezel for the pedestal configuration. The chassis of the MOST controller 14 provides a powerful plug compatible interface in a small, easily accessible package. The chassis contains a multi-slot VME card cage for routing of the VME bus 46 and the power supply 22. The chassis further includes a rear panel for mounted I/O boards. The controller 14 includes the integral self test modem circuit card 56, the SCSI based magnetic controller circuit card 48, and the magnetic disk drives 50 and 52. The use of a dedicated SCSI magnetic media controller 48 for the magnetic peripherals, separate from the SCSI controller board 42 of the optical drives 16, means that additional magnetic peripherals 50 and 52 can be added without adversely affecting system performance.

MOST connects to all attached devices and to the mainframe channel through connectors. A rear panel is able to accommodate multiple channel attachments each including Bus I/O 34a and TAG I/O 34b. The channel cables Bus In, Bus Out, Tag In and Tag Out are attached through four serpentine connectors. These serpentine connectors are coated with a conductive material which makes contact with the shield pins of the serpentine connectors. This connection provides complete shielding of the I/O signals as they pass into the chassis of the cabinet 32.

The four serpentine connectors associated with I/O channel ports 34 attach to the rear of the unit. The controller 14 can be placed at any location in the string, and may share the I/O channel with up to seven other channel control units, including other MOST units. The serpentine connectors for each channel attachment are mounted on a Channel Interface Board 64 (CIB). If a connector pin is bent or broken the CIB 64 card can be removed and replaced. The CIB 64 is connected to the mainframe 12 through the four Bus/Tag serpentine cable set. The CIB board 64 is physically located at the bottom of the chassis for convenient connections to the one or two pairs of bus and tag cables. Each VMEGate 36 is able to attach to one or two CIBs 64. The CIB 64 includes channel receivers and drivers, and a select relay.

A rear panel assembly, not shown, supports a jukebox I/O board 70 connected between the serial I/O board 44 and the RS-232 port 19. A jukebox I/O cable 72 connects together the Serial I/O board 44 and the jukebox I/O board 70. The rear panel also supports a Channel I/O board 62 connected between the interface board of the VMEGate 36 and the CIB 64 by Channel I/O Board serpentine cables 66 and 68. The rear panel also supports the SBC I/O board 54 connected to the SBC 40 by the SBC cable 58. Various connectors are mounted on the I/O boards 54, 62, and 70 mounted on the rear panel of the chassis. Latch and eject, insulation displacement connectors of the ribbon cables 58, 66, 68 and 72 are used to connect together these I/O boards 62, 70 and 54 and the SBC 40, VMEGAte 36, SCSI 42 boards lodged in the slotted card cage. In this way, faulty boards are easily disconnected and replaced in the field.

MOST 10 is upgradeable from one to four channels by the addition of another VMEGate and CIB 64. In the multi-channel attachment configuration, the four channel attachments are driven using two VMEGates 36. Unlike the multi-channel attachment of the 3480, which can only operate one channel at a time, MOST allows for one of the two channels to be active on each VMEGate 36. Thus, two channel access is possible, with the other two channels appearing offline. MOST 10 is upgradeable from one to four channels by addition of another VMEGate 36 and CIB 64.

Optical disk drives 16 are attached to the MOST controller 14 via the SCSI interface port 17. Single-ended SCSI connection is limited to six meters total cable length. Design constraints limits no more than four drives 16 on a single SCSI host adapter. By providing slots for up to four host adaptors in the twelve slot chassis MOST is able to accommodate up to sixteen drives 16 for a single controller 14, which matches the IBM 3480 architecture.

The SCSI interface port 17 for the optical disk drives 16 is located on the rear panel of the chassis. The connector is grounded by a shield attached directly to the chassis for maximum noise immunity. Shielded cables are used from the controller 14 to the first drive 16a and between drives 16a and 16b. In the pedestal version of MOST 10 where no jukebox 18 is used and no SCSI board 42 is used, using the five slot card cage, the SBC 40 controls the optical drives 61 over the SCSI interface port 17 by a direct connection between the SCSI bus 17a to the SCSI bus 17b.

Two shielded RS-232C ports 25 and 27 are provided on the rear panel of the chassis of the cabinet 32. The RS-232C port 27 is switched by a switch, not shown, to allow the port 27 to be bypassed and the signal lines routed to the internal modem 56 over cable 60. The modem 56 is connected to a standard modular RJ11 phone jack 31. These RS-232C ports 25 and 27 are under the control of the SBC 40. All control lines for RS-232 communication are controlled through the SBC software.

A shielded RS-232 connector for port 19 is provided on the back of the chassis to allow communication with the jukebox 18. Unlike the terminal ports which are driven by the SBC, the port 19 is driven by an intelligent RS-232 serial I/O controller board 44. The serial I/O board 44 has a 68000 microprocessor and also three additional RS-232 ports, (not shown). This additional processing power and I/O capacity of the serial I/O 44 are provided to allow expansion to multiple jukebox configurations.

A shielded 25-pin connector is available as a printer port 29. The printer port 29 allows tape database reports to be printed by the printer 28 as well as the production of hard copies of error logs. The pin out is identical to the IBM PC Centronics interface allowing connection to any Centronics parallel printer via a standard PC cable.

The VME Card Cage is typically a twelve slot card cage with the first five slot occupied as is the five slot version. The twelve slot version is typically occupied as follows: slot one has the Management Processor 68010 of the SBC 40; slot two has the Cache 38; slot three has the VMEGate interface board; slot four has VMEGate processor board; slot five has the Smart RS-232 68000 serial I/O board 44; slot six has an optional second VMEGate interface board; slot seven has an optional second VMEGate processor board; slot eight has the SCSI board for the first four optical drives for first jukebox; slot nine has a second SCSI board for the second four optical drives for the second jukebox; slot 10 has the third SCSI board for third four Optical drives for the third jukebox; slot eleven has a fourth SCSI board for fourth four optical drives for the fourth jukebox; and slot twelve is reserved.

The controller chassis is available in two configurations, a single channel attachment configuration, and a multi-channel attachment configuration. The single channel attachment configuration has a five slot VME card cage in a seven inch high nineteen inch rack mount enclosure. The multi-channel chassis has a twelve slot card cage in a ten-point-five inch high nineteen inch rack mount chassis. The larger twelve slot enclosure provides sufficient space on the rear panel for up to four sets of tag and bus cables, with each set having two tag and two bus cables. The cables required are SCSI cables to the optical disk drives 16, RS232 cables to the jukeboxes 18, operator's consoles 24 and 26 and printer 28, external cables for integrating system include Bus and Tag cables with Bus and Tag terminators, and a telephone line for remote console or diagnostics. The five slot chassis will support from one to four drives 16, one jukebox 18, one or two consoles 24 and 26, and one VMEGate 36. The twelve slot chassis will support from one to sixteen drives 16, up to four jukeboxes 18, one or two consoles 24 and 26.

Optical Disks

The technology of MOST is based on the industry standard twelve inch Write Once Read Many, (WORM) optical disk. Each optical disk has a capacity of two-point-one giga bytes using both sides. All MOST configurations utilize WORM optical disk technology for recording data while emulating IBM 3480 magnetic tape subsystems. The guaranteed archival life of the optically written disk is thirty years.

In typical applications, tape cartridges and reels are very seldom fully utilized. Usually, the usage is ten to fifty percent of a tape because of the time it takes to sequence through the tape and or the cataloging of applications. Due to the advantages of random access of virtual tapes on the optical disk, the utilization factor on disk is much greater. Therefore, in a typical operating situation, one disk cartridge would be equivalent to as many as one-hundred tape cartridges or reels. The MOST system will automatically recognize media which has not been labeled and request that the user provide a disk id before continuing, thus ensuring that all media in the system is numbered and properly accounted for.

The disks 20 are off the shelf items. The LMSI media is preferred. This media is in twelve inch format storing one giga bytes on each of its two sides. MOST uses both sides of the media. Each side is given an identification number followed by an 'A' or 'B'. These numbers are used to manage the media for location and orientation. The LMSI media is warranted to provide not less than one giga bytes of data storage per side. This ensures that two giga bytes are available for storage. The storage overhead rate including, disk id, tape directory, tape map, etc., is less than two percent, leaving one-point-nine-six giga bytes available for data.

The media is also inherently tamper-proof. Each optical disk is housed in a protective cartridge. The cartridge provides for secure transport of the optical media either by operators or by the media handler. The optical media is a disk constructed as a glass sandwich enclosing a tellurium alloy, which is the sensitive layer. The disk is preformatted and contains thirty-two-thousand tracks per side, each track containing thirty-two sectors of one-thousand-twenty-four bytes. Each sector contains more than the one-thousand-twenty-four bytes since headers and correction characters must be accommodated. These additional bytes are never included in the stated capacities since they are never accessible to the user. Thus, the actual data space is two-point-one giga bytes (2,097,152,000) per optical disk.

The optical media is write once read many (WORM). The physical characteristics of the optical media are such that it is impervious to stray magnetic fields, and provides for permanent and stable storage of data. Each cartridge disk includes a write protect selector that, when set, prevents data from being written on the disk. However, virtual tapes can be rewritten or modified, and stored in another physical location on the disk. The tape directory for the disk media is then updated to show the location of the new virtual tapes.

The virtual tapes are permanently written by a laser beam on the optical disks and are, therefore, tamper proof. Any virtual tape can be retrieved through the I/O Channel by the mainframe from a selected optical disk 20, and, after processing, the revised data can be written out through the I/O Channel 34 to unused sectors of the optical disk for permanent storage. The retrieval of virtual tapes is inherently much faster than retrieval of magnetic tapes, since robotic access to, and random access within, the collection of virtual tapes on the optical disk eliminates the time consuming delays associated with magnetic tape retrieval and serial access functions.

In addition to the planned overhead, there is some overhead due to defects in the media. These defects are automatically corrected by "sector slipping". The defective sector is skipped and the data placed in the next sector. No empty sectors are set aside in advance to accommodate the sector slipping. In the event of sector slippage, MOST accounts for the slippage by updating pointers after each write operation. By updating the pointers, MOST does not need to keep track of accumulative slippage amounts. The media manufacturers expect a defect overhead of approximately two percent.

The MOST disk drive uses the Direct Read During Write technique for write error detection. This mechanism reads the data as it is written onto the disk. The data which is read back is processed by the error correction circuitry. If the sector is found to be bad, the data is written in the immediately following sector. This Direct Read During Write technique results in a high speed write capability even in the presence of errors. Some systems are required to return to a just written sector and read the data to check for errors. This results in a lost revolution and means that the data must be written many sectors or tracks away if it was in error. This causes more revolutions to be lost as seeks are performed. Direct Read During Write eliminates these difficulties.

MOST makes the benefits of Write Once Read Many (WORM) optical mass storage technology while retaining the use of existing IBM programs and processes. WORM optical technology offers unique benefits for large scale users including high density for manipulating large databases, stable media for long life applications, tamper proof media for providing an automatic audit trail for secure data, removable media for archival storage, small system footprint per online capacity for physical space savings and high reliability for error rate less than one bit per thousand.

LMSI provides a warranty with their media. This warranty specifically provides for one giga byte of storage per side and a storage life of thirty years. The LMSI media is preformatted and no additional formatting of the media is required to enable it to be used in MOST. However, the LMSI cartridge is thick which reduces the amount of media which can be put in a jukebox and the LMSI read transfer rate is slower than Optimem or Hitachi.

Optical Disk Drives

MOST 10 incorporates the optical disk drives from Laser Magnetic Storage International, their model LD1200. There is the possibility of incorporating drives from other suppliers. The industry has standardized the SCSI interface for optical disk drives 16, making it relatively easy to migrate to the best available product. The MOST controller 14 uses a standard SCSI interface to communicate with the optical disk drives 16. The use of this interface makes the unit relatively media/drive independent.

Each optical disk drive 16 is a single spindle removable media optical disk drive. Two optical drives 16 are the logical equivalent of the IBM 3480-B22 dual transport tape drive. Each drive contains the mechanical elements necessary to load, spin, and access the media. A solid state laser diode provides the energy for reading and writing the optical disks. Electronic circuitry and a microprocessor controller read and write the media as directed via the SCSI interface port 17. The optical disk drive 16 is interfaced to the controller 14 by means of the SCSI interface 42. This provides a convenient universal interface. The LMSI drive is preferred. The drives 16 can be either LD1200 type (non-jukebox) or LD1250 type (jukebox) without restriction. An LMSI drive is specified to transfer data at two-hundred-and-sixty-two kilo bytes per second in both write and read mode. MOST 10 operates this type of disk drive 16 in auto rewrite mode, which is faster than auto reallocate in the presence of write errors.

The four physical switches on the front of the optical drives 16 are set at installation. The start switch should be depressed. The write protect switch should not be depressed. The control module address switch is set to SCSI address 0–3, and the drive address switch is not used.

Operator Consoles

MOST 10 uses the ports 25, 27 and 29 for the operator interface, driving two consoles 24 and 26 locally, or driving one locally and the other remotely via the modem 56. In most cases, it is not necessary for an operator to physically handle the media or to be present at the jukebox 18 to operate MOST 10. A remote console can also be used as the primary console and may be up to four-hundred feet from MOST 10. The dual console support allows for operation of the system while system monitoring or diagnostics are performed through the second console. The remote console 26 can be used through the built in modem. The built in modem allows a remote user to access the system via telephone. A switch enables this function. The switch is on the controller 14. The integral modem 56 provides the advantage of being able to perform these monitoring or diagnostic tasks from a distal location, such as a regional service center or factory.

MOST 10 includes an operator console which may be a D11 video display terminal with keyboard which serves the function of the operator setup panel on IBM 3480 A22 units. The primary video display console 24, with a keyboard and connected to the controller 14, provides visual display and control as simulated operator control panels of the emulated tape drives. The displays are similar to those associated with the tape drives of the IBM 3480. The messages can show drive status, error information, and other action information sent by either the drives 16 or the attached host processor 12.

Jukebox

The function of the jukebox 18 is to store disks in physical slots until the disks 20 are requested by the operator or host, and then to mount or dismount the disks 20 into the optical drives 16. The functionality of the controller 14 ensures that each optical disk 16 appears to the host 12 as a collection of one or more virtual tapes. Each virtual tape has a volume and serial number according to IBM convention. A virtual tape can be selected by the operator for mounting from a directory on the MOST operator console 24. Mount messages may also be sent by the attached host processor 12. If the requested volume resides on a disk which is not currently mounted, the disk 20 will be retrieved from its storage slot by the robotics of the jukebox 18.

Jukeboxes 18 are robotic systems able to manipulate optical disk cartridges 20, by moving the cartridges 20 among storage slots and the disk drives 16. The jukebox 18 is controlled via a separately controlled interface such as the RS232 port 19. The optical disk drives 16 are controlled by a separately controlled SCSI interface port 17.

The 1800 series jukebox from Cygnet Systems is preferred. It is a high speed media handler which supports LMSI, OSI, Optimem and Hitachi optical disk drives. The jukebox 18 will hold ninety-five disks 20 with one drive or will hold seventy-five disks with four drives installed. The Cygnet 1800 jukebox 18 is controlled via the RS232 port 19. The Cygnet jukebox 18 is a dual cartridge transport mechanism and has the ability to overlap commands for archiving at high speed. The MOST controller 14 takes full advantage of these features to optimize system performance.

The jukebox 18 can hold up to ninety-five optical disks with one optical drive 16 providing a storage capacity of two-hundred giga bytes, or eighty-nine disks with two optical drives 16 providing a capacity of one-hundred-and-eighty-seven giga bytes with two drives. The optical drives 16 are typically mounted inside the jukebox 18 on slides accessible from the outside. The drives 16 can be installed and removed without disassembly of the jukebox. The controller 14 is bolted to the floor of the jukebox and is also accessible without disassembly of the jukebox modules. The assembled controller 14 is leveled and positioned on the raised floor with tag and bus cables entering through an opening in the bottom and attaching to the controller rear panel. Non-existent drives 16 are emulated as offline tape drives.

The jukebox 18 is controlled by an intelligent RS-232 controller serial I/O board 44. This serial I/O board 44 is capable of issuing the command strings necessary to drive the jukebox 18. The response strings that the jukebox 18 returns are saved in SBC VME Bus memory of the SBC 40 and the SBC 40 is interrupted to interpret them. In this way the SBC 40 is freed from the burden of polling necessary when utilizing on-board RS-232 ports. The Cygnet Jukeboxis preferred because it is RS232 controlled, is drive media independent, has high capacity for both drives and media, is high speed, is reliable, and is maintainable.

Power Supply

The power supply 22 is a high reliability five-hundred watt switching power supply. Eighty amps are provided on the plus five VDC line 23*a*. Eighteen amps are provided on plus twelve VDC line 23*b*. Six amps are provided on minus twelve VDC line 23*c*. The power supply 22 is field selectable between one-hundred-and-fifteen VAC and two-hundred-and-thirty VAC configurations. Three fans, not shown, cool the MOST electronics and the power supply 22.

Single Board Computer

The General Micro System Inc. GMSV06 Single Board Computer is the preferred SBC 40 and controls all operations of the controller 14. The board uses jumpers labeled as follows: W1 is ON for System Controller Enabled; W3 is ON to Select EPROM 27256 or 27512; W5 is ON for Clock Battery Enabled; W8 is ON for Interrupt Request 1 Enabled; W9–W14 are ON for Interrupt Requests 2–7 Enabled; W16–18 is ON for Bus to Dram Address Range; and all other jumper positions are to be considered off or disabled. The primary intelligence of the controller 14 is the SBC 40. The SBC 40 is based on a ten mega hertz 68010 microprocessor. This processor runs its code from SBC memory comprising two mega bytes of no-wait state, dual-ported RAM which is available to the SBC processor and to other VMEBus devices.

The SBC 40 is the system controller for the VMEBus 46 handles the interrupts. These interrupts are central to all VMEBus based I/O operations. The SBC 40 interprets interrupts from each I/O processor including the VMEGate 36, the SCSI controller 42, the RS-232 serial I/O processor 44, etc. and coordinates them to route data between the I/O channel 34 and the optical disk drives 16.

The SBC 40 is also used for the operator interface by translating operator requests to VMEGate and SCSI commands. In MOST 10, the SBC 40 also maintains the disk directory on the hard disk 50 by updating the disk directory as virtual tapes are created or deleted, or when disks 20 are imported or exported from the jukebox 18. The SBC 40 is responsible for the automatic mounting of virtual tapes based on mount messages.

The SBC 40 has an on-board SCSI interface which is used to communicate with the floppy and hard drives over SCSI bus 17a. This SCSI interface can be used to communicate with the optical drives 16, but this would consume considerable processor time and is not used for this purpose in the preferred form of the invention. The SCSI interface bus 17a for the magnetic peripherals resides on the SBC 40 and is routed through the I/O board 54. The SCSI interface based magnetic media controller board 48 is connected to the floppy and hard disk drives 50 and 52.

VMEGate

The channel interface with the host computer 12 is performed by the VMEGate 36. The VMEGate 36 is a two card set and is based upon the VMEBus 46. The VMEGate 36 is a high performance bit-slice machine. The VMEGate processing is based on a sixteen bit ALU and a twelve bit microsequencer. These devices run at six mega instructions per second providing response time on the channel within one-hundred-and-sixty-six nanoseconds.

The VMEGate 36 has a bit slice design using a sixteen bit 29101 ALU with a 2910 sequencer. The VMEGate 36 is controlled by a writable control store having four-thousand-and-ninety-six words of forty-eight bits. PALs are used extensively to accomplish specific functions at high speed, the Automated Data Transfer circuitry being an example. The VMEGate 36 transfers data over the I/O channel 34 using Automatic Data Transfer circuitry. This circuitry allows data rates on the channel to range from interlocked to four-point-five mega bytes per second data streaming.

The VMEGate 36 provides control of the IBM channel 34 under the supervision of the SBC 40. Data is transferred to the cache memory 38 by the bit slice processor in the VMEGate 36. On the VMEBus 46, the VMEGate 36 appears as both a master and a slave. As a master, the VMEGate 36 is capable of transferring data to and from cache memory 38 at fifteen mega bytes per second in block mode. Internal FIFOs are used to synchronize data transfers between the I/O channel 34 and the VMEBus 46. The difference in speeds between the transfer rates on the VMEBus 46 and the I/O channel 34 allow two channels to be supported at full data streaming speeds without approaching the VMEBus bandwidth limits.

The VMEGate 36 receives its commands through an SBC/VMEGate slave interface and accepts them through a handshake in SBC memory accessible though the VMEBus 46. Upon completion of commands, the VMEGate 36 will interrupt the SBC 40 at either interrupt levels four or six. The VMEGate interrupts are also used to alert the SBC 40 to channel activity and commands. The VMEGate 36 interrupts are placed at the highest level of priority so that the channel 34 is never kept waiting for other SBC processing to complete. The VMEGate uses a RAM look-up table to recognize its address and to quickly vector to code that interprets Channel Command Words (CCWs).

Figure 3A:
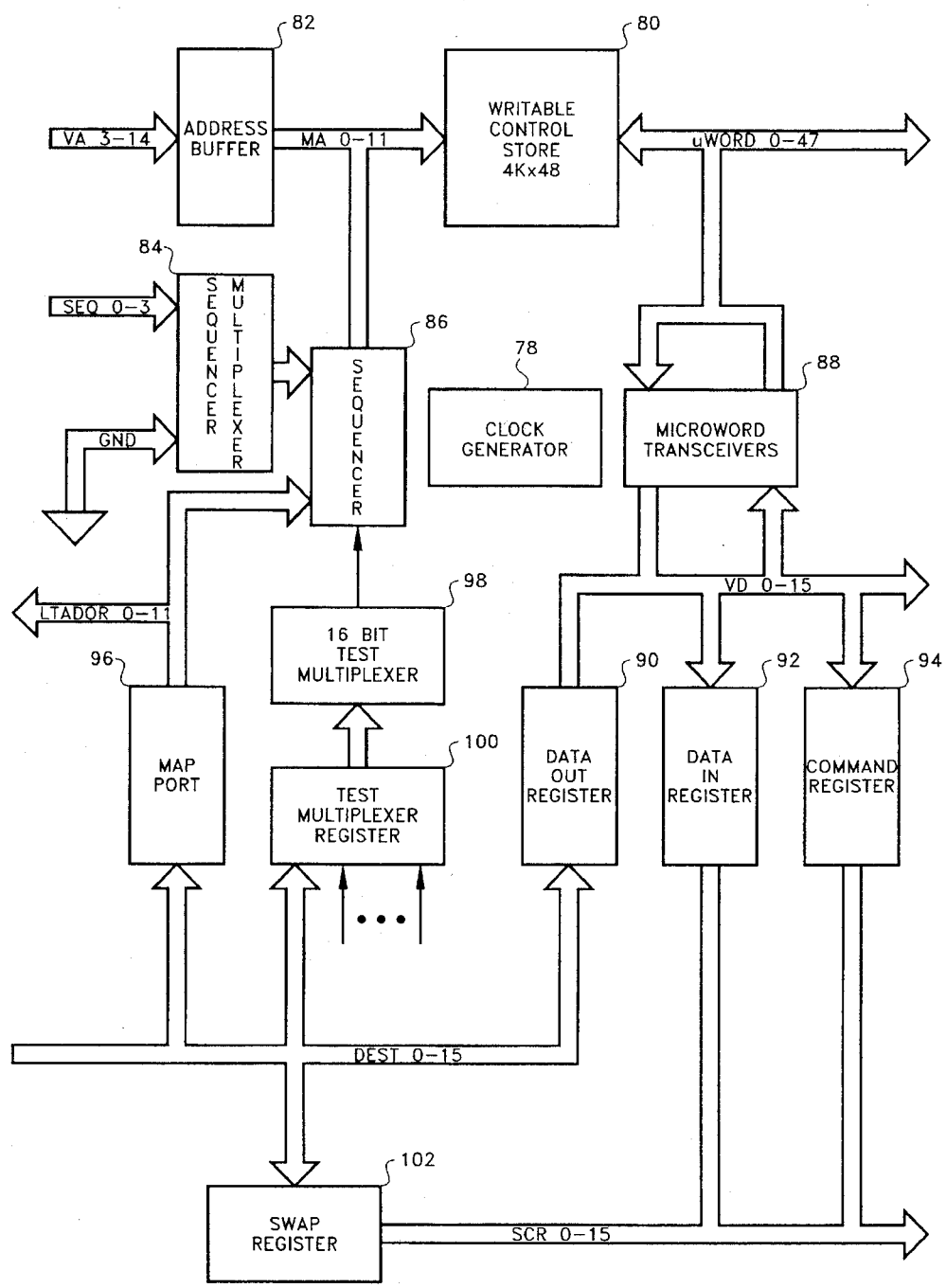
FIGS. 3a and 3b are block diagrams of the prior art VMEgate processor board.
Figure 3B:
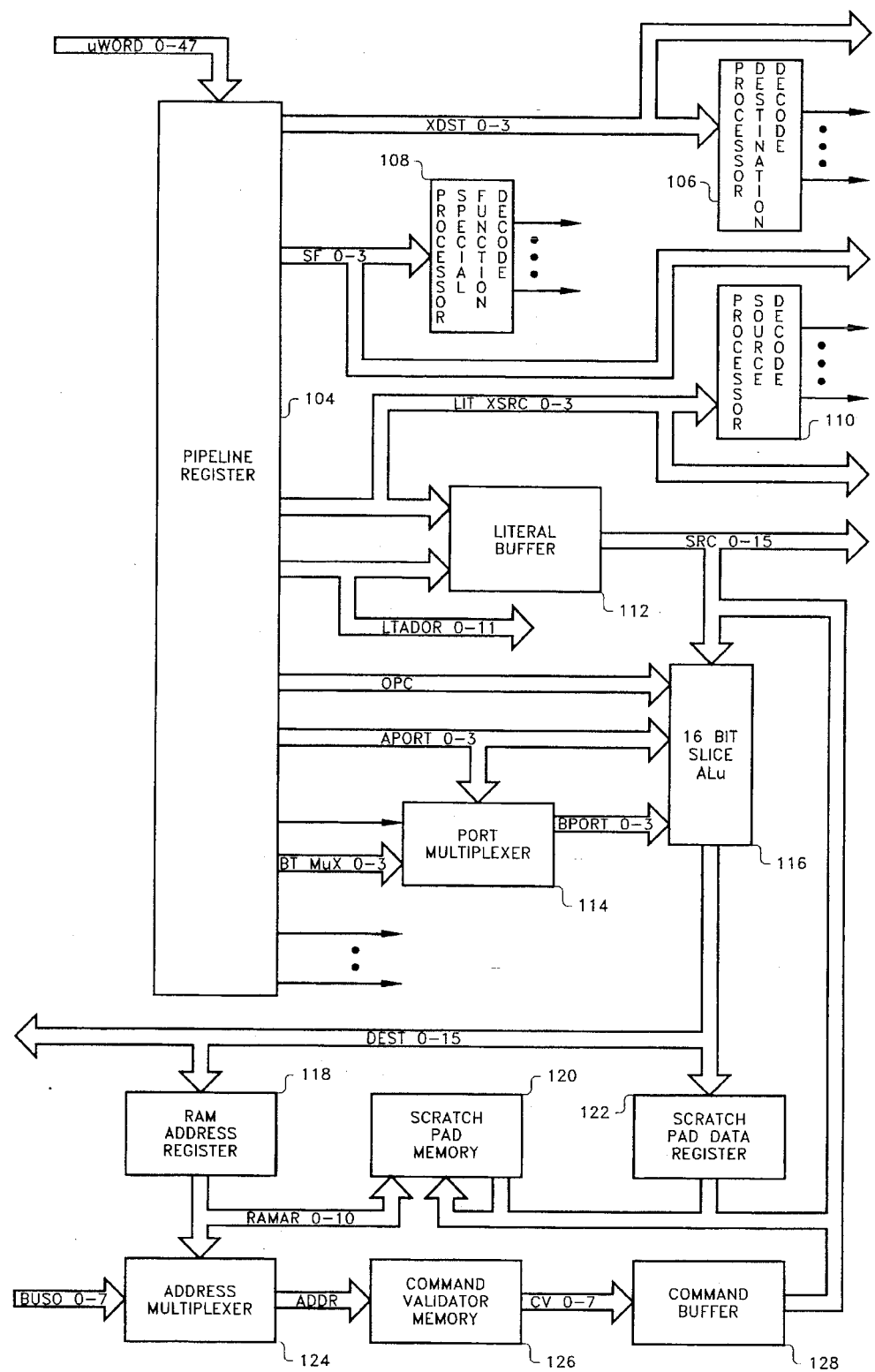
Figure 4A:
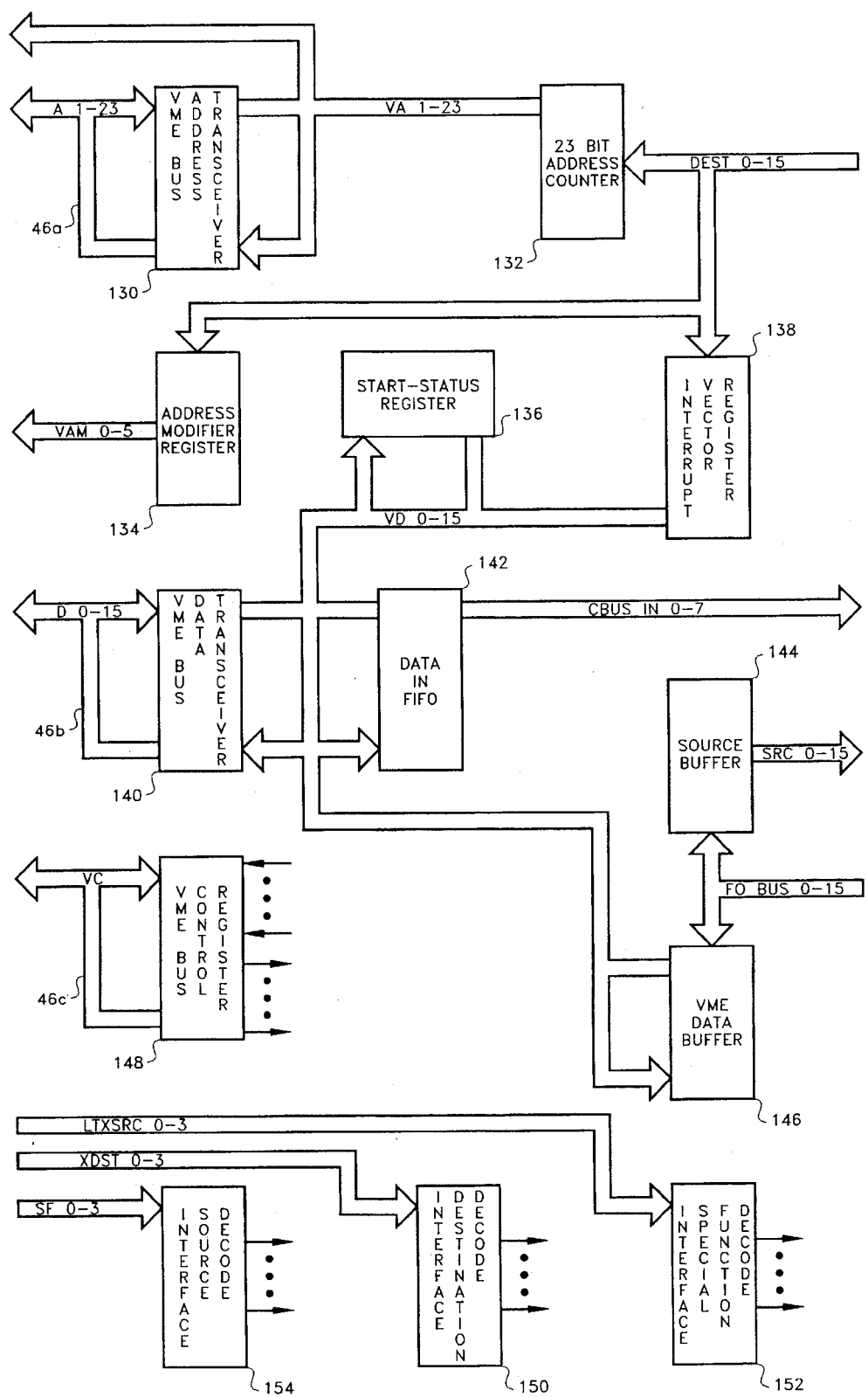
FIGS. 4a and 4b are block diagrams of the prior art VMEgate interface board.
Figure 4B:
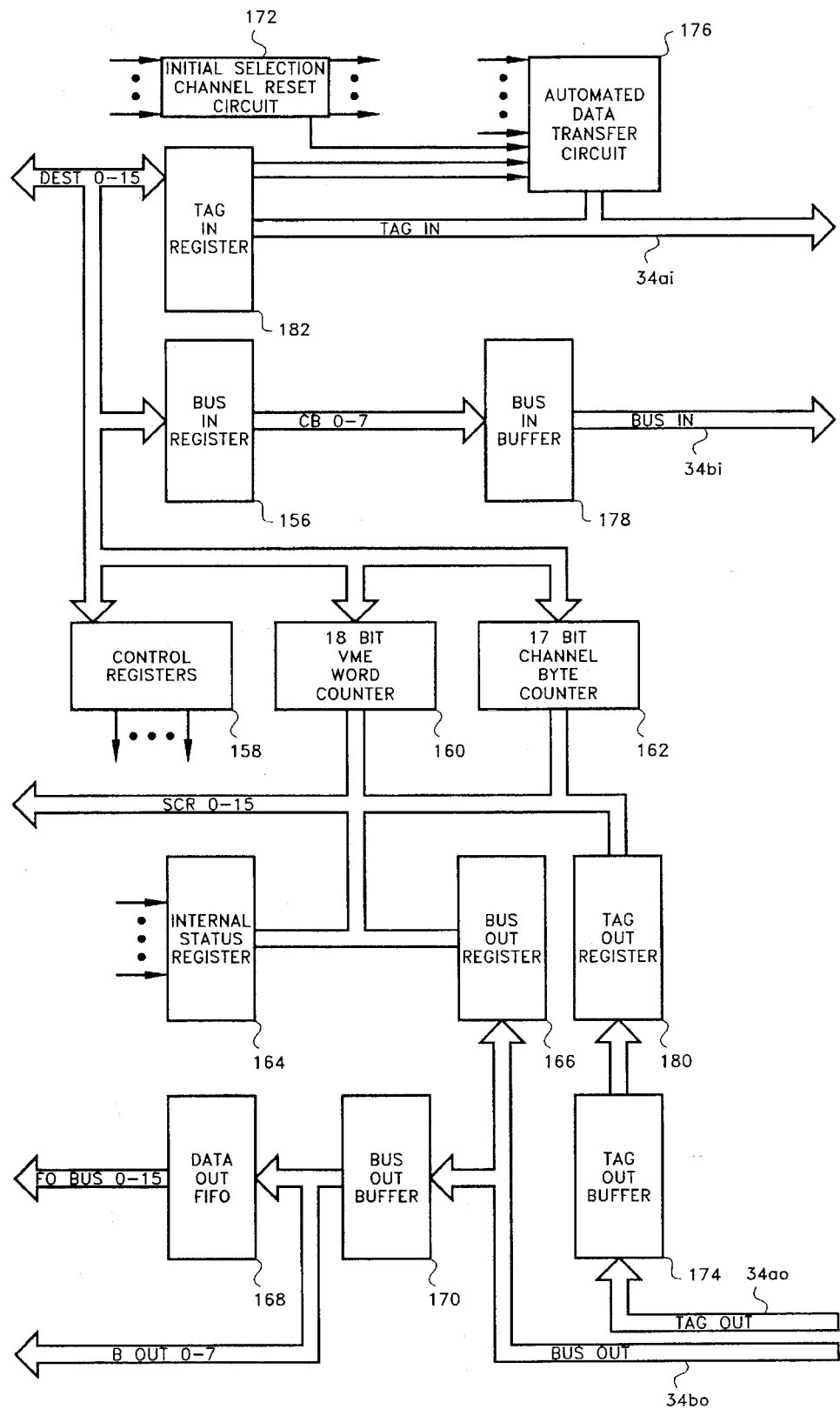

The VMEGate 36 is a plug-in VME processor board and interface board card set. This card set plugs into two slots of the chassis card cage. The processor board, depicted by way of block diagram on FIGS. 3a and 3b comprises a Clock Generator 78, Writable Control Store 80, Address Buffer 82, Sequencer Multiplexer 84, Sequencer 86, Microword Transceivers 88, Data Out Register 90, Data In Register 92, Command Register 94, Map Port 96, 16 Bit Test Multiplexer 98, Test Multiplexer Register 100, Swap Register 102, Pipeline Register 104, Processor Destination. Decode 106, Processor Special Function Decode 108, Processor Source Decode 110, Literal Buffer 112, Port Multiplexer 114, 16 Bit Slice ALU 116, Ram Address Register 118, Scratch Pad Memory 120, Scratch Pad Data Memory 122, Command Multiplexer 124, Command Validator Memory 126, and Command Buffer 128. The interface board, depicted by way of block diagram on FIGS. 4a and 4b comprises an Address Transceiver 130, 23 Bit Address Counter 132, Address Modifier Register 134, Start Status Register 136, Interrupt Vector Register 138, Data Transceiver 140, Data In Port FIFO 142, Source Buffer 144, VME Data Buffer 146, VME Bus Control Register 148, Interface Destination Decode 150, Interface Special Function Decode 152, Interface Source Decode 154, Bus In Register 156, Control Registers 158, eighteen Bit VME Word Counter 160, seventeen Bit Channel Byte Counter 162, Internal Status Register 164, Bus Out Register 166, Data Out Port FIFO 168, Bus Out Buffer 170, Initial Selection Channel Reset Circuit 172, Tag Out Buffer 174, Automated Data Transfer Circuit 176, Bus in Buffer 178, Tag Out Register 180 and the Tag In Register 182.

Channel Interface Board

The function of Channel Interface Board (CIB) 64 is to provide for the connection of the IBM I/O Channel 34 to the MOST Controller 14. It is an active device requiring +5 VDC from the power supply 22. The I/O Channel 34 can be daisy chained with up to seven other IBM channel devices. One CIB 64 is required with a VMEGate 36 to make a complete channel attachment. When the second CIB 64 is added to a VMEGate 36 the result is the addition of a two channel static switch. This is a desirable feature in that it allows redundant access to the unit or access from either of two channels from two or one host computers 12. When two VMEGates 36 are included in the controller 14, it is possible to have four CIBs 64, and thus, four channels. Only one of the two CIBs 64 for a VMEGate can be active while the other appears to the mainframe computer 12 as an offline device.

The CIB 64 has one jumper for selecting one of a plurality of channel. The CIB 64 contains the receiver driver circuitry necessary to properly interface with the I/O channel 34. The mainframe computer 12 communicates with the peripheral control units through two cables, referred to as BUS and TAG. The BUS cable contains all the data lines while the TAG cable contains all the control signals. The BUS and TAG of the I/O channel 34 lines are connected to the CIB 64.

Also contained on the CIB 64 is the Select Propagate Relay. The purpose of this relay is to insure that the I/O Channel 34 will continue to operate even with the VMEGate 36 removed from the VME bus 46. A switch is also provided on the CIB 64 so that the board can be taken offline. Also, a two position jumper is provided so that two CIBs 64 may be used with one VMEGate 36.

SCSI Board

The SCSI board 42 is an ANSI, (American National Standards Institute defined interface X3.131 1986 Revision 17B), interface board and enhances the data transfer rate between the cache memory 38 and the drives 16. The SCSI board 42 provides intelligent control of the SCSI transfers to and from the optical drives 16. The SCSI interface on the optical disks 16 is connected to the SCSI board 42 through port 17. The SCSI board 42 is capable of maintaining different commands for each of up to seven different SCSI devices. The SBC 40 sets up SCSI Command Descriptor Blocks in the SBC memory and then sets up pointers and flags relating to these commands for the SCSI board 42 to execute. The SCSI board 42 is capable of having one command outstanding for each attached device.

The Ciprico Rimfire 3500 SCSI Host Bus Adapter Board is the preferred SCSI board 42 and has the BUS REQUEST/ GRANT jumper block, numbered 0–3 with each column consisting of six pins. The settings are as follows, columns 0, 1, and 2 are set between pins 4 and 5. The last column 3, is set between 1 and 2, 3 and 4, 5 and 6. The following is the jumper configuration to set board address to VME address FF0400: 8 is off, 9 is on, 10 is off, and 11–15 are on.

Data transfers occur between cache memory 38 and the SCSI device attached to the SCSI interface port 17. The SCSI board 42 is capable of supporting SCSI transfers at four mega bytes per second in synchronous mode and one-point-five mega bytes per second in asynchronous mode. Through the use of FIFOs, the SCSI board 42 can transfer data over the VMEBus 46 at thirty mega bytes per second in block mode. As with the VMEGate 36, the use of FIFOs allows the SCSI board 42 to transfer at full speed within the VMEBus bandwidth.

The SBC 40 is interrupted by the SCSI board 42 upon completion of each command. The SCSI board 42 senses automatically for commands that return Check Condition status. Other errors are reported as well. SCSI intelligent I/O facilities off-load processing from the SBC 40 allowing more time for the SBC 40 to coordinate the channel 34, optical drive 16, hard drive 50 and operator activities. The use of additional SCSI interface boards 42 provides for additional jukeboxes in the preferred form of the invention. However, MOST 10 could be modified such that the disk drives 16 are controlled through the SBC SCSI interface in a pedestal configuration.

Cache Memory

A VME bus memory card is provided to serve as cache memory 38. The 3480 tape subsystem is a cached device which utilizes read-ahead and write-behind techniques. MOST 10 uses similar techniques to improve performance on the channel 34. The SBC 40 is responsible for cache management, while the VMEGate 36 and SCSI board 42 operate via DMA in and out of the cache memory. The cache memory 38 is a high performance four megabyte dynamic RAM utilizing block mode transfers.

Data transfer between the cache memory 38 and the optical disk drive 16 is managed by the SBC 40. Cache memory 38 increases the effective transfer rates. The cache memory 38 provides for temporary storage and rapid transfer of data between the IBM mainframe 12 and optical drives 16. The cache memory 38 supports burst channel transfer rates of three or four-point-five mega bytes per second for up to twelve mega bytes of data.

The Micro Memory Inc. MM 6210D memory module board is preferred and is configured with a combination of three switches and two jumpers. The switches are set closed for SW1 1-8, SW2, 1-5 and 7, and SW3 6, and the remaining switches are set opened. Switch 1 is used for Bank Selection, while switch 2 and switch 3 are used for Module Selection. The jumpers are labeled E1–E6 and are set between E2 and E3 and is used to select parity to BERR (Bus Error) on one group. The other group is set between E4 and E5 and is the parity error reset.

Serial I/O

The serial I/O board 44 includes an RS232 interface for transfer of command and status information between the SBC 40 and the jukebox 18 through the RS232 port 19. It is through the RS232 interface of the serial I/O 44 that the jukebox 18 is directed to mount the desired optical disk 20 in the appropriate drive 16.

The XYCOM XVME-420 Intelligent Peripheral Controller Module is the preferred serial input/output interface having four RS-232 ports and one IEEE-P959 expansion port. The jumper configuration is: J1 is ON between pin A and center pin for Bus Grant In; J2 is ON between pin B and the center pin for Bus Grant Out; J6 is ON between pin A and the center pin for Bus Request Out; J3 is ON next to J2 for Address Modifier Selection; J4, J5, J7, J8 are all on for Base Address Selectors; J9 is ON to set the PROM cycle timing; J10, J11, J12, J13, are set to indicate the memory size of the PROMS; J14 and J15 Indicate the memory size of the ram; and J18 is ON but not used.

The jukebox attachment is via an RS232 interface port 19. The port 19 provides a single point-to-point connection. Thus, multiple RS232 interface ports 19 are required to support multiple jukebox configurations. The five slot chassis typically has only one active RS232 interface on the Serial I/O 44 for the jukebox 16 and can therefor support only one jukebox. The twelve slot chassis may have up to four active RS232 interface ports 19 on the serial I/O board 44 to support up to four jukeboxes 18. The use of separate ports 19 for each jukebox allows multiple units to be controlled without performance degradation. The four RS232 ports 19 are driven by a 68000 microprocessor on the serial I/O board 44.

Magnetic Media Controller

The magnetic media controller 48 provides the control function for reading and writing data to the SBC 40 from the floppy disk drive 52 and hard disk drives 50, through the SCSI bus 17a. OMTI 5200 SCSI controller card is preferred and manufactured by Scientific Micro System Inc. The OMTI 5200 is capable of controlling up to four drives two of which may be five-point-two-five inch or three-point-five inch Winchester hard drives and up to four of any combination five-point-two-five inch or eight inch floppy drives. The jumpers identified as W0, W1, W3, W4 and W7 must be set as follows: W0–4 is on and sets SCSI ID to 4 W1 is set on pin 1 and 2, and enables parity. Both W3 & W4 are on and set the Winchester disk sector size, which is equal to nine multiplied by one-thousand-and-twenty-four bytes per sector; and W7 is on and denotes the Logical Unit Number 7.

Hard Disk Drive

The Seagate ST-251-1 is preferred and is a forty mega byte Winchester Hard Drive 50 which is jumpered to set this drive as DS1 for Drive Select 1. MOST 10 is based on the concept of virtual tapes. The host computer 12 has no knowledge of the physical media, and keeps no record of the optical disks themselves. When the host computer 12 or an operator requests a certain volume serial number (VSN), MOST must determine which physical optical disk is required, its location and orientation. This requires that a disk directory be maintained by MOST. The disk directory which keeps track of virtual tapes is stored on the Winchester hard drive 50. This hard disk drive 50 provides forty mega bytes of data storage with an access time of twenty-eight ms.

Floppy Disk Drive

The NEC FD 1050 series five-point-two-five inch floppy disk drive 52 is preferred and has jumpers on the drive which are factory set except for the DRIVE SELECT, which is set for drive select 2. One IBM PC compatible floppy drive 52 is used for down loading the software for the SBC 40 and the microcode for the VMEGate 36. The IBM PC format was chosen so that floppy disks can be formatted and duplicated offline on an IBM compatible personal computer (PC). Floppy disks can also be copied and backed up. Files can be altered using standard PC software. This feature provides the ability to modify of SBC software and VMEGate microcode using PCs.

Operation

When the controller 14 is powered on, or reset, the SBC 40 automatically loads and begins executing the SBC software in the floppy disk drive 52. The SBC software includes modules to control the optical disk drives 16, jukebox 18, and input/output channel 34, as well as performing the IBM 3480 cartridge tape drive emulation. Application of power begins an automatic initialization sequence by the controller 14. A floppy disk is booted at power on. MOST 10 then proceeds to read several files in sequence and perform diagnostics. The operator is kept informed on the progress of this initialization but has no active role to play.

The jukebox 18 is then initialized and configured. Each storage slot is checked for the presence of a disk cartridge and the disk directory is created. The disk directory is used to ensure that the jukebox 18 does not attempt to store a cartridge in an already occupied slot. When the initialization process is complete, the console 24 has a full operational display depicting the A22 Operator Setup Panel of an IBM 3480 A22 Control Unit and the four B22 drive displays.

The cache memory 38 increases the effective data rate of the optical disk drives 16. The cache 38 is partitioned among the optical disk drives 16 under management of the SBC 40 of the controller 14. The SBC 68010 microprocessor manages the controller 14 while a the VMEGate 36 manages channel transfers. Data is transferred between cache 38 and the channel 34 under control of the VMEGate 36. Data is transferred between the cache 38 and the SCSI bus 17b of the optical drives 16 through, and under control of the SCSI interface board 42 after the SBC 40 has setup and initiated the data transfer.

The microcode of the VMEGate 36 controls the channel 34, responds to selections, validates addresses and commands, prepares and presents status and transfers data to and from the cache memory 38. The SBC 40 manages cache memory 38 and the optical disks 16. The SBC 40 carries out all tape motion commands through buffered manipulations. The SBC 40 also manages the logical interface of the operator consoles 24 and 26, and jukebox 18. The SBC 40 initiates SCSI data transfers to and from the optical disks 16.

Data is transferred by DMA once initiated. During read operations, the cache 38 enables the controller 14 to give rapid responses to read commands of the host computer 12 by prereading multiple records from the drives into the cache 38. Similarly, during write operations, multiple records can be written from the host computer 12 into the cache 38.

MOST 10 was designed to minimize the requirement for tape operators. By retaining the most frequently accessed data in the jukebox 18, the number of operator assisted mounts can be significantly reduced. This is accomplished by MOST 10 acting directly upon the mount requests issued by the host computer 12 in a 3480 full function environment. The jukebox 18 is able to respond to a mount request within ten seconds, that is, the volume will be ready for host access within ten seconds of the receipt by MOST of the mount request. Consequently both operator and host time are conserved.

Optical media 20 can be in the drive 16, in which case the virtual tape is online, or in the jukebox 18, in which case the virtual tape is within ten seconds of being online, or on the shelf, in which case an operator will be required to import the media perhaps requiring a few minutes. The jukebox 18 is designed to perform two robotically controlled operations concurrently. That is, one drive can be unloaded at the same time the other drive is being loaded. The controller 14 is capable of controlling up to four jukeboxes 18 concurrently. The jukebox 18 provides the functionality of the operator of the IBM 3480 subsystem. The jukebox 18 manages the media and performs the media mounts and dismounts. Mount messages sent by the attached host computer 12 to MOST 10 are automatically interpreted and acted. If the requested virtual tape resides on the a disk in the drive, then it will be "mounted" through the action of the controller 14. If the requested volume resides on a disk which is not currently in the drive, then the disk will be retrieved by the jukebox 18, and then mounted. When a requested volume is not contained in the jukebox 18 an operator will be required to make the mount. This process is assisted by MOST 10 which will indicate to the operator the identification number of the required optical media. The operator must then retrieve the media and import it into the jukebox. The jukebox is not opened, rather the media is inserted through the "mailbox" opening of the jukebox. The incoming disk 20 is logged into the jukebox 18 and made available i.e. mounted. The import process requires less than twenty seconds.

The MOST controller 14 is also able to seek directly to a record or file without the necessity of performing intervening sequential reads. This random access nature of the optical media is preserved through the retention of tape structures in local memory while tapes are mounted. The Controller 14 implements the high speed record search feature of the IBM 3480 as a random access on disk. Additionally, one key press will ready a drive, or rewind or unload a virtual tape. Mounting a virtual tape will most often be accomplished automatically. The operator can mount virtual tapes automatically by pressing a few keys. Also, one key provides a display of the virtual tapes contained on the loaded disk.

Media written on any one drive 16 can be read/rewritten by any other drive 16. All information required to locate and read data is contained on the disk itself. No other media or data are required to accompany the disk to enable reading it on a different drive. Individual virtual tapes containing any type of digital data can be copied from one disk to a second disk in the same jukebox through the controller without need for host intervention. Entire disks can be copied in this way. Individual virtual tapes can be copied from one disk 20 in a first jukebox 18 to a second disk 20 in a second jukebox 18. If the second jukebox 18 is attached to a second MOST controller 14, then the transfer can be made through the I/O channel 34. This appears to the host as a tape-to-tape copy operation.

Copying a virtual tape to DASD is exactly the same as copying a real tape to DASD. This is one of the advantages of the tape emulation approach. The storage management facilities already in place to handle tape to DASD operations are compatible with MOST. Copying to magnetic tape can be accomplished over the I/O channel 34. This operation appears to the host computer 12 as a standard tape-to-tape copy operation. When virtual tapes are created, the operator has the option of limiting the storage capacity of the virtual tape to a specific size marked by a logical EOT. This feature can ensure that a virtual tape can be copied to a single real tape.

Operation Modes

MOST 10 operates in either of the system or manual mode which are differentiated by the way in which the virtual tapes are handled. The mode for each drives is individually set. For example, one drive can operate in system mode, while another operates in the manual mode.

The system mode is the more complex than the manual mode. In the system mode, MOST 10 responds automatically to mount and dismount requests from the host computer 12. If a jukebox 18 is part of MOST 10, this response may include robotically retrieving the optical disk 20 on which the requested virtual tape resides. MOST 10 interprets mount and demount messages from the host 12 and locates and manages VSNs autonomously. No operator set up or intervention is required. When MOST 10 receives a mount message, it automatically locates the requested VSN and mounts it in the drive 16. With a jukebox 18, this may involve consulting the disk directory on the magnetic hard disk 50 to determine the disk location and side on which the virtual tape VSN is recorded. In the system mode, MOST 10 also employs dynamic drive allocation to eliminate the need for physically exchanging disks when a virtual tape mount request specifies a virtual tape that is contained on a disk 20 residing in a drive 16 that is allocated to a different channel address.

In the manual mode, the operator responds directly to all mount and demount requests received from the attached host processor 12. The manual mode is convenient for MOST systems without a jukebox 18. The user has direct control over each mount and dismount. In manual mode, the operator mounts each virtual tape at the moment it is required. In this case, the operator may work off of a job control sheet which tells what tapes to mount or be prompted by mount messages from the host computer 12.

When a mount message appears, the operator must determine if the requested volume serial number is on the currently mounted disk. This task can be done by MOST 10 at the operator's request. The operator uses the F11 function key to indicate LOCATE VOL/SER. MOST searches the tape directory of the mounted disk for the volume and serial number currently in the mount message. MOST then indicates FOUND or NOT FOUND. If found, the operator mounts the volume using the F13 function key of the operator console 24. If not found, the operator uses the F15 function key to eject the disk so a new one can be loaded.

If the mount is not in response to a mount message, the operator must specify the volume and serial number using the F11 function key followed by the six character volume and serial number. The operator can mount a volume other than that which appears in the mount message by depressing the ESC key and then the F11 function key and then entering the volume and serial number. The area below the REW, UNL, RDY/NOT READY switches is used to display the progress of these actions. The manual mode is characterized by the operator having to make each switch actuation.

MOST eliminates the need for many operator tape mounts. MOST 10 system with two drives 16 is the equivalent of eight-hundred-and-ten mounted reels of tape. When mounts are required, MOST 10 verifies that the optical media was imported into the jukebox 18 to ensure that the requested volume was provided. Importing errors are found before processing can begin.

Data safety is ensured by key lock access into the jukebox 18. In addition, the data is write protected in three ways. Write protection is by a drive write protect switch, by a media cartridge write protect switch, and by a virtual write protect indicator which can be recorded in each individual virtual tape.

Error Handling

Error detection in MOST 10 is provided. In the controller 14, parity is used to check the integrity of data. Parity is of course included on the I/O channel 34, and is also used in and out of cache memory and across the SCSI interface bus 17b. The jukebox 18 also employs error detection both on the RS232 communication link 19 and internally.

The optical disk drives 16 use Reed-Soloman ECC to ensure the integrity of recorded data. All data is written to the disk with ECC check sums, which are used to detect and correct errors during both read and write operations. The use of these techniques provides an error rate of less than one bit in a trillion at the end of the thirty year media life time.

Errors from each drive 16 can be logged by the mainframe in standard EREP format. Where possible, specific errors are translated into the most reasonable magnetic tape equivalent. For example, a command to backspace at BOT is logged as an equivalent magnetic equipment error.

Emulation

Tape emulation means that commands sent via the I/O Channel 34 are interpreted and handled as if MOST 10 were a 3480 tape system. The emulation of the 3480 is accomplished by the controller 14 responding to channel commands as would a 3480 magnetic tape subsystem. Host software which is compatible with the 3480 is compatible with MOST including the virtual operating systems, Job Entry Systems, D-Base-two database programs, and hierarchical storage managers. Programs written for the 3480 using full function support which manipulate the B22 displays for operator mounts will instead manipulate the jukebox 18. Hardware diagnostics for the 3480 will not in general run on MOST because there are specific implemental distinctions.

The emulation is accomplished through microcode in the VMEGate 36 and software in the SBC 40. The VMEGate 36 is responsible for all communication with the I/O channel 34, i.e. selection, commands, unit statuses, reselection and resets. The VMEGate 36 interrupts the SBC 40 when internal states need to be changed and when data is present on writes or when data is required on reads. The VMEGate 36 provides the flexibility required for emulation. For instance, an auxiliary set of CCWs (Channel Command Words) to augment the 3480 command set could be created. A "seek logical block address" command could be defined to allow true random access. Using the VMEGate 36 microprogramming flexibility, the emulation by MOST 10 system can be modified in response to user's needs or changing technology.

MOST 10 uses a disk directory to determine which disk 20 and side contains a particular VSN and where in the jukebox 18 the disk 20 is located. Because optical disks 20 can be exported and imported from the jukebox 18, the disk directory can change periodically. When a mount request for a particular VSN is received, the hard disk 50 locates the disk, side and storage slot of the optical disk 20. The jukebox 18 is then instructed to make a retrieval of the optical disk 20. When optical disk 20 is imported it is first mounted in an optical drive 16 for a tape directory read and then the hard disk 50 is updated. The hard disk 50 is also updated when a VSN is created or deleted. The jukebox 18 requires that the disk directory of disks 20 be maintained. Recorded on the hard disk drive 50 are the VSNs of every virtual tape in the jukebox 18. The disk directory can have several thousand entries.

There are two types of operations that cause the disk directory on the hard disk drive 50 to be accessed. The first type is operator initiated and the second is channel initiated. Operator initiated accesses are caused when new optical disks are added to or old ones deleted, or when a user wants to know which disks are in the library or wants to manually mount a particular virtual tape. Channel initiated disk directory accesses are caused by mount messages from the mainframe 12. In this case, the SBC software searches the disk directory for the location of the requested virtual tape. Once the virtual tape is found, the SBC software will cause the optical disk containing the virtual tape to be loaded and present appropriate status to the channel. The disk directory is capable of referencing millions of virtual tapes and tens of thousands of optical disks. A single virtual tape can be found in less than a second.

Information stored in the disk directory includes the history of the most recent access so that rarely accessed optical disks can be migrated out of the library and heavily used optical disks can be retained. Other information stored in the disk directory is the "pool type", which defines a given tape as being a scratch or a private tape. The scratch tapes are mounted in response to specific mount messages which request the next available scratch tape. Data is written on the scratch tape after which the pool type is converted to the private type. Virtual tapes can be assigned to scratch or private pools.

New optical disks 20 are brought into the library via function key requests from the console 24. Whenever a new optical disk 20 is imported, the disk directory is updated with all the virtual tapes stored on the new disk. If any virtual tapes already exist with the same name, the operator is prompted to rename the virtual tape or export the optical disk. Similarly, when a disk 20 is exported from the library, the disk directory is updated to indicate that the virtual tapes stored on the disk are no longer available locally.

When a disk 20 is imported to the jukebox 18, it is first read and cataloged. The disk identification and tape directory are read. These are entered into the disk directory. The disk 20 is then flipped and the opposite side cataloged. The disk 20 is then assigned to a free slot in the jukebox 18. During the course of operation, VSNs may be created or deleted. The disk directory is updated to reflect these operations. When a disk 20 is exported from the jukebox 18, the disk directory entries are deleted and the previously assigned slot is designated as free.

To achieve tape emulation, each optical disk contains one or more virtual tapes. These virtual tapes are created by an operator prior to their use by the mainframe. Once a virtual tape is mounted from those available on a given disk 20, no other virtual tapes on that disk may be accessed by the mainframe until the first virtual tape is dismounted. Each disk 20 represents "virtual" tapes. In the handling of virtual tapes, MOST 10 does not to limit in advance either the number of tapes or their length. A user is free to create a single virtual tape of one giga byte or hundreds of short tapes on a disk 20. The tape directory is flexible enough to accommodate a full range tap maps. The optical disk 20 is write once and pointers cannot be updated or altered once written and writing of partial sectors is not allowed. This means that some form of caching must be performed at least on the sector level. One of the key features of the optical disk 20 is its random access nature. The 3480 also employs a sequential seek feature which can be emulated using random access.

Dataset to VSN index is Maintained by the host using TMC, UCC-1 or similar programs. MOST has no responsibility for this function. VSN to optical disk directory is maintained by MOST on the hard disk drive 50 cross referencing virtual tape VSNs to physical media. This includes knowing the shelf or jukebox location of the media, the jukebox and slot position of the media, and the orientation side A or B of the media. Most maintains a system of pointers one each side of an optical disk pointing to user records for each virtual tape recorded on that side. The system of pointers include a disk Id, the tape directory and tap maps. The VSN tape Directory is maintained by MOST on each optical disk side. MOST maintains this tape directory for all of the VSNs recorded on the optical disk side. This tape directory points to a tape map for each virtual tape. The tape maps are maintained by MOST on each optical disk side. MOST maintains the system of pointers separate from the user records. This allows the tape maps to be loaded into MOST memory the entire time that the virtual tape is mounted. The system of pointers provides the pointers necessary to access any user record on the virtual tape. By reference to system of pointers, tape motion commands can be resolved to seek addresses on the optical disk. Keeping the system of pointers in local memory reduces accesses to the disk, and speeds sequential tape operations. The controller 14 stores tape maps of the virtual tapes mounted in each optical drive 16 in its local memory. The availability of the tape maps permits the controller 14 to make random access seeks on the optical disks 16 in response to tape motion commands. This enhances performance by eliminating sequential operations. When tapes are updated, e.g. records are rewritten or appended, the tape map is updated in local memory while the data is recorded on the optical disk 20. When the volume is closed, the updated tape map is written to the optical disk 20. Prior to ejecting an optical disk, the tape directory including tape data is written on the optical disk side. Contiguous user records may overlap physical sector boundaries on the media itself. The tape map pointers include sector addresses and offsets within the sectors to account for this overlapping.

The optical disk 20 is made up of one-thousand-and-twenty-four byte sectors. These sectors can be written and read sequentially from the start of the optical disk through to the end. The disks 20 can also be accessed randomly with the risk that rotational latency can occur while the read/write head is seeking. When writing, the sequential nature of the optical disk 20 provides a good emulation of tape activity. This is because successive records are written sequentially on tape.

With a normal tape emulation, the random access nature of the optical disk would not offer many advantages because the mainframe would only access the data sequentially anyway. However, the 3480 tape drive offers a special "Locate Block" Channel Command Word (CCW). This CCW allows the mainframe to select a particular record which the drive will search for in an offline manner. This random access feature allows the MOST system considerable advantage over a tape for this type of command. The tape map structure allows for random access, taking full advantage of this CCW.

Another constraint of the optical disk 20 is the Write Once nature of the media. Because of this, a virtual tape which has had data rewritten to it will not store the data sequentially on the disk 20 even though it must be read sequentially from the virtual tape. Once again the tape map, stored for each virtual tape on the optical disk, is used to keep track of where on the disks 20 each record is stored and the location within the virtual tape of tape marks.

The emulation using write once optical media means that the data structures which represent the tape must be managed. The data structure requires updating and random access to records and files. Write once means that an entire sector, one-thousand-twenty-four bytes on the LD1200 from LMSI, is written and cannot be altered once written the first time. A user cannot write half a sector and come back to write the second half at a later time, or add a pointer to the end of a sector after the sector has been written.

The individual manufacturer's drive characteristics influence the implementation of the emulation. Optical drives 16 are available with SCSI interfaces as a standard electrical interface in common at port 17. Unique attributes of the drives prevent a general solution applicable to all drive vendors. Error correction illustrates this point, in that, two error correction methods are employed, a write followed by a separate read, and a write with a simultaneous read. The Optimem drive represents the first method while LMSI represents the second.

The Optimem drive require that a write must be followed by a read to verify the data. If a single sector is written, one revolution time is lost before the sector rotates under the head to be read. If many sectors are written they can be written as a group, then read and verified as a group and the bad sectors rewritten, and of course reverified. With an LMSI drive a simultaneous read is performed when writing as a Direct Read During Write. If a sector is bad the data is slipped to the next sector and rewritten. In this scheme time is lost only when errors are detected. The disadvantage is that more rewrites will occur because the error correction circuit can not decide in time whether an error was detected, and because a sector which has correctable errors could be flagged as bad and rewritten. With LMSI, bad sectors are slipped. One cannot know in advance where a write will terminate. In any format, a certain number of sector slips must be allowed. With Optimem's autorelocation, a band of sectors are used to replace faulty sectors. One of the relocation sectors is mapped in to substitute for the bad sector. This introduces seek delays. Both methods have benefits. The Optimem is faster when reading. LMSI is faster when writing. LMSI is more stringent on errors, while Optimem is more conservative of media. The preferred emulation is based on the LMSI LD1200 drive.

The 3480 tape system uses specific delimiters to separate and identify data areas. The tape begins with a BOT (Beginning of Tape) and ends with an EOT (End of Tape). Files are separated by a tape marks (TM) and user records within files are separated by interblock gaps (IBGs). In addition to the user record, the 3480 record fields include preambles, prefixes, residual bytes, completion bytes, end of data marks and postambles. These fields are required for error correction and tape data synchronization. An emulation of the 3480 need not faithfully reproduce all these fields because many are stripped off in the tape subsystem and never made available to the host. The residual frame must be preserved in some form because it contains the logical id. Error detection and correction is done by the optical disk so all of the ECC related fields can be discarded. The BOT, TM, IBG, and EOT are essential and these delimiters are built into the emulation.

Each optical drive 16 in the system is emulated as one half of a 3480 B22 tape drive. In the 3480 emulation, each optical drive 16 in MOST 10 represents a single tape drive and one online channel address. The allocation between optical drives and channel addresses is soft and is allocated prior to the mounting of virtual tapes. While a virtual tape is mounted, the allocation between an optical drive 16 and a channel address is fixed. This allocation may be dynamically changed when a virtual tape is rewound and unloaded. When the mainframe requests a particular tape, it sends a mount message to the display of the 3480 drive. Under emulation, this message is displayed on the console 24. The 3480-A11 model appears to be a reduced speed version of the A22, it does not data stream, transferring data at only one-point-five mega bytes per second. MOST can operate in non data streaming mode as well, and can emulate the A11 model. With the exception of hardware specific diagnostic responses e.g. Format 19 sense data, the responses provided by MOST are identical.

Optical Disk Layout

Figure 6:
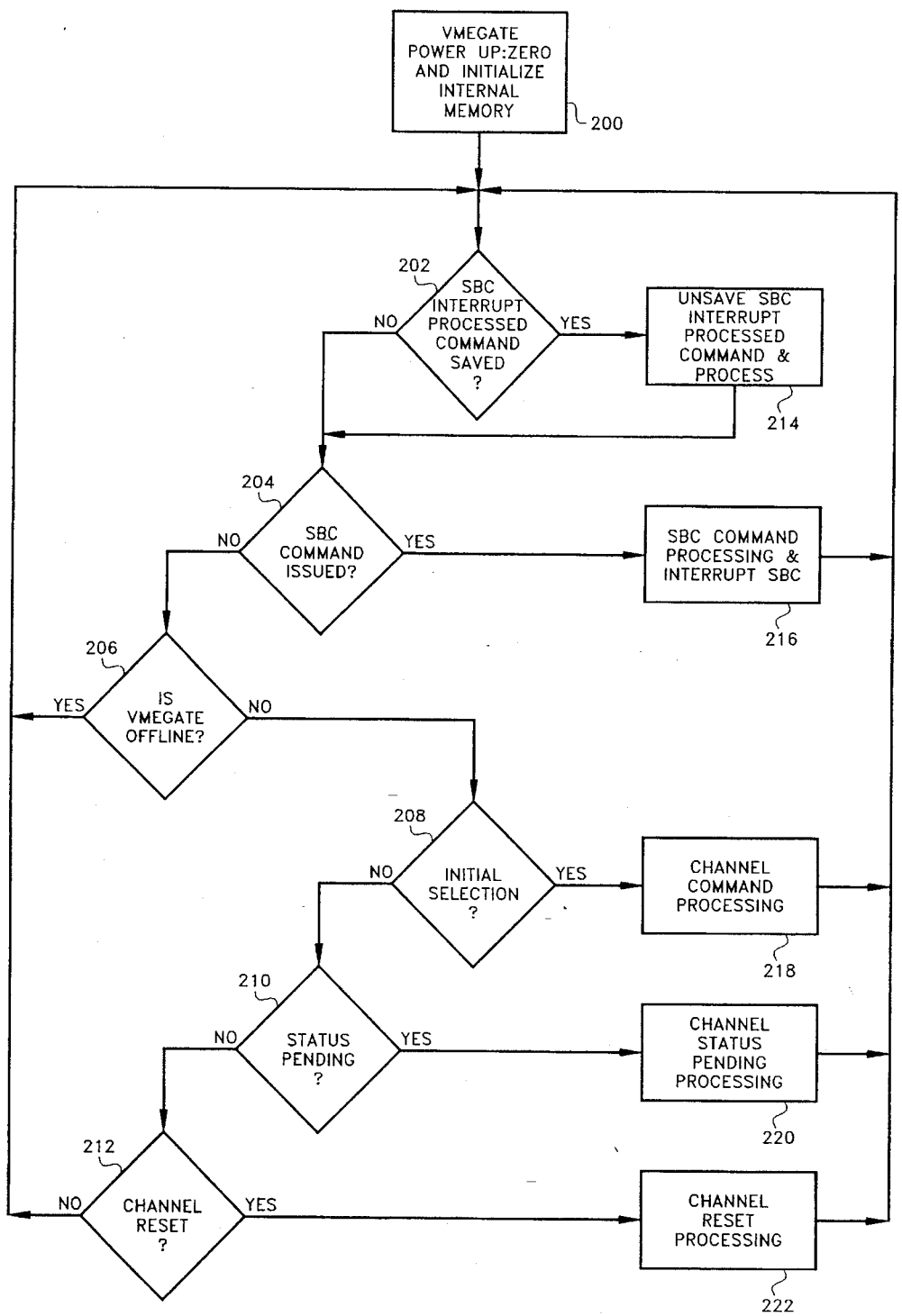
FIG. 6 is a diagram of the MOST disk format.

Referring to FIG. 6, data on the disk 20 is structured. The LD1200 disk drive 16 uses optical disks 20 which contain 1,024,000 sectors per side. Each sector contains one kilo bytes and is referred to as a Logical Block. Each Logical Block is identified by a unique Logical Block Address or LBA. The LD1200 disks drives 16 are used in Auto Rewrite mode. This means that defective sectors will be rewritten in the next sector. Any rewritten sectors will be reported after the write is complete.

When a disk is first read, after drive spin up, the disk id 300 is read. The disk id 300 comprises ID Bytes 302, Disk Type 304, Disk Label, and Reserved 308. The Disk label 306 identifies the disk for the user and for a jukebox 18. The Disk label 306 is an ASCII field ten bytes long, nine ASCII bytes followed by either an A or a B to indicate the disk side. Both sides of the disk 20 are given the same first nine characters. Preceding the disk label 306 is a sixteen byte ID Bytes 302 data pattern which identifies the sector as one containing the current disk ID 300. If the disk label 306 is blank upon the first use of the disk 20, the operator will be prompted to enter the desired id number in the disk label 306. The id number is used in the disk directory when referring to the disk 20. The disk id 300 contains the identifying number of the disk itself. Users determine this number and label the disk cartridge externally with this number. In manual systems, it is useful to assign an id number which relates to the VSNs to be stored on the disk e.g. 123800 could contain one-hundred virtual tapes having VSNs from 123800 to 123899.

Sectors are used sequentially. The Disk ID 300 is stored within the Disk ID Logical Block Address 310. Two fixed addresses are employed, LBA zero 312 and LBA thirty-two 314. Logical Block Address (LBA) zero is the start of the Disk ID LBA space 310. Thirty two sectors are set aside for the disk id LBA space 310 which allow a disk 20 to be renumbered (relabeled) up to thirty-one times. Thus the purpose of the disk id LBA space 310 is to provide an alterable identification of the disk 20. The current disk ID 300 occupies one LBA and there is only one valid disk ID at any given time. The first disk ID 300 is written into LBA zero 312 and each time the disk ID 300 is changed the new disk ID 300 is written into the next available sector in the Disk LBA space 310. Because the disk enables up to five rewrites in order to write one sector, no attempts will be made to write the disk ID 300 beyond sector twenty-six. Since rewrites may occur in sectors between zero and twenty-five it is possible that the user may not get the full twenty-five possible rewrites, thus it is recommended that the disk not be issued a new disk ID 300 except when absolutely necessary. When the operator renames a disk 20, the maximum number of rewrites is available based on the current number of remaining sectors before sector twenty-six. (See the Disk ID Sector Format Table).

The other fixed LBA 314 is the start of the first tape directory LBA band 316. Data is stored according to tape directories 318a or 318b through 318c. The tape directory 318 lists the current virtual tapes contained on the side. The first tape directory band 316 starts at LBA thirty-two and extends through LBA two-hundred-and-eighty-seven, that is, these sectors are reserved exclusively for storing the tape directory 318. A new tape directory 318 is written each time a VSN is created, deleted or written into prior to ejection. It is possible that the first two-hundred-and-fifty-six tape directory LBA band 316 would be exhausted. Additional tape directory LBA bands 320 may be used whereby an additional two-hundred-and-fifty-six sector band 320 is allocated beginning at the next blank sector on the disk 20 when the first band 316 is exhausted.

The tape directory 318 comprises an ID Byte 322, tape data 324a, 324b through 324c for each virtual tape, and a continuation byte pointer 326. Each virtual tape has respective tape data 324 comprising ID bytes 328, volume serial number (VSN) 330, sector count 332, tape map pointer 334, tape length 336, and a pool type/write protect indicator 338. The tape directory 318 contains an alphabetized list of all virtual tapes 324a to 324b that are on one side of an optical disk 20. Like the Disk ID 300, the last tape directory 318 written is the only valid tape directory. Unlike the Disk ID 300, the only limit to the number of times that the tape directory 318 can be rewritten is the space remaining on the optical disk 20.

When a disk 20 is loaded into a drive 16, the SBC software reads the tape directory 318 from the disk 20 and presents the operator with a list of the virtual tapes on the disk side. The tape directory 318 identifies the virtual tapes on the disk side. Associated with each virtual tape is the respective tape data 324a to 324c. The longest tape directory 318 occupies thirty-two sectors and identifies approximately two-thousand virtual tapes. Tape directories 318 are written into bands 320 of two-hundred-fifty-six sectors which are set aside for this purpose. New tape directories 318 are written immediately following the last tape directory. When a band 320 fills up a pointer to the next band is written at the end of the current band 320. The pointer is stored in the two-hundred-and-fiftieth sector following the beginning of the band 320. The first band 316 starts at LBA thirty-two and extends through two-eighty-seven. (See the Tape Directory Format Table).

The tape map pointer 334 points to a respective tape map 348 of each virtual tape. The tape map 348 comprises ID bytes 342, sector count 344, VSN 346 and map data 348a, 348b through 348c each of which comprises a type identifier 350, accumulative length 352, block length 354, record pointer 356 and record offset 358 for each user record 362 on the tape. The tape map 348 provides the functions of BOT, EOT, IBG and TM. The record pointer 356 plus the offset 360 which is specified by the Byte offset 358 determines where the individual user records 362 are stored on the disk 20.

When a virtual tape VSN is mounted a copy of the tape map 340 is read into the controller 14. Subsequent tape motion commands do not require access to the disk, for example, a forward space file command is handled in the controller 14 by consulting the stored copy of the tape map 340 and making the necessary pointer adjustments at high speed. The tape map 340 points to each data record 362 through respective map data 348. In order to conserve media, a record 362 need not start on a sector boundary. The record pointer 356 requires only the record offset 358 to locate the data record 366. A data record 362 is held in the controller 14 until a sector is full or a tape motion command is issued. Holding user data 362 in the controller 14 achieves the data rates of the LD1200 optical disk drive 20.

A 3480 cartridge tape records data in user records 362. Sets of records 362 are separated into files by tape marks. Each record 362 and tape mark is assigned a sequential Block ID by virtue of its sequential order in the tape map 340. The first record or tape mark on a tape is assigned Block ID one, then two, then three etc. Mainframe commands (CCWs) are available to cause the 3480 to move the tape forward and backward one record, one tape mark or to a specific block. MOST 10 emulates these functions through the use of the tape map 340. Each virtual tape has a respective tape map 340. The tape map 340 contains the locations of each user record 362 and each tape mark that is written to the virtual tape. The tape map 340 is only altered when a user record 362 or a tape mark is written to the virtual tape. When a tape mark is written to the virtual tape the block length 354, record pointer 356, and record offset 358 are not used.

When a virtual tape is mounted, its tape map 340 is read into SBC memory. When it is dismounted, the tape map 340, if it has been altered, is written onto the disk 20. The pointer 334 to the tape map 340 is recorded in the tape directory 318 for each virtual tape. The tape map 340 cannot exceed three-hundred-eighty-four kilo bytes in length. Each map data entry 348, whether it indicates a user record 362 or a tape mark, occupies fourteen bytes. Approximately twenty-eight-thousand entries will fit into a Tape Map. The location of the map data for a respective block, i.e. a user record or a tape mark, within the tape map 340 can be found by multiplying fourteen by the sum of the Block ID plus two. (See Tape Map Format Table, and see Tape Map Data Format Table).

User records 362 written by the Mainframe 12 to a virtual tape, are stored sequentially on the optical disk 20. Each record 362 consists of a header followed by the data. The header identifies the data which follows by naming the virtual tape it is written on, identifies the length of the record, or in the case of Long Records identifies the length of the segment, and identifies and the Block ID of the record. The header also contains a twelve byte Record Identifier which indicates that a record follows. When a user data record 362 is written, its location on disk is stored in the record pointer 356 in the tape map 348. The length of the user record 362 is stored in the Block Length field 354 of the same tape data entry 348. Records always start on even byte boundaries within a sector. Many records 362 may exist in a single sector, and a single record 362 may span multiple sectors. (See the Data Record Format Table).

Disk ID Sector Format Table

| byte(s) | value (hex) | meaning |
| --- | --- | --- |
| 0–15 | 6F,7D,21,F6 30,3B,8D,1C E0,1B,24,9D 80,73,E7,E0 | Disk ID follows |
| 16–25 |  | ASCII Disk ID |
| 26–1023 | FFH | Reserved |

Tape Directory Format Table

| byte(s) | value (hex) | meaning |
| --- | --- | --- |
| *First Sector Information* | | |
| 0–15 | 35,55,55,CC, B2,F5,FA,3F, 64,B4,32,CB, B4,14,6A,CC | Identification of sector as Start of Tape Directory |
| 16–31 | see below | Virtual Tape Information (first VT) |
| 32–47 | see below | Virtual Tape Information (second VT) may continues through several sectors |
| Next to last 16 bytes: | see below | Virtual Tape Information (last VT) |
| Last 16 bytes: | 2B,EB,22,4C 54,C9,C8,DC D0,15,9D,18 | Identifier for end of Tape Directory |
| LBA | | First LBA not written |
| *Virtual Tape Information* | | |
| 0 | 02H | Virtual Tape Information |
| 1–6 | ASCII | Volume ID assigned by user |
| 7 | hex | sector length of Tape Map (with byte 13, bit 2) |
| 8–11 | LBA | Tape Map Pointer |
| 12 | hex | Maximum Length of Tape in tens of Megabytes |
| 13 | bitwise bit 0: | 0 Un-File Protected 1 Write Protected |
|  | bit 1: | 0 Scratch pool 1 Private pool |
|  | bit 2: | 0 Tape Map length is byte 7 1 Tape Map length is 256K plus byte 7 |
| 14–15 | FFH | reserved |

Tape Map Format Table

| byte | value (hex) | meaning |
| --- | --- | --- |
| 0–11 | 52,BD,76,16 B6,32,75,56 67,83,3B,B0 | Start of Tape Map Identifier |
| 12 | n | Number of total sectors in Tape Map |
| 13–18 | ASCII | Volume ID (repeated from Tape Directory) |
| 19–27 | 00H | reserved |
| 28–41 | see below | Map Data (first record or tape mark) |
| 42–55 | see below | Map Data (second record or tape mark) |
| Fourteen byte entries to end of Tape Map. | | |

Tape Map Data Format Table

| byte | value (hex) | meaning |
| --- | --- | --- |
| 0 | 04H | Normal Record |
| 1 | 00 | Reserved |
| 2–5 | hex | Cumulative Length. The amount of data and tape marks that has been written to tape prior to and including this record. Amount includes four kilo byte simulated Interblock Gap for each Block ID. |
| 6–9 | hex | Block Length (maximun 256K). Length of this record. |
| 10–13 | hex | Absolute Address of Record. Starting LBA of data Record found by shifting right 10 bits. Offset within sector is 10 least significant bits. OR |
| 0 | 05H | Tape Mark |
| 1 | 00 | Reserved |
| 2–5 | hex | Cumulative Length. The amount of data and tape marks that has been written to tape prior to this record plus simulated IBGs, in addition to 2K simulated tape mark and 4K simulated IBG. |
| 6–13 | 00H | Reserved OR |
| 0 | 06H | Long Record |
| 2–5 | hex | Cumulative Length. Same as Normal Record above. |
| 6–9 | hex | Block Length (minimum 256K). Length of this record. Segments are written sequentially onto disk in 256K blocks. Last segment is less than or equal to 256K. |
| 10–13 | hex | Absolute Address of Record. Starting LBA of data Record. found by shifting right 10 bits. Long Record always starts on sector boundary. OR |
| 00 to end of sector | 00 | Reserved. |
| End of sector | 0FF | End of Tape Map, no more Map Data. |

Data Record Format Table

| byte | value | meaning |
| --- | --- | --- |
| 0–10 | AC,20,42,3F D0,0F,AD,26 73,99,FF | Header follows |
| 11 | FF | Normal Record The Record (or final segment of |

-continued

Data Record Format Table

| byte | value | meaning |
| --- | --- | --- |
| 11 | F0 | Long Record) that follows is less than 256K. OR Long Record The next 256K bytes that follow are a segment of a Long Record. |
| 12–17 | ASCII | Volume/Serial Number of Virtual Tape. |
| 18–19 | hex | Block ID where this Record resides on Virtual Tape. |
| 20–23 | hex | Length of data which follows. |
| 24–27 | FF | Reserved. |
| remaining bytes: | hex | data of Length specified in bytes 20–23. |

Disk Directory

The disk directory is stored on the hard drive 50. The arrangement of multiple-byte words on the hard drive 50 conforms to the 68000 convention, that is, the most significant byte first and the least significant byte last. The hard disk 50 comprises six track per cylinder using six read-write heads, eight-hundred-and-twenty cylinders, nine sectors per track and one-thousand-and-twenty-four bytes per sector. There is a jumper setting for the sector size. There are 44,280 sectors numbered from zero to 44,279.

For the disk directory, the hard disk is divided into 5535 blocks of eight consecutive sectors each. The blocks are numbered from zero to 5534. The disk directory layout is: the bootstrap in sectors zero to three, and, the block allocation table in sectors four to fourteen with sector fifteen reserved, for blocks zero and one; the optical disk table in blocks two to one-hundred-twenty-nine; the optical disk pointer table in blocks one-hundred-and-thirty to one-hundred-and-thirty-seven; and the tape tables in blocks one-hundred-and-thirty-eight to 5466. The remaining sixty-seven-and-a-half blocks are used for remapping with one-half block reserved.

The layout of each entry in the optical disk table is: Name using nine bytes, Reserved using eleven bits, Slot using four bits, Side Up using one bit, Location using one byte, Pointer To First Tape using four bytes, Pointer To Last Tape using four bytes, and Reserved using twelve bytes, for a total of thirty-two bytes. There are at most 32,768 entries in the disk table. If the first character of the name is a zero byte, the entry is empty and marks the end of the disk table. The last entry, if it is used at all, is of this type, so the number of disks is limited to 32,767.

The disk table is maintained as a series of alphabetically sorted lists for each attached jukebox zero to four, designated from zero to fourteen and a remote storage designated fifteen, for up to five alphabetical lists. The optical disk table entry can be represented by the following Disk Table C Definitions and Structures Table.

The location and orientation of the optical disk 20 is represented by two bytes where bit fifteen is the most significant as follows: bits fifteen to six for slot number of the jukebox; bits five to one for jukebox designation zero to fourteen and remote storage fifteen; and bit zero for orientation with a zero specifying side A and a one specifying side B.

The optical disk pointer table is a list of indirect pointers to entries in the optical disk table. Each entry is one word long which is two bytes long, and contains a number between zero and 32,766, inclusive, which points to the corresponding entry in the optical disk table. The number 32,767 cannot occur because the last entry in the disk table is always empty, so it is used to indicate an empty location in the disk pointer table. When a disk is moved, its optical disk table entry and others must be moved to keep the optical disk table in the correct order. The corresponding pointers in the optical disk pointer table are then modified, but not moved.

The starting block numbers of the tape tables are computed in a straight forward manner as specified in the following Starting Block Computation Table. The parameter TABLES is the number of tape tables preferably predefined atone-hundred-and-twenty-eight. The format of each entry in a tape table is as follows: compressed name for four bytes; disk and side for two bytes; pointer to next tape four bytes; and reserved for six bytes, for a total of sixteen bytes. Pointers in the tape tables are numerous and scattered but are not changed when a disk is moved.

The word that determines the optical disk and side has the following format: bit fifteen with a zero for side A and a one for side B; and bits fourteen to zero is the index to disk pointer table. The entry is referenced by the Disk Entry C Language Table. The compressed name is formed from the six-character tape name which is also called a volume serial number, in the following manner. Each character is first converted to a number between zero and thirty-six according to the following very simple scheme: space character for number zero; zero to nine characters for number one to ten; and A–Z character for numbers eleven to thirty-six. Then, if the numbers corresponding to the 6 characters are a, b, c, d, e and f, in left-to-right order, the compressed name is $((((a*37+b)*37+c)*37+d)*37+e)*37+f+1$. The two extreme values zero and FFFFFFFFh cannot occur, so they are used to mark a vacant entry within or at the end of the table, respectively.

The alphabetical order of two 6-character names is always the same as the numerical order of the corresponding compressed names using thirty-two unsigned arithmetic. This fact can be used to keep the names in sorted order. Given a compressed name, the numbers a, b, c, d, e and f, and hence the original characters, can be recovered as follows: subtract one; divide by thirty-seven, the remainder is f; divide the quotient by thirty-seven, the remainder is e; divide the quotient by thirty-seven, the remainder is d; divide the quotient by thirty-seven, the remainder is c; divide the quotient by thirty-seven, the remainder is b, and the quotient is a.

The tapes are assigned to tape tables by first hashing the compressed name and then dividing the result by the number of tables. The remainder is the number of the tape table. A compressed name is hashed as follows: Shift the name eight bits to the right while filling in with zeros which will cause at most two-hundred-and-fifty-six consecutive names to be assigned to the same table, and because tapes are often mounted consecutively, the tape table block will often be in memory already and will not have to be reread from disk; and then exchange the odd and even bits of the result, such that each tape table grows within its assigned first block until it fills it up.

There is one two-byte entry in the block allocation table for each block on the disk. However, only entries corresponding to the part of the disk used for the tape tables actually mean anything. Initially, the block allocation table entry for the starting block of each tape table is FFFFh, which means that the corresponding block is the last block in the chain allocated to a table, and every other entry in the table is zero, indicating that the corresponding block is unused.

When a new tape table entry is inserted, it is put into the first vacant entry in the appropriate table. If this was the last entry, then a new last entry, marked by a compressed name of FFFFFFFFh, must be appended. If the last block in the chain allocated to the tape table is full, a new block must be allocated. The new block is always the first unused block after the last block in the chain. Normally, this will be the next consecutive block, but when a tape table expands up to the next tape table, the next block will be nonconsecutive. In either case, the block allocation table is updated so the entry for the new last block is changed from zero to FFFF, and the entry for the old last block is changed from FFFF to the block number of the new last block. For the purpose of determining the next unused block, the area assigned to tape tables (blocks one-hundred-and-thirty-eight to 5466) is treated as circular, i.e., block one-hundred-and-thirty-eight follows block 5466.

At all times, the blocks allocated for a tape table are determined by a chain in the block allocation table. The entry for each block allocated to the table contains the number of the next block, except for the last block, whose entry is FFFF. Once a block is allocated, it is never deallocated unless the data base is reinitialized.

---

Disk Table C Definitions and Structures Table

```
typedef struct {
        unsigned reserved   :  8;
        unsigned unused     :  1;
        unsigned pool       :  1;
/* 0=scratch, 1=private tape table entry only */
        unsigned block      : 13;
        unsigned index      :  9;
} tape entry pointer
typedef struct {
        char name[9];
        unsigned char reserved1;
        unsigned char slot       : 11;
        unsigned char location   :  4;
    unsigned side up             :  1;
        tape entry pointer first tape;
        tape entry pointer last tape;
        unsigned char reserved2[12];
} disk table entry;
```

---

Starting Block Computation Table table 0 using starting block number 138;
table 1 using starting block number 138 + 5329/TABLES;
table 2 using starting block number 138 + 2 * (5329/TABLES);
table 3 using starting block number 138 + 3 * (5329/TABLES);
    etc.
If the quotient 5329/TABLES is not an integer,
then it is truncated to the next lower integer value.

Disk Entry C Language Table

```
typedef struct {
        unsigned long compressed_name;
        unsigned short disk_and_side;
        tape_entry_pointer next_tape;
        unsigned char reserved[6];
} tape_table_entry;
```

Operator Interface

MOST 10 is equipped with at least one operator console 24. This console is used for controlling MOST, setting the operating mode, mounting and dismounting tapes, creating and deleting tapes, etc. The operator console 24 provides a user interface through which the operator can import and export disks 20 from the jukebox 18 as well as creating virtual tapes. MOST 10 also supports dual operator consoles 24 and 26 having video screen displays to enable operation from two locations. The addition of a second operator console 26 allows for both local and remote operation of MOST 10. The remote console 26 provides identical functionality to that of the primary console 24.

The consoles 24 and 26 provide the functions of an IBM 3480 A22 operator setup panel and an IBM 3480 B22 operator displays. The displays are identical to those found associated with two tape drives of an IBM 3480 B22 unit. The messages show drive status, error information, and other action information sent by either the drive or the attached host computer 12. MOST 10 has few external switches and displays. All operator indicators and controls are performed through software and appear on the CRT/keyboard of the dual consoles 24 and 26.

The operator interface is emulated by the SBC 40 and controlled by the operator consoles 24 and 26 through RS232 ports 25 and 27, respectively, connected to the SBC I/O board 54. The I/O board 54 include RS232 interfaces and buffer circuits for communication with the modem 56 over cable 60, consoles 24 and 26 over lines 25 and 27, and printer 28 over lines 29. The SBC 40 communicates with the I/O board 54 over cable 58. The remote console 26 and modem 56 are mutually exclusive features, that is, if the remote console is required, the modem is disabled and vice versa. This is because the same serial RS232 interface of the I/O board 54 is utilized.

Software defined operator interfaces also allow various other functions to be placed in the hands of the user. For example, the user cautions printed in the IBM operator's manuals, are built into the MOST interface. Cautions are displayed if an operator attempts a control sequence which could result in the loss of data.

The operator interface is through the consoles 24 and 26 which are video terminals including a screen and keyboard. The keyboards are equipped with sixteen special function keys across the upper part of the keyboard and are labeled for operator convenience. These keys are used extensively to control MOST and minimize the number of keystrokes required for a given operation. The operator interface makes use of these function keys to implement a one button push control philosophy where possible. The consoles 24 and 26 provides for reverse video used to highlight active areas of the screen and to indicate that a switch is set in a particular way. The layout and operation of the simulated IBM A22 and B22 control panels is virtually identical to the corresponding IBM unit's operation in order to minimize operator training.

Special function keys F1, F2, and F3 simulate the action of switches on an IBM 3480 A22 control unit operator setup panel. Special function keys F6, F7, and F8 simulate the action of switches on an IBM 3480-B22 drive operator panel. Special function keys F12, F13, F14, and F15 are provided for operator actions specifically related to the control of the virtual tapes. Special function keys F4, F5, F9, F10, F11, and F16 are reserved.

Simulated Panels

A simulated IBM 3480 control unit operator setup panel is displayed in the top left-hand corner of the video screen of the console 24 or 26. Each channel address has a simulated IBM 3480 B22 drive operator panel displayed in the lower portion of the video screen of the console 24 or 26. A MOST special function panel indicating date and time is displayed in the upper right-hand corner of the video screen. The special function panel is used to display menus, prompts, and warning messages for the operator.

The screen is divided into four functional areas, the control unit operator setup panel, special function panel, drive operator panel and message panel. Control Unit Operator Setup Panel area is equivalent to the panel of the same name on the IBM A22 unit. Several switches which do not have an equivalent function have been omitted. The Special Function Panel area is used for special functions which do not have a logical equivalent in the IBM drive. Drive Operator Panel area has four panels equivalent to the like named panels on the IBM B22 drives. All sixteen Drive Operator Panels are displayed in groups of four. Message Panel area is used to communicate warnings or messages to the operator to assist in the use of MOST. The switches are emulated by special function keys on the keyboard of the console 24.

During operation, the operator is primarily concerned with the four drive operator panel displays each of which represents four tape drives of the 3480. When operating a 3480, the operator is prompted by the operator display. The mount messages are displayed along with status information such as READY or REWINDING. These same displays are provided by MOST 10. In addition, MOST 10 has the added element of actual optical disk drives. The operator is kept apprised of the status of these drives with a display showing status, e.g. EMPTY, SPIN UP, etc., or the identification of the loaded disk 20.

Each channel address of the control unit is provided with a drive operator panel displayed in the lower portion of the screen. These drive operator panels provide switches, indicators, and a message display that can be used to rewind a tape, unload a tape, place the drive in a ready or not-ready condition, view messages that state drive conditions or actions required, and set the manual or system mode. Each drive operator panel is identified in its upper right-hand corner by a single hexadecimal digit. The panel and its associated drive are selected by the operator by depressing a hexadecimal (0–9, A–F) key on the keyboard. Once a panel is selected, the operator's use of the function keys will affect only that panel. The selected hexadecimal identification digit is shown in reverse video. The address label on the third line of the drive operator panel shows the two-digit hexadecimal channel address that the controlling computer uses to communicate with the panel. The address label only changes when the channel address in the control unit operator setup panel is changed.

MOST will accommodate a total of up to sixteen optical drives 16. The 3480 drive operator panels are displayed in groups of four. The default display is for panels number zero through three. Selecting a hexadecimal panel number larger than three will cause the screen to display the appropriate group of four panels. A panel cannot be selected for a drive that does not exist.

The attention indicator consists of two vertical bars on the second line of the drive operator panel. The attention bars are visible when action must be taken to permit operations to continue on the drive. The action message, such as mounting a virtual tape, will be displayed in the area immediately to the right of the vertical bars. If the attention bars are off, action need not be taken even though a message is displayed. For example, if an EOT message is displayed, the attention bars will be off indicating that the message is for information only. The attention bars are displayed by commands from the host computer 12.

The message display at the right of the attention indicator shows messages indicating drive condition. Three types of messages that can be displayed are drive condition, check code and host computer. The message display has eight character positions. The eighth position sometimes modifies the specified operator action or gives additional information. For example, an "F" is displayed when the virtual tape is file protected. Display messages can extend across all eight character positions, e.g. COMPLETE. In addition, two-part messages can be alternately displayed. For example, the two-part message Dxxxxxx and Mxxxxxx is displayed as Dxxxxxx, then Mxxxxxx, then Dxxxxxx, then Mxxxxxx.

A drive condition message appears on the message display to the right of the vertical bars when the drive condition changes. There are several drive condition messages. NT RDY F means the drive is not ready and a file-protected virtual tape is in the drive. NT RDY U means the drive is not ready and an unprotected virtual tape is in the drive. READY F means the drive is ready and a file-protected virtual tape is in the drive. READY U means the drive is ready and an unprotected virtual tape is in the drive. "*" means that no virtual tape is inserted.

A message from the host computer 12 appears in the area immediately to the right of the vertical bars in response to a Load Display command. The content of a message is based on system requirements.

The selected indicator is a pair of asterisks, located at the far right on the second line of the drive operator panel. The selected indicator asterisks are only visible when the control unit is transferring data to or from the drive.

To the right of the address label is the drive allocation label. This label specifies the drive which is currently allocated to the channel address associated with the drive operator panel. The first character of the drive allocation label is either a "J" or a "P" indicating jukebox or pedestal. The second character specifies which jukebox or pedestal with values ranging from zero to four. The second half of the field specifies which drive within either the jukebox or pedestal, is allocated to the drive operator's panel. The values range from D0 to D3. For example, the drive allocation label J0:D1 indicates that drive one is allocated to jukebox zero. The drive allocation label can be changed by either the operator's use of the up and down arrow keys or automatically by the subsystem when the panel is in system mode.

In 3480 emulation, all of the applicable switches and displays of a 3480 are sent to the screen and keyboard of both consoles 24 and 26. On a 3480, a user can change device addresses, bring the device ONLINE or OFFLINE, or make a drive READY or NOT READY. Once a drive is NOT READY, the user can perform manual REWINDs and REWIND/UNLOADs. All of these actions are emulated by MOST 10. Where the 3480 has switches, certain keys on the keyboard are used. Also, messages that would normally be displayed on the message display of the 3480 B22 are instead displayed on the screen of the MOST terminals. Manual "rewinding" and "unloading" are accomplished through the function keys. Similarly, the controller's channel address is selectable by the function keys.

Pressing a function key causes the SBC 40 to prompt the user for information regarding the virtual tape to be created. This information includes a unique virtual tape name, a maximum length for the virtual tape, whether it is to be labeled prior to being mounted the first time, and other pertinent data. The disk directory which is also referred to as a tape database, is consulted prior to creating a virtual tape in order to ensure that no other virtual tape with the same name already exists. If none exists the new virtual tape will be added to the disk directory along with the name of the optical disk 20 on which the virtual tape resides. Once a virtual tape is created it must be mounted before it can be used. Mounting a virtual tape is accomplished through a particular function key sequence. The user is prompted for the name of a virtual tape. Once the name is received, the SBC 40 loads the proper optical disk and mounts the virtual tape. The mainframe 12 is interrupted with unit status indicating a NOT READY to READY transition just as is the case with an IBM 3480.

In the manual mode, a virtual tape is mounted from a loaded optical disk through the keyboard. The user calls for the specific virtual tape by name and the software finds it and mounts it. Each time that the mainframe 12 wants a 3480 to mount a particular tape, the software sends out a message to be displayed on the message display of the B22. This message specifies the actual tape to be loaded. It is up to an operator to load the disk with the virtual tape on it and then manually mount the virtual tape.

In the system mode, MOST 10 automatically interprets mount messages, and then references the hard disk containing the disk directory which informs the SBC which slot in the library contains the disk that holds the requested virtual tape. The SBC 40 then issues commands to the jukebox 18 which cause the correct disk to be loaded and the virtual tape to be mounted automatically without manual intervention. Once the desired optical disk is loaded and the virtual tape is mounted, the mainframe 12 is notified that the drive is ready. After the virtual tape is mounted, the mainframe can read and write to the virtual tape just as it would to a normal 3480 tape in a drive.

Normal or Test Operations

NORMAL/TEST function key F1 controls the 3480 control unit operation and is a toggle switch whose position is displayed in reverse video on the screen. When in the NORMAL position, the 3480 control unit is set for normal operation. When in the TEST position, the control unit is set for testing. The tests are a maintenance aid. For normal operation, the switch should be in the NORMAL position. Do not depress the function key F1 during normal operations. If this key is pressed accidentally while the 3480 control unit is operating, a warning message will be displayed on the special function panel indicating that the 3480 control unit must be offline and that all drives must be empty to enter TEST mode. Tests available for operator selection are SBC Tests, VMEGate tests, Activate modem, Deactivate Modem, Set real time clock, Format hard disk, Initialize disk directory, Control Unit emulation to 3480, Optical drive tests, and F1 to return to NORMAL.

Online or Offline Operations

The CUONLINE/CUOFFLINE function key F2 switch determines whether the 3480 control unit can communicate with the host computer 12. The CUONLINE/CUOFFLINE function key F2 is a toggle switch whose position is displayed in reverse video on the screen. When in the online position, the 3480 control unit can communicate with the host computer 12. When in the offline position, the control unit cannot communicate with the host computer 12.

When moving the CUONLINE/CUOFFLINE switch to the CUOFFLINE position during normal operations, the control unit completes processing of all the work and returns status to the host computer 12. This process can take up to thirty seconds before the control unit goes offline. A message, GOING OFFLINE, FINISHING WORK IN PROCESS, is displayed on the special function panel. A pair of asterisks appear below CUOFFLINE to show when the control unit is offline. Do not depress function key F2 during normal operations. If this key is pressed accidentally while the control unit is operating, a warning message will be displayed in the special function panel. For normal operation, the switch should be in the CUONLINE position.

The two CUOFFLINE asterisks located directly below the word CUOFFLINE on the display screen are visible when the CUONLINE/CUOFFLINE switch is set to CUOFFLINE, all processing has completed, and subsystem status has been sent to the host computer 12. When the CUOFFLINE asterisks are visible, power may be removed as a normal operation. When data is being transferred on the channel between MOST 10 and the host computer 12, the CUOFFLINE asterisks are not visible and the control unit is online. There can be a delay of up to thirty seconds between when the CUONLINE/CUOFFLINE switch is placed in the CUOFFLINE position and when the CUOFFLINE asterisks appear. Do not switch the power off until the CUOFFLINE asterisks are visible on the screen.

Changing Control Unit Channel Address

The Channel Address function key F3 is used to set the control unit base address. The control unit responds to sixteen sequential addresses starting at the base address. Pressing function key F3 causes the following channel address prompt to appear in the special function panel: ENTER HEX NUMBER FOR ONE NIBBLE OF CHANNEL ADDRESS. PRESS ENTER TO MAKE PERMANENT, ESC KEY TO ABORT. CHANNEL ADDRESS= 80.

To change the most significant digit of the channel address, the operator presses a hexadecimal number (0–9, A–F) on the keyboard and then presses the ENTER key. The least significant digit of the channel address is fixed as a zero and cannot be changed by the operator. The channel address was set when the subsystem was installed and normally is not changed. A channel address label located directly below the word address on the display screen shows the base address number set by the switch. This label is determined during installation and, normally, is not changed.

The WAIT asterisks appear in the lower portion of the control unit operator setup panel. The WAIT asterisks blink while the control unit is operating. When the control unit is waiting for work, the asterisks are constantly on.

Rewinding a Virtual Tape

The REWIND function key F6 rewinds the virtual tape to the beginning-of-tape (BOT). The REWIND function key works only when the READY/NOT READY switch is in the NOT READY position. If the F6 function key is pressed while the drive is READY, there is no effect, and a warning message, TAPE DRIVE MUST BE NOT READY TO EXECUTE REQUESTED FUNCTION!, will be displayed on the special function panel.

Unloading a Virtual Tape

The UNLOAD function key F7 rewinds and unloads the virtual tape. The UNLOAD switch works only when the READY/NOT READY switch is in the NOT READY position. The UNLOAD function key also resets the drive and any messages that may be on the message display. If the function key is pressed while the drive is READY, there is no effect, and a warning message, TAPE DRIVE MUST BE NOT READY TO EXECUTE REQUESTED FUNCTION!, will be displayed on the special function panel.

Placing a Drive in READY position

The READY/NOT READY function key F8 places the drive in a READY or NOT READY condition. READY/NOT READY is a toggle switch whose position is displayed in reverse video on the D11 screen. When in the READY position, the drive is prepared to read data from or write data onto a virtual tape. When the switch is in the NOT READY position, the drive cannot read or write data. This switch must be in the NOT READY position for the REWIND switch or the UNLOAD switch to operate properly. The operator should not press this function key during normal operations. If this function key is pressed while the drive is operating, a warning message will be displayed on the special function panel.

The volume/serial number of a mounted virtual tape is displayed on the seventh line of the drive operator panel. If no virtual tape is currently mounted, the tape status will be displayed. Tape status will be either EMPTY, indicating that no virtual tape is mounted, or MNTNG, indicating that the jukebox is retrieving a disk prior to mounting a tape. The volume/serial number message is changed by the F13 function key for mounting a new virtual tape, by the F7 function key for rewinding and unloading a previously mounted virtual tape, by a REWIND/UNLOAD command from the controlling computer, or by a mount message from the controlling computer when the subsystem is in system mode.

The disk status message on the next to last line of the drive operator panel provides information relative to the optical disk drive itself. The message UNLOCKED means the drive is ready for the insertion or removal of an optical disk. The message SPINUP means an optical disk is being spun up to the correct rotational speed for reading and writing. The message SPINDOWN means an optical disk is being spun down so that it may be removed from the drive. The message xxxxxxxy means the disk identification number and side with the last character being either "A" or "B" indicating which side is loaded.

The disk status message is changed when a disk is loaded or ejected by pressing the F14 function key, or when a disk is automatically loaded or ejected in response to a mount message from the controlling computer when the subsystem is in the System mode.

The drive operating mode on the last line of the drive operator panel is selected by entering S or M on the keyboard to select, respectively, SYS meaning the drive operates in system mode, interpreting and acting on mount/demount messages from the controlling computer automatically, or, MANUAL meaning the drive operates in manual mode with the operator performs all virtual tape mounts and dismounts. The selected mode is displayed in reverse video.

Creating, Deleting, and Editing Virtual Tapes

The special function key F12 on the keyboard allows the operator to create, delete, and edit virtual tapes, either individually or in blocks, on a selected drive. A special function menu will appear with options C, D, E and B for create, delete, edit, and block edit respectively. An optical disk must be loaded into the selected drive before the F12 key is used. To exit from the F12 function, the operator presses ESC. When the F12 key is pressed, all virtual tapes on the selected side of the currently loaded disk will be displayed in the special function panel, along with a function menu. The up and down arrow keys scroll through the directory of tapes. The panel will also indicate the number of free megabytes on the current side, A or B, of the loaded disk.

To create a tape, the operator presses the "C" key after the menu appears in the special function panel. The operator will be prompted to enter, one at a time, the following parameters: Volume/Serial Number; Header Type (Virgin, Tape Mark, Header); Length (two-hundred megabyte, unlimited, user-defined); and Pool Type (Scratch, Private). Each parameter is entered at the keyboard. The Volume/Serial Number parameter is alphanumeric with a maximum length of six characters. If a virtual tape with the same VSN already exists in the tape database, a warning message, CAN'T CREATE, TAPE ALREADY EXISTS!, will be displayed in the special function panel. The names SCRTCH and PRIVAT are illegal as volume/serial numbers. Pressing "T" for toggle moves the highlight from field to field and pressing ENTER selects the desired field. The options are Virgin, Tape Mark, or Header (which is the default). The Header option is an ANSI standard VOL1 header containing the tape volume serial number. Pressing "T" for toggle moves the highlight from field to field and pressing ENTER selects the desired field. The options are two-hundred mega bytes, the default, User-Defined which may be one to one-hundred-and-ninty-nine mega bytes, or Unlimited. The operator specifies the maximum amount of data that will fit on the virtual tape. When this amount of data has been written to the tape, the control unit will indicate the Logical End of Tape and then the Physical End of Tape to the host computer 12. In this way, virtual tapes can be copied to 3480 cartridge tapes or 3420 reel tapes without exceeding the capacity of either media. Pressing "T" for toggle selects either SCRTCH which is the default, or PRIVAT and pressing ENTER selects the pool type. After entering the last parameter, the operator will be prompted to confirm the create by pressing ENTER, or to abort the operation by pressing ESC. Upon confirmation, the parameters are automatically entered into the disk directory.

To delete a tape, the operator press the "D" key after the menu appears in the special function panel. At the prompt, ARE YOU SURE?, the operator specifies the VSN and verifies the deletion request by pressing ENTER. Upon verification, the specified VSN is deleted from the disk and the disk directory.

To edit a tape, the operator presses the "E" key after the menu appears in the special function panel. After specifying a VSN, File Protect, Volume/Serial Number, Length Increases, and Pool Type virtual tape parameters in the menu can then be changed. The File Protect parameter indicates that the tape cannot be changed (i.e., read only). After pressing ENTER, the new parameters are entered automatically into the disk directory and written to the disk.

The operator uses the block edit to create, delete, or edit blocks of virtual tape. After the menu appears in the special function panel, the operator presses the "B" key. At the prompt, the operator enters a starting VSN and a block count. The VSN will be incremented in decimals from the starting VSN. The VSN name should terminate in a number, e.g., DWD001. The maximum block count is nine-hundred-and-ninty-nine. A warning message will prompt the operator if out-of-range conditions are detected. After selecting block mode, the operator may then create, delete, or edit a block of tapes by pressing the C, D, or E key. Upon completion of the block mode operations of Create, Delete, or Edit, the disk directory is automatically changed to reflect those operations.

Mounting a Virtual Tape

To mount a virtual tape, the operator presses the F13 key. A list of virtual tapes contained on the selected side of the loaded disk will appear in the special function panel. The up and down arrow keys scroll up or down the list. Pressing the plus and minus keys are used to see other disks. The operator selects a VSN from the list by typing the VSN name, followed by pressing ENTER. The specified virtual tape will be automatically mounted and the VSN displayed in the drive operator panel. If the host computer has sent a mount message specifying a VSN, the operator may press F13 and the ENTER key without typing in the VSN name. The virtual tape named in the mount message will be mounted. The ESC key may be pressed at any time to exit from the F13 function.

Dynamic drive allocation eliminates the need for physically exchanging disks when a virtual tape is requested and is contained on a disk residing in a drive that is allocated to a different channel address. The drive and disk actually containing the specified virtual tape can be reallocated to the requesting channel address in any of three ways. Reallocation can occur by the operator using the up and down arrow keys. Automatic reallocation can occur by the control unit in response to a host computer tape mount message. Automatic reallocation can occur by the subsystem in response to operator requests for virtual tape mounts using F13 or disk loads using F14.

Channel addresses are assigned to the operator drive panels during the initialization of the controller 14 and remain fixed. Dynamic allocation is a logical procedure which reallocates the installed drives to channel addresses as necessary for rapid and efficient subsystem operation. For a selected drive operator panel having an assigned channel address, the operator may press either an up or down arrow key to cause the currently allocated drive to be reallocated. Dynamic drive allocation in response to the controlling computer will be executed automatically, if the drive allocated to the requesting channel address is available and the drive operator panel is in system mode. A drive is considered not available for dynamic drive allocation if a virtual tape is already mounted or if the operator is performing an operation such as mounting or creating a virtual tape. A drive is not available for reallocation if the drive operator panel to which it is allocated is in manual mode.

Loading and Ejecting a Disk

To Eject, Load, Relabel, or Flip a Disk, the operator press the F14 function Key. A menu will appear: DISK OPERATIONS: Eject Disk; Load Disk; Relabel Disk; Flip Disk; and ESC to EXIT. The menu will not appear if any virtual tapes are mounted.

To eject a loaded disk, the operator presses the "E" key. In jukebox configurations, the disk is ejected automatically and returned to its storage slot. The disk status message in the drive operator panel changes from the name of the disk to UNLOCKED. The disk status message indicates SPIN-DOWN while the disk is spinning down. If a disk is not loaded when the "E" key is pressed, a warning message, DISK MUST BE LOADED IN DRIVE TO EXECUTE REQUESTED FUNCTION, appears in the special function panel. In pedestal configurations, the drive door is unlocked so that the operator can manually remove or flip the disk.

To load a disk into the selected drive, the operator press the "L" key. At the prompt, the operator enters a disk name and presses ENTER. The operator then presses either "A" or "B", depending on which side of the disk is desired. The disk is loaded automatically and the disk status message changes from UNLOCKED to the disk name and side, A or B. The disk status message indicates SPIN-UP, while the disk is spinning up. If the disk name does not exist in the disk directory, a warning message, DISK NOT IN DATA BASE, will be displayed. If a blank disk is loaded, the operator will be prompted to enter a name for the disk. Disk names cannot exceed nine alphanumeric characters. In pedestal configurations, the operator will be instructed to insert a disk, close the door, and press ENTER.

To relabel a loaded disk, the operator presses the "R" key. At the prompt, the operator enters the new disk name. Disk names cannot exceed nine characters. Press ENTER and the new disk name is automatically written to both sides of the loaded disk and in the disk directory. A disk may be relabeled up to twenty times. In pedestal configurations, the operator must manually flip the disk so that both sides can be relabeled.

To flip a disk, the operator presses the "F" key. If there is a disk in the jukebox drive, the disk will be spun down, flipped over, and spun back up automatically. A warning message is displayed if there is no disk in the drive. In pedestal configurations, the disk must be ejected, flipped over, and reloaded manually. The ESC key may be pressed at any time to exit from the F14 functions.

Accessing the Disk Directory

To access the disk directory which is a virtual tape database, the operator presses the F15 function key. The F15 key operates differently depending on if the configuration includes a jukebox. Pressing the F15 key when a jukebox is included will cause the jukebox operation menu to be displayed. After pressing F15, the menu: Jukebox operations; 1) Import Disk; 2) Export or Delete Disk; 3) Data Base Menu; and ESC TO EXIT, is displayed.

To import a disk, the operator presses the "1" key. The disk drive must first be unloaded. The jukebox mailbox is extended and the operator will be instructed to place a disk in the mailbox. The operator inserts the disk with the "A" side up. If the disk is blank, the operator will be prompted for a name, which must not exceed nine characters. The disk name and tapes will be added automatically to the disk directory.

To export or delete a disk, the operator presses the "2" key. A list of disks is displayed. At the prompt, the operator enters the disk name, and the disk will be carried to the mailbox. The operator then removes the disk from the mailbox. The disk directory will be updated to indicate that the disk is now in a remote location.

To select the database menu, the operator presses the "3" key. After pressing the "3" key, the menu: Date Base Menu; 1) Individual Tape Information; 2) List of Tapes on a disk; 3) List of disks in the Data Base; 4) List of Disks in the Jukebox; and ESC to Exit, is displayed. To obtain Individual Tape Information, the operator presses the "1" key. A list of virtual tapes will appear. The up and down arrows or the plus and minus keys scroll the list. At the prompt, the operator enters the VSN and presses ENTER. The V/S name, disk side, pool type, disk location, and disk ID will be displayed. The operator presses the "2" key to list of tapes on a disk. A list of disks will appear. The up and down arrows or the plus and minus keys scroll the list. At the prompt, the operator enters a disk name and presses ENTER. The operator then enters the desired disk side, A or B. A list of all tapes on the specified side of the requested disk will be displayed. The operator presses the "3" key to list of disks in the disk directory. A list of all disks in the disk directory will be displayed by location, jukebox or remote, on the special function panel. The up and down arrows or the plus and minus keys scroll the list. The operator presses the "4" key to list the disks in a jukebox or on the remote shelf. At the prompt, the operator specify a jukebox number, or "R" to list the disks. A list of all the disks in the specified location will be displayed on the special function panel. The up and down arrows or the plus and minus keys scroll the list. The ESC key may be pressed at any time to exit from the F15 function.

If no jukebox is present in the configuration, pressing the F15 key will cause a menu of disk directory (database) operations to appear. After pressing the F15 key, the menu: Data base Operations; 1) Add Disk to Data Base; 2) Delete Disk From Data Base; 3) Data Base Menu, is displayed.

To add a disk to the .disk directory, the operator presses the "1" key. A prompt will instruct the operator to insert a disk in the selected drive and to close the drive door and press ENTER. The disk and its virtual tapes will be added automatically to the disk directory. The operator must flip the disk in order to add both sides of the disk to the disk directory.

To delete a disk from the disk directory, the operator presses the "2" key. The list of disks on the disk directory will appear on the special function panel. The plus and minus keys or the up and down arrow keys scroll through the list. At the prompt, the operator enters the name of the disk to be deleted and presses ENTER, and the disk is eliminated from the database.

To obtain the database menu, the operator presses the "3" key. After pressing the "3" key, the menu: 1) Individual Tape Information; 2) List of Tapes on a Disk; and 3) List of Disks in Database, is displayed. For individual tape information, the operator presses the "1" key. The up and down arrows or the plus and minus keys scroll the a list of tapes. At the prompt, the operator enters the volume/serial number and presses ENTER. The V/S disk name, disk side, and disk location will be displayed, For a list of tapes on a disk, the operator presses the "2" key. At the prompt, the operator enters a disk name from the directory of disks which will be displayed. The up and down arrows or the plus and minus keys scroll the list of disks. The operator presses ENTER and a list of all tapes on the specified disk will be displayed. For a list of disks in disk directory, the operator presses the "3" key. A list of all disks in the disk directory will be displayed by location, jukebox or remote, on the special function panel. The up and down arrows or the plus and minus keys scroll the directory. The ESC key may be pressed at any time to exit from the F15 function.

Inserting and Removing Disks

To insert a disk in the jukebox configuration, the mailbox must be empty and the operator presses function key F15. After pressing the F15 key, a menu will appear. The operator selects choice 1, IMPORT DISK, and slides the disk into the mailbox. To insert a disk in the pedestal configuration, the drive must be empty. The operator slides the disk into the door with the desired side up, A or B. The operator then closes the drive door and presses function key F14 to load the disk, spin it up, and lock the drive door.

To remove a disk from the jukebox configuration, the operator places the READY/NOT READY switch in the NOT READY position using function key F8. Then, the operator presses the UNLOAD key using function key F7. The message display on the screen will show the drive condition while rewind-and-unload is in progress. The display will show an asterisk when the operation is completed. The volume/serial number message will read EMPTY. The operator then presses function key F15 and then presses "2" to export the disk. At the prompt, the operator enters the name of the disk to be removed and then presses ENTER. The disk will be exported to the jukebox mailbox. Next, the operator removes the disk by pulling it straight out when the disk stops in the mailbox door.

To remove a disk from the pedestal configuration, the operator places the READY/NOT READY switch in the NOT READY position using function key F8, and then presses the UNLOAD key using function key F7. The message display on the screen will show the drive condition while rewind-and-unload is in progress. The display will show an asterisk when the operation is completed. The volume/serial number message will read EMPTY. Then, the operator presses function key F14 and then press "E" to eject. When the disk status shows UNLOCKED, the drive door may be opened by applying pressure to its edge. The disk is removed by pulling it straight out. A disk cannot be removed from a B21 drive when a virtual tape from that disk is mounted. During normal operation, the host computer 12 automatically rewinds and unloads a virtual tape when a job completes.

Write-Protecting a Disk

Each side of a disk, A or B, has a write-protect selector that can be set to one of two positions, WRITE or WRITE-PROTECTED. The operators moves the selector to the correct position. To WRITE-PROTECT a disk, the operator moves the arrow in the white movable section of the disk to point to the words WRITE PROTECTED on the disk case. To WRITE on a disk, the operator moves the arrow to point to the word WRITE on the disk case.

Loading the Microprogram

To load the microprogram, the floppy microprogram diskette is inserted in the floppy drive 52 of the controller 14 before power is turned on. The diskette remains in the drive 52 at all times. The controller 14 automatically starts the procedure for loading the microprogram, called Initial Microprogram Load (IML), when power is turned on. When the IML starts, the video display will show the upper portion of the standard display followed by messages showing the progress of the IML. If the IML completes successfully, the complete display will appear. If the IML does not complete successfully, an error will be indicated in the progress messages.

Removing or Restoring Power

To remove power in an emergency, the operator uses an Emergency Power switch during normal operations. In emergency situations, move the emergency power switch to the Power Off position. The emergency power switch is located on the side of the jukebox or on the front panel of MOST pedestal configurations. To restore power, the operator places the emergency power switch in the Power Enable position. The IML procedure will then start automatically if the floppy diskette is in the floppy drive 52.

To turn power off during normal operation, the F2 function key is used to place the control unit offline. Pressing function key F2 places the CUONLINE/CUOFFLINE switch in the CUOFFLINE position. The operator should wait for the CUOFFLINE asterisks to appear. Normally, the CUOFFLINE asterisks appear within a few seconds. However, if a job is running that consists of many chained read or write commands, the CUOFFLINE asterisks might not come on for a half minute to several minutes. The function key F8 is used to set the READY/NOT READY switch to the NOT READY position for each drive. The operator then rewinds and unloads all mounted virtual tapes by pressing the UNLOAD function key F7 on the drive operator panel of each drive. The operator then ejects all loaded disks by pressing the F14 function key, and then pressing "E" for each channel address. Finally, the operator places the Power OFF/ON switch in the OFF position.

To restore power during normal operation, the operator places the Power OFF/ON switch in the ON position. If the IML floppy diskette is in the floppy drive 52, the IML procedure starts automatically. The operator presses function key F2 to place the CUONLINE/CUOFFLINE switch in the CUONLINE position, using the control unit operator setup panel on the video screen.

VMEGate Description

The VMEGate 36 is an off the shelf IBM channel attachment product for both control unit emulators and channel emulators at three or four-point-five mega bytes per second Data Streaming and interlocking capabilities. The VMEGate 36 is supplied by DataWare Development Inc. of San Diego Calif., with microcode which accomplishes specific device emulation. VMEGate 36 is compatible with the FIPS 60-2 I/O Channel and the VME standard. The VMEGate 36 supports I/O protocols that can be programmed to conform to a Selector, Byte Multiplexer, or Block Multiplexer type IBM FIPS 60-2 I/O Channel Interface with data transfer rates being programmable from five-hundred-sixty kilo bytes per second to three or four-point-five mega bytes per second.

VMEGate 36 features: Type two control unit emulation with up to two-hundred-and-fifty-six addressable devices providing multiplexed I/O; I/O channel interface operation in burst mode; I/O channel interface initial selection sequences, command sequences, data transfer sequences, and ending sequences; validates commands; assembles status and sense information; transfer data up to three mega bytes per second or four-point-five mega bytes per second in data streaming mode; VME bus interfacing; VME bus requests; Release-when-done for releasing the VME bus; sixteen mega byte direct addressing range which allows access to the VME bus memory space; Up to two-thousand-and-forty-eight by forty-eight VME bus memory-mapped Writable Control Store (WCS) 80 for microprogram storage, memory and registers positioning, via jumpers, anywhere within the sixteen mega byte addressing range; status registers, command registers, and data-in registers for software interfacing; Board LED status indicators including VMEGate active, VMEGate online, Channel active, and VMEGate data check; and a sixteen bit slice microprocessor ALU 116 operating at six mega instructions per second with a microprogrammed sequencer 86.

The VMEGate 36 and the SBC 40 together with their software can emulate a type two control unit, meaning that more than one channel address can be handled concurrently. I/O operations are initiated and controlled by information passed from the SBC 40 to storage areas on the VME bus 46, and to the VMEGate 36. Data for transfers to and from the host mainframe 12 through the I/O channel 34 are either loaded into or extracted from storage areas as specified by the SBC software. Status information is passed back from the VMEGate 36 to the SBC 40 through specific storage areas of the VME bus 46. For high'speed I/O Channel transfers, the cache memory 38 is connected to the VME bus for block transfers. The cache memory 38 is used because typical memory in the SBC 40 is small in size and slow in speed. The memory of the SBC 40 does will not support block transfers on the VME bus. The cache memory 38 enables block transfers and allows the SBC 40 to remain active for processing channel status and commands while the VMEGate 36 performs data transfers using the cache memory 38.

Figure 5:
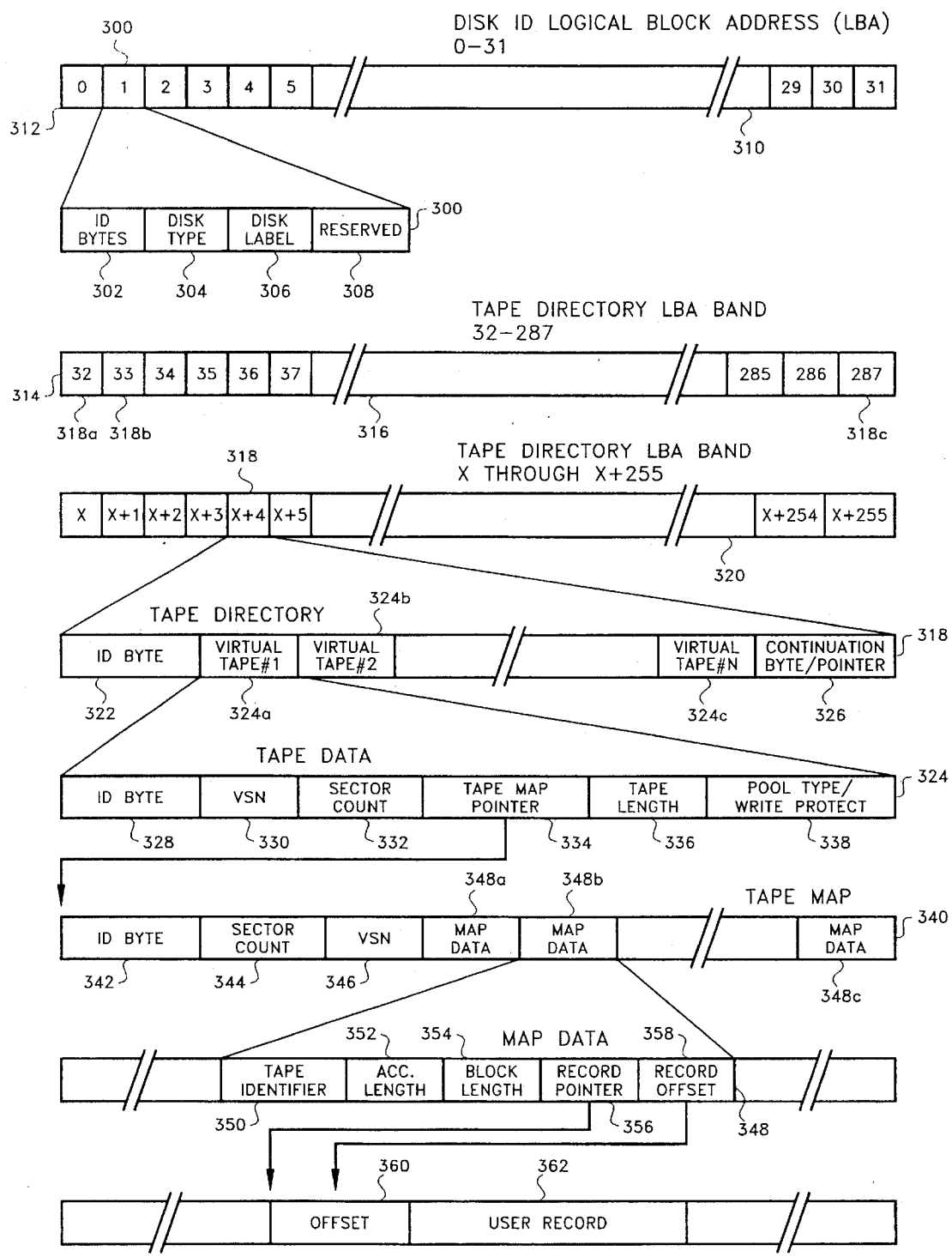
FIG. 5 is a flow diagram of the VMEGate microcode.

VMEGate microcode depicted in FIG. 5 and SBC software depicted in FIGS. 7 through 13 enable the emulation. The VMEGate 36 is a single assembly consisting of two printed circuit cards based on standard VME form factor. The two cards are connected together with standoffs and a common faceplate. This assembly occupies two slot positions when installed in a VME card cage. The VMEGate 36 has a processor board and an Interface Board. The processor board contains both the WCS 80 and command validator memory 126 which must contain the proper data before the VMEGate 36 can be operational. The processor board contains the WCS 80, the sequencer 85, the sixteen bit slice ALU 116, and a number of registers. The I/O channel 34 connects through the CIB 64 to the interface board which contains various buffers as well as the Bus-In register 156 and the Tag-In register 154. The Interface Board contains the necessary circuitry to interface to both the VME bus 46 and the I/O channel 34. Also contained on the interface board are the jumpers to select VMEGate base address, interrupt level, bus arbitration level, and byte offset jumper, all which must be properly set before the VMEGate 36 can be made operational. The byte offset jumper is used for factory test purposes. The interface board accommodates Control Unit Interlocked, Control Unit Data Streaming, Channel Interlocked, Channel Data Streaming, and Custom User Requirements.

The single board computer (SBC) 40 has dual ported memory. I/O operations are initiated and controlled by information passed from the SBC to storage areas on the VME bus, and to the VMEGate registers. Data for transfer to and from the host mainframe 12 is either loaded into or extracted from storage areas as specified by the SBC software. Status information is passed back from the VMEGate 36 to the SBC through specific VME bus storage areas.

Statuses are maintained by the VMEGate 36 but are generated by both the VMEGate 36 and the SBC 40. The SBC 40 generates status based on the CCWs received by the VMEGate 36 and from the state of the SCSI devices. Statuses presented by the SBC 40 are presented to the channel 34 immediately or held until other operations complete depending on the statuses and the circumstances on the channel.

Sense data is generated for errors and whenever a sense command is issued by the channel. Once sense data is created it remains valid until the next command is accepted. 3480 ERPA (Error Recovery Procedure Action) check codes are presented where appropriate to inform the mainframe of the type of error although in general the Recovery Actions would have no effect. Examples of valid ERPA codes would be "Command Reject", "Backwards Motion at Beginning of Tape", "Write Protected", etc.

An Interface Sequence is a fixed pattern of raising and lowering of handshake tags lines in order to carry out a channel transaction. The VMEGate 36 supports the IBM FIPS 60-2 Interface Sequences. The VME bus Interface of the VMEGate 36 includes registers 130, 138, 140, 142, 146 and 148 to perfect the master, slave and interrupt function for the VME bus 46. The VME Eurocard specifications is preferred and includes: data transfer at A24 D16 TOUT equals none, no arbiter, requester is level three, no interrupt handler, and interrupts at level four or level six.

Architecture

The VMEGate 36 is a microprogrammed state machine providing a pathway between the VME bus and the I/O channel 34. The main components of the VMEGate 36 are the bit-slice microprocessor including four 2901 16 bit slice ALU 116 and microprogrammed sequencer 86. Supporting circuitry includes various high-speed MSI and LSI devices. The processor board has sixteen bit wide data paths. The ALU microprocessor 116 includes registers and executes a versatile set of arithmetic and logical instructions. The 2910 sequencer 86 controls the execution sequence of the microprogram. The sequencer 86 has an internal program counter, loop counter and stack and is capable of selecting the next micro instruction address from various sources. With its various support circuits, the sequencer 86 implements conditional branching, looping, vectoring and interrupt controls.

The WCS 80 is a RAM for storage of the VMEGate microprogram. The desired emulation microcode is downloaded from the SBC 40 prior to issuing a start command to the VMEGate 36. Diagnostics or self test routines may also be downloaded. The forty-eight bit wide word provides pipeline processing of I/O Channel commands. The Start-Status Register 136, when written to, is used by the SBC 40 to activate the VMEGate 36 by starting its internal clock generator 78. This is done by writing a one to the LSB position, bit zero. Writing a zero to the Start/Status Register 136 stops the VMEGates clock generator 78 and also allows access to the WCS 80 for downloading and modifying the microprogram.

The command register 94 is a write only register and is used to pass commands and parameters to the VMEGate 36. The VMEGate commands include offline, self test, load command validator, and present status. The command validator memory 126 is a 256 byte RAM which contains the commands and device addresses that are valid for the particular control unit or device being emulated by the VMEGate 36. Valid device addresses and commands are stored in the command validator memory 126. This memory 126 is downloaded and verified by the SBC 40 during initialization. The command register 94 is a slave mode register.

The Data-In register 92 and Data-Out register 90 are used by the VMEGate 36 to read and write data to cache memory 38 or SBC memory or any other memory on the VME bus 46. The information which is transferred may be data or parameters, such as buffer size or buffer addresses. The Data IN and Data Out registers 90 and 90 are master only type registers and are not accessible to the VME bus 46 in slave mode. The Tag-In register 154 controls the rise and fall of VMEGate sourced tag signals on the I/O channel 34. The tag signals are first sourced by the bit slice ALU 116 during normal handshakes and sourced by the Automatic Data Transfer circuit 176 during data transfers. The Tag-Out register 180 informs the ALU 116 of the current states of incoming tag signals on the I/O 34 channel. The Bus-In register 156 and Bus-Out register 166 are similar to the Tag-In and Tag-Out registers 180 and 154 except that, instead of control lines, these registers handle data for I/O transfers.

The VMEGate 36 is capable of automatic data transfers at a rate of up to three or four-point-five mega bytes per second, The automated data transfer circuit 176 is responsible for transferring data to and from the I/O channel 34 and to and from the cache memory 38. The automated data transfer circuit 176 controls all necessary handshake signals from both the I/O Channel 34 and the VME bus 46. The VMEGate 36 enables three or four-point-five mega bytes per second data streaming data rates. In order to accomplish this without overloading the VME bus 46, two first-in-first-out (FIFO) circuits 168 and 142 are controlled by the automated data transfer circuitry 176. The FIFOs 168 and 154 act as temporary buffers for I/O channel data while VME bus arbitration is in progress. The FIFOs 168 and 154 and the automated data transfer circuit 176 maintain a constant flow of data to and from the I/O channel 34 even though VME bus arbitration times may vary. The transfer rate is microprogrammable and can be set from five-hundred-and-sixty kilo bytes per second to three or four-point-five mega bytes per second.

I/O channel operations are controlled by information passed between SBC 40 and the VMEGate 36 through designated memory address areas on the VME bus 46. The software interface between the SBC 40 and the VMEGate 36 is operational during block transfers using the cache memory 38. The cache memory 38 allows the SBC 40 to remain in operation during VMEGate transfers requiring bus arbitration and improves throughput because SBC memory is often slower and therefore not used for block data transfer. The SBC memory buffers contain the status and sense information of the emulated drives. The SBC memory buffers are also used by the VMEGate 36 to store incoming channel commands and data to and from the mainframe 12. Each emulated device has its own string of input and output SBC memory as its memory buffer. The SBC memory buffers can be dynamically allocated and sized. The location and size of the memory buffers is defined by the SBC software.

The VMEGate 36 will interrupt the SBC 40 through a vectored interrupt, requesting SBC attention. The SBC 40 can identify the cause of an interrupt by reading the VMEGate status buffer in the SBC memory. On power up, the VMEGate 36 is offline, and the clock generator is stopped to prevent the bit-slice ALU 116 from accessing the WCS 80. The SBC loads the microprogram into the WCS 80 by writing to the VMEGate within the address range allocated to the WCS 80. Once the microprogram is resident in the WCS 80, the SBC 40 may perform a compare and verification to the original microprogram object code to insure that the download was successful.

After microprogram load verification, a START instruction is issued to the LSB, odd byte, of the VMEGate start register 136 causing the clock generator 78 to start, and causing the sequencer 86 to jump to microprogram address zero, which is the starting location of the VMEGate initialization routine.

The SBC 40 issues a download parameters command to the VMEGate 36 to initialize command, status and data buffer locations in the SBC 40. The SBC 40 reads the VMEGate status register 136 to insure correct initialization. The VMEGate 36 is now ready to begin operation.

The SBC 40 issues an Initialize command to the VMEGate 36 followed by a VME bus address of the Initialization Buffer which contains pointers to buffer addresses for status and data. The SBC 40 then issues a "Download Command Validator Ram" command to the VMEGate 36 to download valid commands and device addresses. At this time the SBC 40 reads the VMEGate status buffer in the SBC 40 to insure correct initialization. If VMEGate initialization was successful, the SBC 40 issues an Online command. The VMEGate 36 is now ready to store any incoming commands or data from the I/O channel 34.

Installation

Before the VMEGate card assembly can be installed in a VME bus system, it is necessary to configure the VMEGate base address, the interrupt level, and the bus arbitration level. These items are predefined. The VMEGate VME bus Memory Map Table defines the VMEGate memory map.

| | VME bus Memory Map Table 32K bytes VME address space | | | |
|---|---|---|---|---|
| ADDRESS | WRITABLE CONTROL STORE | | | REGISTERS |
| A2–A1 | 0 | 1 | 2 | 3 |
| | MICROWORD BITS | | | |
| | 15–0 | 31–16 | 47–32 | 15–0 |
| A3 | | | | |
| ⋮ | 000 | [ ! ] | [ ! ] | [ ! ] | [START/STAT] |
| A14 | | | | |
| | 001 | [ ! ] | [ ! ] | [ ! ] | [ COMMAND ] |
| | 002 | [ ! ] | [ ! ] | [ ! ] | [ not used ] |
| | 003 | [ ! ] | [ ! ] | [ ! ] | [ not used ] |
| | ⋮ | | | |
| | FFF | [ ! ] | [ ! ] | [ ! ] | [ not used ] |

Address lines A14 through A23 and AM0 through AM5 are jumper selectable to allow placement anywhere in the sixteen mega byte range. In order to read microcode via the VME bus 46, the VMEGate 36 must be placed offline and stopped. The VMEGate 36 is offline and stopped, after power up, allowing the SBC 40 to write and read to the VMEGate 36 without having to issue any instruction.

The VMEGate jumpers J1 to J7 are located on the interface board and are labeled J1–J7 and defined as follows: J1 is VMEgate base address of E30000; J2 and J3 is the bus acknowledge level three; J4 is the bus request level three; J5 is the interrupt request level six; J6 is not used; J7 is byte offset on pins two and three. Jumper J1 is used to select the base address. J1 Jumpers pins correspond to address selection table: A23-J1 pin 1; A22-J1 pin 2; A21-J2 pin 3; A20-J2 pin 4; A19-J2 pin 5; A18-J2 pin 6; A17-J2 pin 7; A16-J2 pin 8; and A15-J2 pin 9. The jumper on a address selection pin will indicate address comparison when the address bit is low. Omitting a jumper will indicate true comparison for the corresponding address bit being active high. The jumpers are to be installed between the pins opposing locations. The VMEGate 36 is capable of generating VME bus interrupts on either interrupt level four or six. Selection of I4 or I6 is done by jumper settings at J5. The byte offset jumper J7 is preset connecting pins 2 and 3.

I/O Channel Connection

Connection from the VMEGate 36 and the I/O channel 34 is through the Channel I/O Board 62 by a connector on the VMEgate Interface Board. The cable 66 is used to bring signals to and from the CIB 64 through the Channel I/O Board 62. The CIB 64 is mounted behind a connector panel with the channel connectors protruding through the front of the panel. Another connector on the CIB 64 is provided for the connections through another twisted-pair ribbon cable to the second CIB 64 if it is used. Two molex connectors provide power to the CIB 64 with one to be connected to the power supply 22 while the other for daisy-chaining to a second CIB 64 if it is used.

The CIB 64 contains the receiver and driver circuitry necessary to provide the proper electrical connection to the I/O Channel 34. The CIB 64 contains an Online/Offline Switch, a Select In/Select Out Switch, a Select Jumper and the serpentine connectors for Bus-Out, Bus-In, Tag-Out, Tag-In for the I/O channel 34. A single VMEGate 36 may drive two CIBs 64. However, only one CIB 64 at a time may be active. To configure the CIB 64, there are two items which are user definable. The first item is the board address. Since two CIBs 64 may be selected by the VMEGate 36, under software control, the select jumper is used to select the address of each assembly. If a jumper is connected to select jumper pins one and two, the CIB 64 will be addressed as board "A". If the select jumper is placed on pins two and three, the CIB 64 will be addressed as board "B". The Select-In/Select-Out switch allows the VMEGate 36 to be placed on either side of the channel selection daisy-chain. Throwing both bars of the switch towards the near edge of the CIB 64 will place the VMEGate 36 on the Select-In chain. The Online/Offline switch is a safety switch. When switched to the downward position, it enables software from the VMEGate 36 to cause the CIB 64 to go online. When switched to the upwards position, the CIB 64 is offline disregarding commands from both the I/O channel 34 and the VMEGate 36. This switch should not be changed while the VMEGate 36 is online.

Microcode

On power up, the ALU 116 of the VMEGate 36 is automatically stopped and taken offline to halt the internal clock generator 78 and to prevent the bit-slice ALU 116 from accessing microcode in the WCS 80. Referring to FIG. 5, upon power up, the VMEGate starts executing the microcode at location zero. After self testing which tests the VMEgate 36, initialization 200 is performed. As a part of this initialization, hardware registers, e.g. 138, 154, 156 and 158, are initialized along with internal registers of the ALU 116 which store the same values. The scratch pad memory 120 is cleared along with other registers of the ALU 116 that are used to contain control unit flags and drive flags.

After initialization, the microprogram jumps to the idle loop comprising steps 202, 204, 206, 208, 210 and 212. The microcode checks the idle loop 202–212 to determine if the interrupt processed command data has been saved 202 in scratch pad memory 120. If so, the subroutine 214 is called to recall that data from scratch pad memory 120 in order to set the appropriate flags and save the drive status.

The next test 204 determines if an SBC command has been issued. If so, the SBC command is processed 216. The next test 206 determines if the VMEgate 36 is offline. If so, the microprogram jumps to the top 202 of the idle loop 202 through 212, waiting for the SBC to issue commands to the VMEgate 36.

However, if the VMEgate 36 is online at 206, further tests 208–212 are made. Test 208 determines if the I/O channel 34 has selected the VMEgate 36. If so, the I/O channel command is processed 218. Test 210 determines if the VMEgate 36 has channel status pending. If so, the pending status is processed 220. Test 212 determines if the I/O channel 34 has issued a channel reset. If so, the channel reset is processed 222. At the completion of processing steps 216 to 222, the microprogram jumps to the top of the idle loop 202–212. The microprogram loops through the idle loop 202–212 until one of the above tests 202–212 causes it to jump out of the idle loop to process the condition.

Channel Data Line Definitions

The VMEGate 36 drives eight data lines, to the mainframe 12, named BUS IN 0-7 with BUS IN 0 being the most significant. A ninth line is used to generate odd parity and is called BUS IN P. The term BUS IN refers to all eight bits and parity. When an INITIAL SELECTION sequence is being performed, the VMEGate address is placed on BUS IN at least one-hundred nano seconds prior to the raising of ADDRESS IN. This address remains on BUS IN until ADDRESS IN is dropped. During the data transfer portion of a READ or SENSE command, the data bytes are placed on BUS IN prior to the raising of SERVICE IN or DATA IN and remain on BUS IN until SERVICE OUT or DATA OUT is raised. During status presentation sequences, BUS IN contains control unit status information when STATUS IN is up. The VMEGate 36 receives eight data lines, from the mainframe, named BUS OUT 0-7 with BUS OUT 0 being the most significant. The VMEGate 36 is also capable of monitoring a ninth line, BUS OUT P that carries odd parity for BUS OUT. The term BUS OUT refers to all nine lines. During INITIAL SELECTION sequences, BUS OUT is monitored for the address. At appropriate times, BUS OUT is monitored for correct parity. During data transfers, BUS OUT contains data flowing from the mainframe 12.

The VMEGate 36 monitors the TAG OUT lines, which are driven by the mainframe 12, to detect handshaking and sequence control. When OPERATIONAL OUT is high, all the lines from the channel 34 will be significant. When OPERATIONAL OUT and SUPPRESS OUT are down, all inbound lines from the VMEGate 36 drop, and any operation currently in process over the interface is reset within six microseconds. When ADDRESS OUT is high, the VMEGate 36 decodes the I/O device address on BUS OUT. If the VMEGate 36 recognizes the address, it responds by raising OPERATIONAL IN when SELECT OUT, or HOLD OUT, rises with ADDRESS OUT still high except in the short-busy sequence. ADDRESS OUT is also used by the mainframe 12 to signal an Interface Disconnect. When an operation is being initiated by the channel 34, SELECT OUT and ADDRESS OUT which indicate the address of the device being selected, rise and stay up until the VMEGate 36 recognizes its address and raises SELECT IN, or ADDRESS IN and OPERATIONAL IN or STATUS IN. When the VMEGate 36 raises SELECT IN, SELECT OUT drops and does not rise again until after SELECT IN falls. The VMEGate 36 becomes selected only when it raises its OPERATIONAL IN. HOLD OUT is a line from the channel 34 to all attached control units and is used in conjunction with SELECT OUT to synchronize VMEGate selection.

During the INITIAL SELECTION sequence and control unit initiated sequences, COMMAND OUT is raised in response to ADDRESS IN in order to indicate proceed. During the initial selection sequence, COMMAND OUT is raised at least one-hundred nano seconds after the command byte is placed on BUS OUT. COMMAND OUT then falls when STATUS IN rises. During data transfers, COMMAND OUT rises to indicate that the byte count has been exhausted, that is, that the entire data set has been transferred and that the transfer is complete. During status presentation sequences, COMMAND OUT is raised in response to STATUS IN rising in order to stack status. In this case, COMMAND OUT remains high until STATUS IN falls. During status presentation sequences, SERVICE OUT is raised in response to STATUS IN in order to accept the status presented. SERVICE OUT is lowered after STATUS IN falls. During byte mode data transfers, SERVICE OUT is raised in response to SERVICE IN rising. During WRITE and CONTROL commands, SERVICE OUT rising indicates that the data on BUS OUT has been valid for at least one-hundred nano seconds. During READ and SENSE commands, SERVICE OUT rising means that the data on BUS IN need no longer be valid. During the SELECTIVE-RESET sequence, SUPPRESS OUT is raised at least two-hundred-and-fifty nano seconds prior to OPERATIONAL OUT falling and then lowered at least two-hundred-and-fifty nano seconds after OPERATIONAL OUT rises. After CHANNEL END or DEVICE END status has been presented, SUPPRESS OUT may be raised to indicate command chaining. SUPPRESS OUT may also be used to suppress status. The CLOCK OUT line is not used in the I/O channel 34 and therefore not monitored by the VMEGate 36. METERING OUT is a channel line to condition meters of attached control units. The VMEGate 36 does not make use of this line. MARK 0 OUT is not monitored. The VMEGate 36 will not support the optional bus extension feature. DATA OUT is a tag line from the channel 34 to all attached control units and is used in response to the rise of DATA IN. These lines are used in conjunction with SERVICE OUT and SERVICE IN to perform high speed interlocked and data-streaming mode transfers.

The TAG IN lines are asserted by the control units and monitored by the mainframe 12. The TAG IN lines are used for handshaking and sequence control. OPERATIONAL IN is a tag line from all attached control units, e.g. the VMEGate 36, to the I/O channel 34 and is used to signal the channel 34 that an I/O device has been selected. OPERATIONAL IN stays up for the duration of the selection. The selected I/O device is identified by the address byte transmitted over BUS IN when ADDRESS IN was raised. ADDRESS IN is a tag line from all attached control units to the channel 34 and is used to signal the channel 34 when the address of the currently selected I/O device has been placed on BUS IN. During an INITIAL SELECTION sequence or control-unit-initiated sequence, the channel 34 responds to ADDRESS IN by raising COMMAND OUT. ADDRESS IN must fall so that COMMAND OUT may fall. ADDRESS IN is not up concurrently with any other inbound tag line. STATUS IN is a tag line used by the VMEGate 36 to present indications of its current status. The status byte has a fixed format and contains bits describing the current status at the control unit. The channel 34 responds by raising either SERVICE OUT or COMMAND OUT. SERVICE IN is a tag line used by the VMEGate 36 to transfer data between the VMEGate 36 and the channel 34. It signals the channel 34 when the selected device is ready to send or receive a byte of information. This line may be used with DATA IN when faster transfer rates are selected. The DATA IN tag line is used for high speed transfers and data transmission requests from the control unit. The VMEGate 36 can transmit and receive data at a rate of up to three or four-point-five megabytes per second in data streaming mode, making use of this line together with SERVICE IN. SELECT IN is a tag line that extends the SELECT OUT signal from the jumper in the cable terminator block of the channel 34. It provides a return path to the channel 34 for the SELECT OUT signal. REQUEST IN tag line is raised by the VMEGate 36 to indicate to the host that it requires service and is requesting a selection sequence. DISCONNECT IN is a tag line raised by the VMEGate 36 to cancel ongoing channel activity and alert the channel 34 of a malfunction that affects the continued-execution capability of the VMEGate 36. MARK 0 IN is a tag line used by the VMEGate 36 together with Channel End, Unit Check and Status Modifier bits in the device status to signal a request for a retry of the previous command.

Interface Sequences

An Interface Sequence is a fixed pattern of raising and lowering of control lines in order to carry out a channel transaction. The VMEGate 36 will support the following IBM 360/370 (FIPS 60-2) I/O channel 34 to Control Unit Interface Sequences. Initial-Selection Sequence is used to initiate an operation between the channel 34 and a control unit. Initial selection is used by the VMEGate 36 to recognize the address placed on BUS OUT by the channel. SELECT OUT is kept from propagating further and the VMEGate microcode handles the interface sequence until data transfer starts. The address of the I/O device is placed on BUS OUT and ADDRESS OUT is raised. The channel 34 then raises HOLD OUT followed by SELECT OUT. At this point one of three acceptable events can occur. If SELECT IN rises, then no control unit recognized the address, and an appropriate code is then passed, and ADDRESS OUT, HOLD OUT, and SELECT OUT are lowered. If STATUS IN rises, a short-busy sequence occurs. If OPERATIONAL IN rises, the initial-selection sequence continues.

Data transfer sequence occurs after a good initial status has been presented to the channel 34 from the selected device. The transfer of bytes is synchronized with the toggling of SERVICE IN and SERVICE OUT and also DATA IN and DATA OUT when in high speed interlocked or data-streaming. COMMAND OUT is raised in response to SERVICE IN to terminate the data transfer. If at any time during the data transfer sequence, either STATUS IN or DISCONNECT IN rises, or parity is bad, the data transfer will be terminated.

Recognition of exceptional, and asynchronous channel sequences such as Interface Disconnect, Selective Reset and System Reset ensures that channel timing specifications are met. The control-unit-initiated sequence occurs when the control unit initiates a transfer by raising REQUEST IN. If the channel 34 is not busy with other duties, it raises HOLD OUT and then SELECT OUT in order to select the I/O device. At this point OPERATIONAL IN rises, followed by ADDRESS IN rising. The channel 34 then raises COMMAND OUT, after which ADDRESS IN falls; COMMAND OUT is then lowered and this concludes a control-unit-initiated sequence. The ending sequence consists of the presentation and acceptance of status. This can be the same as initial status, it can follow initial status, it can follow the data transfer sequence, it can follow a control-unit-initiated sequence, or follow another ending sequence. Once STATUS IN is high, the channel 34 raises SUPPRESS OUT if command chaining is to be indicated, and then raises SERVICE OUT. Once STATUS IN falls, SERVICE OUT is lowered.

During the execution of an I/O operation, the interface-disconnect sequence may be used by the channel 34 to signal the control unit to end execution of an ongoing I/O operation. If HOLD OUT is down and ADDRESS OUT rises or if ADDRESS OUT is up and HOLD OUT falls, the presently connected control unit has to drop OPERATIONAL IN, thus disconnecting from the interface.

The selective-reset sequence is generated by the channel 34 and may occur anytime OPERATIONAL IN is up. Selective reset is indicated whenever SUPPRESS OUT is up and OPERATIONAL OUT drops. This condition causes OPERATIONAL IN to fall and causes the particular I/O device in operation, and its status, to be reset.

The system-reset sequence is used to reset all control units and I/O devices that are online. System reset is indicated whenever OPERATIONAL OUT and SUPPRESS OUT are down concurrently and the I/O device is in the online mode. This condition causes all BUS IN and TAG IN signals to fall and all control units and their attached I/O devices to return to their reset state.

Other Sequences supported by the VMEGate 36, include Short Busy, High Speed Data Transfer, Data Streaming; Interface Disconnect, Command Chaining, Suppress Status, and Stack Status.

SBC Software Interface

I/O channel operations are controlled by information passed between the SBC 40 and the VMEGate 36 through designated storage areas on the VME bus 46 called registers or buffers. These registers and buffers preferably in the memory of the SBC 40 or the cache memory 38 will contain status and sense information for one or more devices. These registers and buffers will be used by the VMEGate 36 to store incoming channel commands and data in an input buffer, as well as to read outgoing data, from an output buffer, to the mainframe 12. Each device has its own string of input and output buffers. These buffers can be dynamically allocated as well as changed in size. The location and size of the buffers is defined by SBC software during initialization or during run time. The VMEGate 36 is capable of generating vectored interrupts in response to certain VMEGate status conditions such as buffer requests. The SBC 40 can identify the cause of an interrupt by reading the VMEGate status buffer in the SBC memory.

Writable Control Store Memory

The SBC 40 downloads the VMEGate microprogram by writing into the WCS 80 through a transceiver, the DTB SLAVE. The starting base address is defined by the jumper settings. A memory map depicting the address space is shown in VMEGate VME bus Memory Map Table. With this addressing scheme, the VMEGate 36 requires sixteen K words or thirty-two kilo byte address space.

After microprogram validity has been determined, a START instruction can be issued by writing a one to the LSB of the Start/Status Register 136. This enables the clock generator 78 and the sequencer 86 to start execution of the micro-instruction at address zero, which should be the starting location of the VMEGate initialization routine.

Registers

The VMEGate 36 contains both slave registers 88, 94 and 136 and master registers 90, 92 and 146. The slave registers 88, 94 and 136 can be accessed by the SBC 40 during memory reads or writes to the VMEGate address space as defined in the VMEGate SBC/VME Address Table. The master registers 90, 92 and 146 are used to perform data transfers on the VME bus 46 to and from the VMEGate 36. The VMEGate slave registers 88, 94 and 136 can be accessed by the SBC 40 through the VME address space shown in the VMEGate SBC/VME Address Table.

| VMEGate SBC/VME Address Table | | |
|---|---|---|
| ADDRESS | REGISTER NAME | USED FOR PASSING |
| BASE + 6H | START (write) | Activates the VMEGate |
| BASE + 6H | STATUS (read) | Active status, and data check |
| BASE + 0EH | COMMAND (write) | VMEGate commands (from SBC) |

The Start/Status register 136, when written into, is used by the SBC 40 to deactivate the VMEGate 36. Writing a zero to the Start/Status Register stops the clock generator 78 and also allows access to the WCS 80 for downloading or modifying of the VMEGate microprogram. Issuing a read to this register 136 will present two status conditions. If the LSB is a one, it indicates that the VMEGate 36 is stopped and microprogram download may proceed. If this bit is a zero, it indicates that the VMEGate 36 is active. The second status condition is VMEGate System Check and is indicated by bit one being a zero. This condition also causes the red "SYS CHK" LED to light up. Other status information such as channel or device status can be presented to the SBC 40 by the VMEGate 36 through a status buffer in SBC memory.

The command register 94 is used by the SBC 40 to pass commands and parameters to the VMEGate 36 for processing at 216. The Initialize command is issued after the VMEGate microprogram has been downloaded and the VMEGate has been activated by writing a one to the start register 136, which initialize command sets the VMEGate buffer address pointers. The Online command will allow the VMEGate 36 to respond to I/O Channel Initial Selection Sequences. The Offline command instructs the VMEGate 36 to not respond to Initial Selection. The Self Test command instructs the VMEGate 36 to execute self testing when offline. The Download Command Validator Memory command instructs the VMEGate 36 to load the Command Validator Memory 126 from a buffer in SBC memory with the address of this file is passed to the VMEGate during initialization. The present status command instructs the VMEGate 36 to update its Status Buffer located in VME system memory.

The Data-In register 92 and Data-Out register 90 are used by the ALU 116 in the VMEGate 36 to read and write data to VME bus memory. The data transferred may be data or status information such as device busy or buffer addresses. These registers 90 and 92 are master only type registers and are not accessible through the VME bus 46 when the VMEGate 36 is in the slave mode.

The address counter 132 is a master type register and is used by the VMEGate 36 to generate a VME bus address. This counter 132 will be loaded with the address of data or status buffer locations passed from the SBC 40 to the VMEGate 36 during initialization. Together with the Data-In register 92 and the Data-Out register 90, the address counter 132 will allow direct memory transfers to be performed by the VMEGate 36.

Command Validator Memory

The Command Validator Memory (CVM) 126 is a RAM used to facilitate the decoding of channel addresses and commands in the VMEGate 36. After the SBC 40 issues the Initialize command and before the SBC 40 can place the VMEGate 36 online to the I/O channel 34, the SBC 40 has to initialize the CVM 126 by using the Download CVM command.

The SBC downloads the CVM 126. The SBC 40 first makes sure that the Busy flag for the VMEGate 36 in the Command Status Word is cleared so that the VMEGate 36 is not busy processing another SBC command. The SBC 40 then places the Command Validator data file in its memory buffer at the starting address which was passed to the VMEGate 36 during initialization. The SBC 40 then sets the Busy flag of the VMEGate 36. Next, the SBC 40 writes the command code of the Download CVM command into the command register 94 of the VMEGate 36. Then, the VMEGate 36 reads the data file from SBC memory into CVM 126, starting from location zero. The upper byte of the data word is first loaded into the CVM 126. That is, the upper byte, bits eight to fifteen, of the first word is loaded into location zero, bit fifteen into bit seven, of the CVM 126, and, the lower byte is loaded into location one. For the first word, bits fifteen to eight are loaded into location zero and bits seven to zero are loaded into location one. For the second word, bits fifteen to eight are loaded into location two and bits seven to zero are loaded into location three, etc. After all one-hundred-and-twenty-eight words, which is two-hundred-and-fifty-six bytes of data, have been transferred, the VMEGate 36 clears its Busy flag in the Command Status Word.

The SBC 40 can verify the validity of the data downloaded into the CVM 126 by performing the Upload CVM command. This command can only be executed when the VMEGate 36 is offline. The procedures for the Upload CVM command is similar to the Download CVM command except that the contents of the CVM is transferred to VME bus memory at the Command Validator Buffer address that was passed to the VMEGate 36 during initialization, and that, the SBC 40 has to compare the data after the Busy flag of the VMEGate 36 is cleared. The data format of the CVM 126 is defined as follows: bit seven is Valid Channel Address; bit six is Valid Channel Command; bit five is Uninstalled Device; bits four to zero are the encoded mapping vector of the channel command if bit six is set.

The address of the CVM is zero to two-hundred and fifty-five and corresponds to the channel commands and also the channel addresses. For example, for a control unit with sixteen devices, if $50h$ is a valid channel address, bit seven in location $50h$ should contain a one. If $54h$ is a valid channel command, bit six of location $54h$ should be a one and bits four to zero should have the mapping vector of the command. Bit seven of location $54h$ should also be set, because $50h$ to $5Fh$ are all valid addresses.

SBC Software

MOST 10 emulates an IBM 3480 Cartridge Tape drive using up to sixteen Optical disk drives 16 and four robotic jukeboxes 18. SBC software integrates the actions of the four I/O interfaces including the IBM (FIPS 60) Channel 34 using the VMEGate 36, the SCSI optical drives interface port 17 using the Ciprico Rimfire 3504 VME bus SCSI board 42, the jukebox RS-232 interface port 19 using the XYCOM XVME-420 VME bus Serial I/O board 44, and, the operator RS-232 interface ports 25 and 27 using the GMS V06 Single Board Computer 40.

Figure 7:
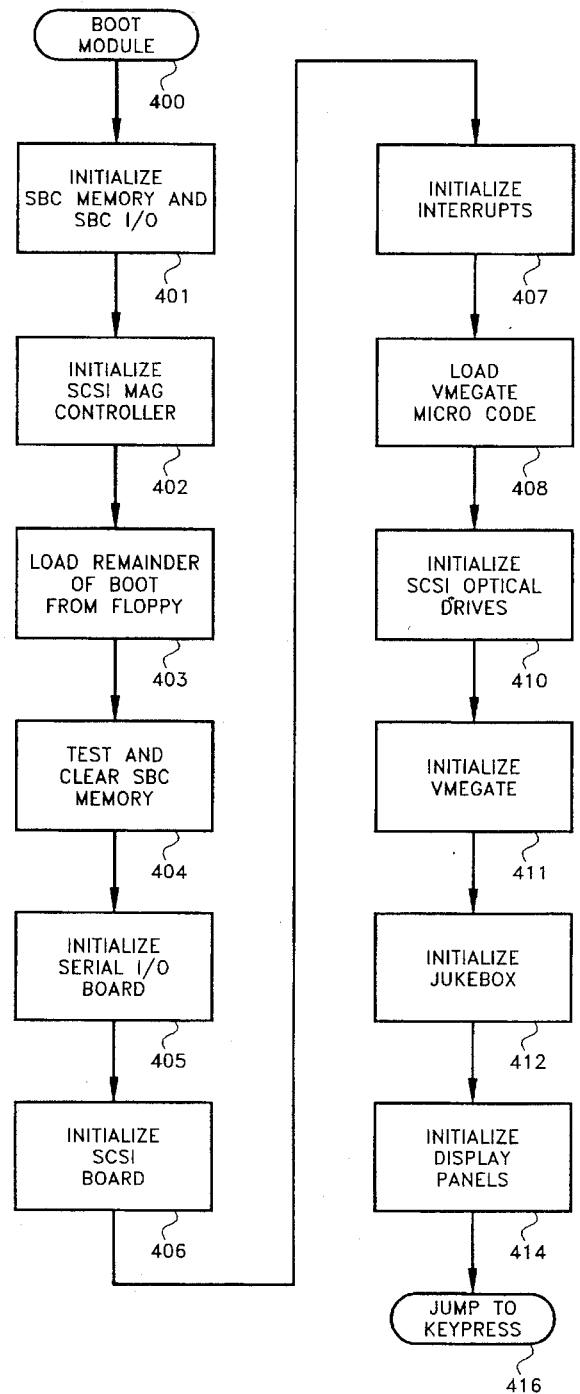
FIG. 7 is a flow diagram of the BOOT SBC software module.
Figure 8:
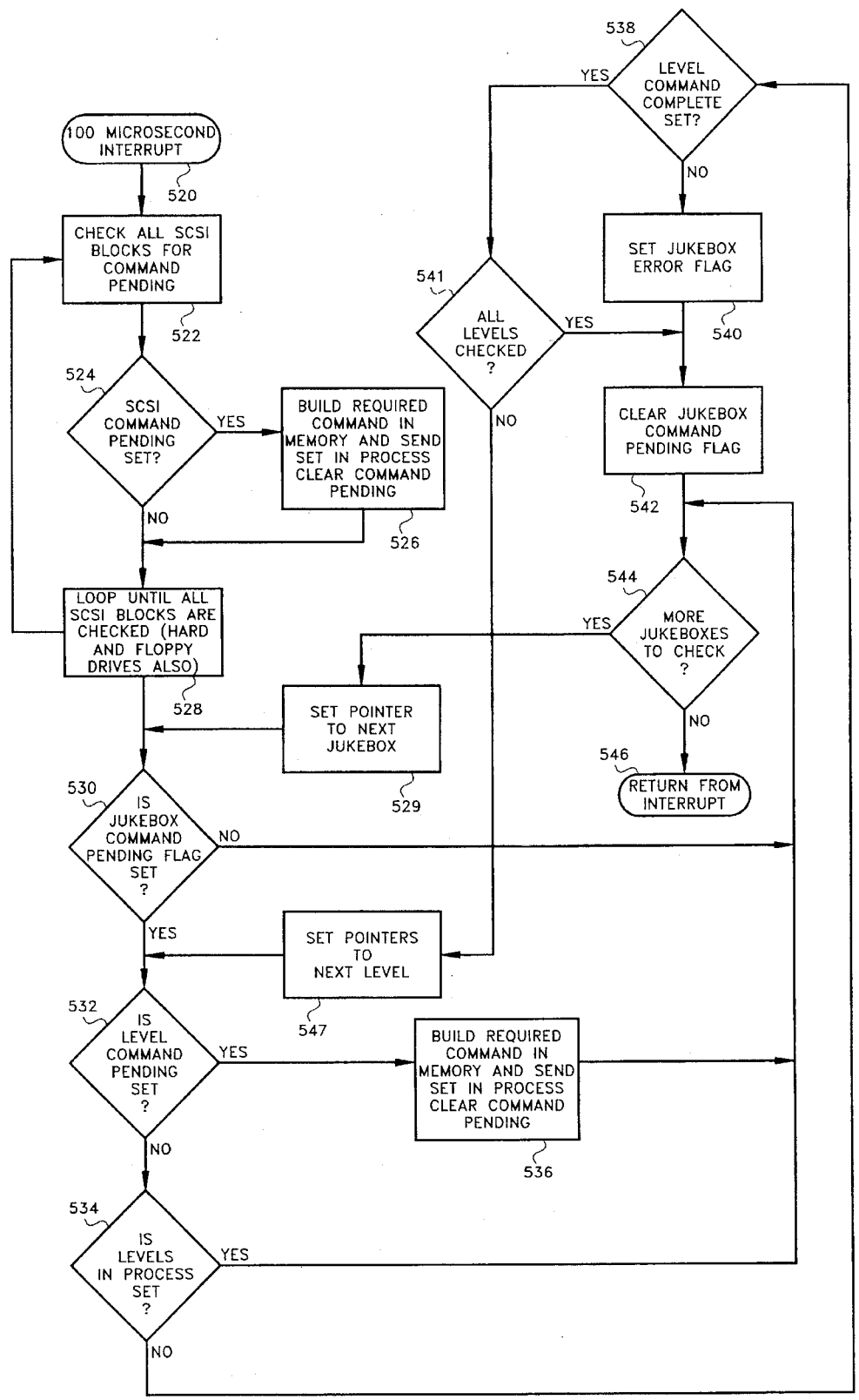
FIG. 8 is a flow diagram of the VMEGate Interrupt Handler SBC software module.
Figure 9:
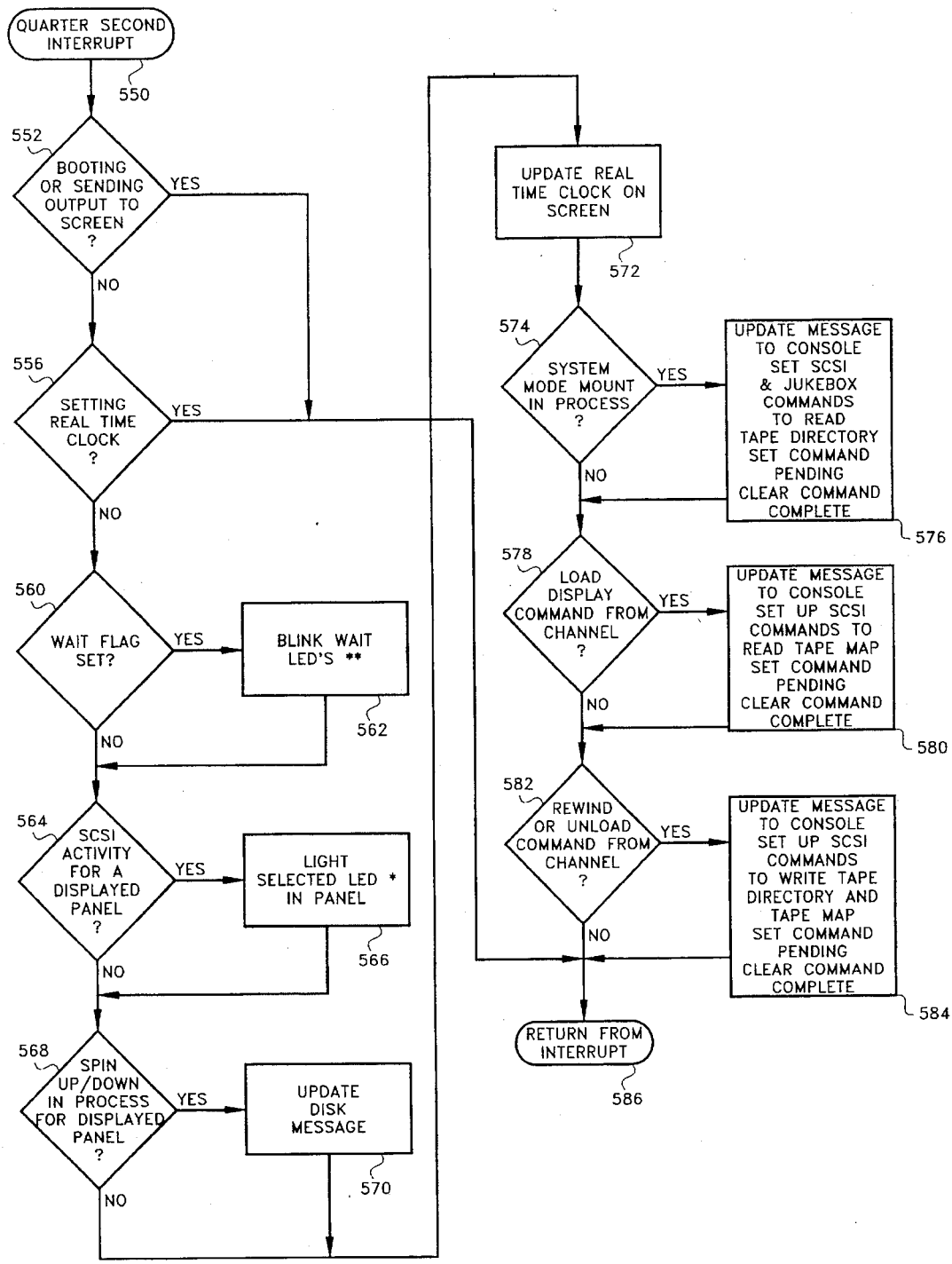
FIG. 9 is a flow diagram of the Jukebox Interrupt Handler SBC software module.
Figure 10:
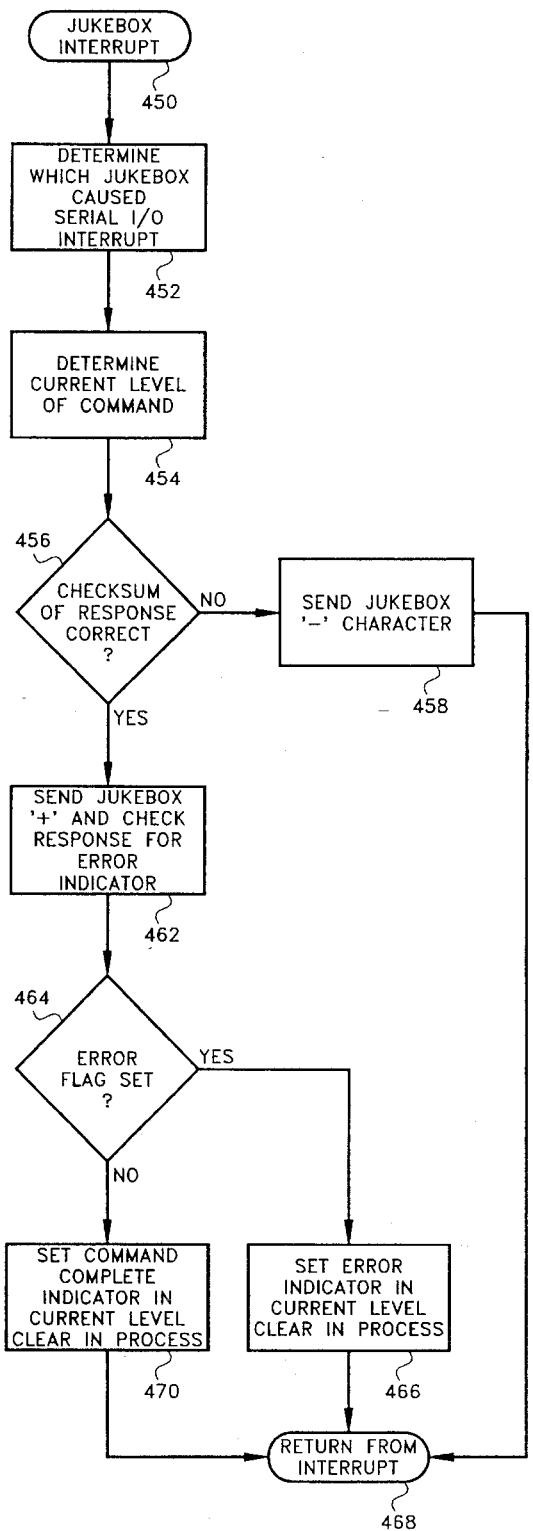
FIG. 10 is a flow diagram of the SCSI Interrupt Handler SBC software module.
Figure 11:
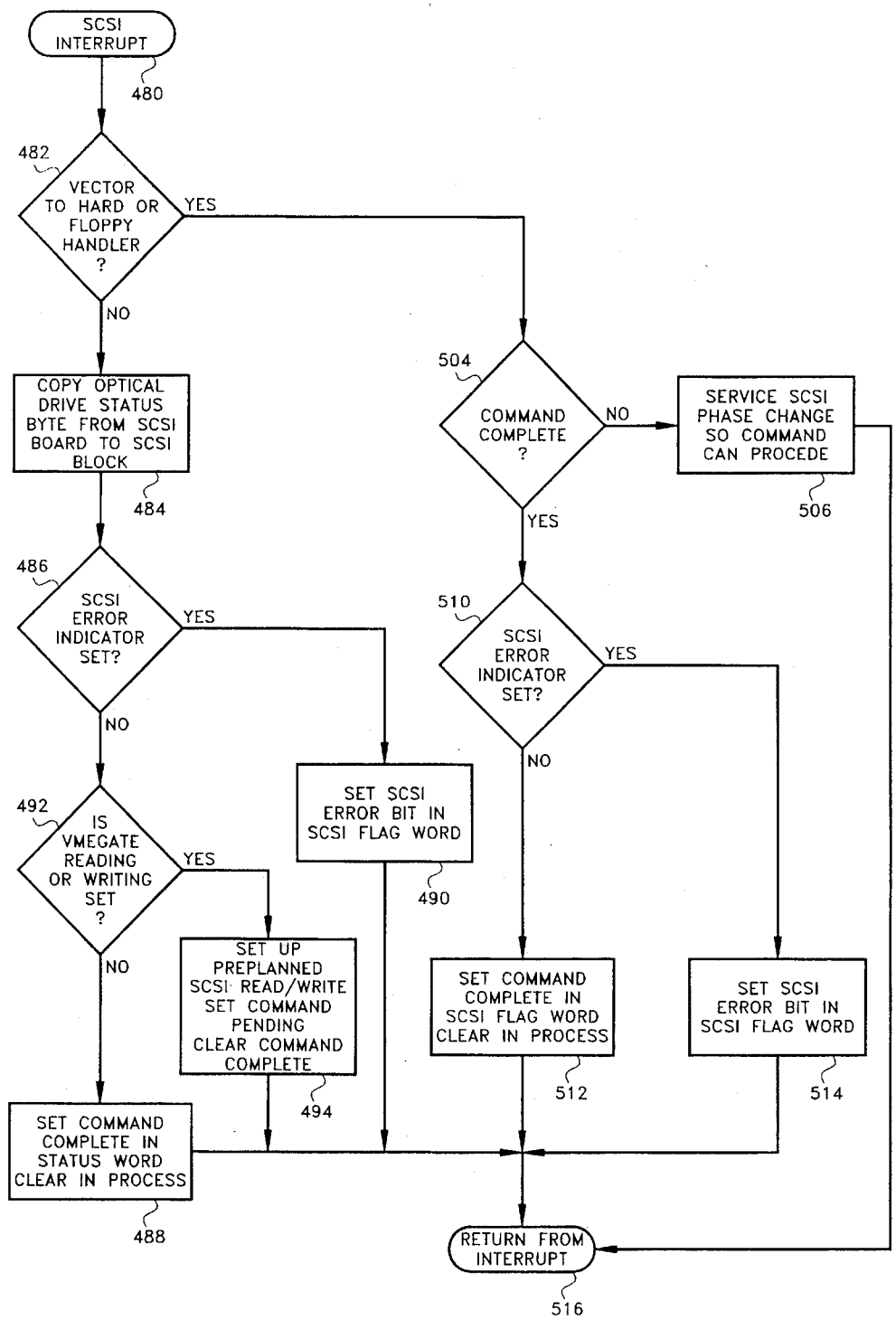
FIG. 11 is a flow diagram of the 100 Microsecond Interrupt Handler SBC software module.
Figure 12:
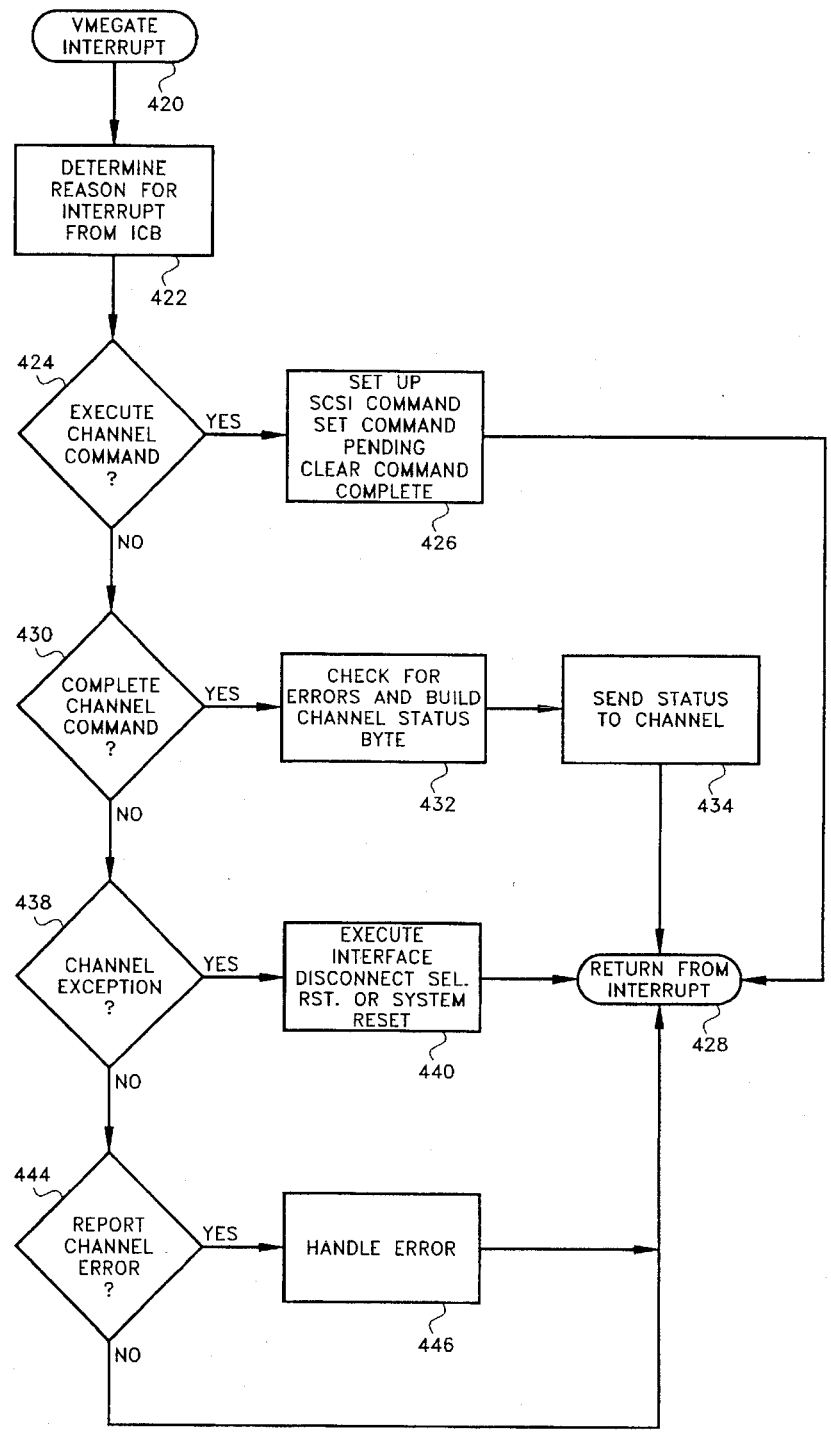
FIG. 12 is a flow diagram of the Quarter Second Interrupt Handler SBC software module.
Figure 13:
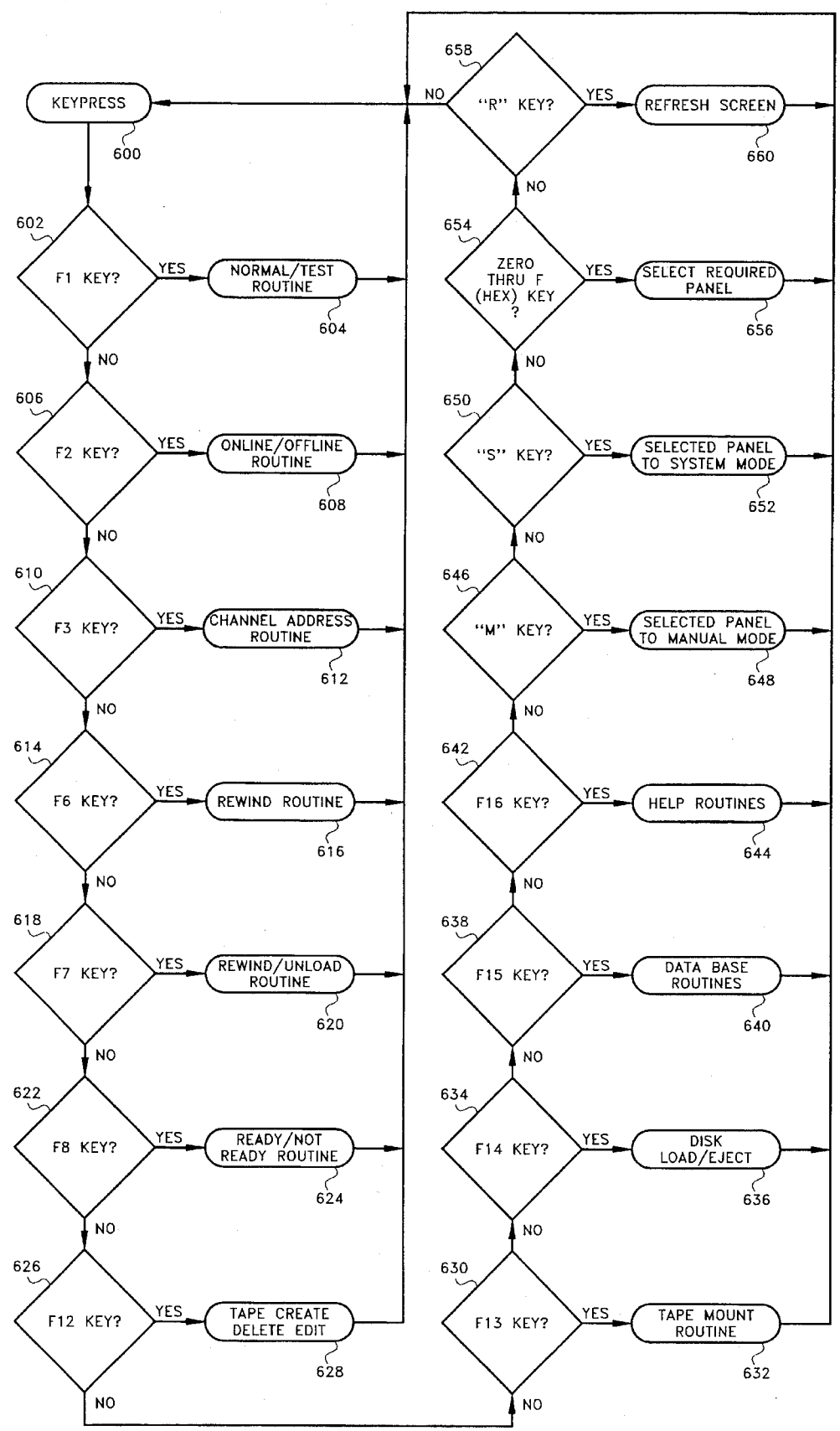
FIG. 13 is a flow diagram of the Keypress SBC software module.

The SBC software for MOST 10 consists of seven distinct modules. Referring to FIGS. 7–13, each module runs under a different interrupt levels of the microprocessor on the SBC 40. The modules communicate with other modules through flags and pointers which reside in the SBC memory. The keypress module 600–660 shown in FIG. 13 for operator interface is priority level zero. The quarter second interrupt handler module (QIHM) 550–586 shown in FIG. 12 is at priority level three for screen updates in response to flags set by VMEGate interrupt handler module. The one-hundred microsecond interrupt handler module (OIHM) 520–546 shown in FIG. 11 is at priority level four for SCSI command initiation and jukebox command initiation. The SCSI interrupt handler module (SIHM) 480–516 shown in FIG. 10 is at priority level five for SCSI command completion and continuation. The jukebox interrupt handler module (JIHM) 450–472 shown in FIG. 9 is at priority level five for jukebox command completion and error recognition. The VMEGate interrupt handler module (VIHM) 420–448 shown in FIG. 8 is at priority level six for I/O channel interface maintenance. The boot module 400–416 shown in FIG. 7 is at priority level seven for setting the hardware configuration, enabling interrupts, VMEGate microcode downloading, and jumping to the keypress module.

The boot software 400 resides in EPROM and is responsible for accessing the floppy drive 52 and downloading the remainder of the SBC software from the floppy disk. The Boot software 400 is executed when power is applied or when a reset button, not shown, is pushed. The Boot software 400 initializes and uses the SCSI board 42 directly rather than through the OIHM or through the SIHM. The Boot software 402–416 initializes MOST 10 and then provides an operational interface to the user.

The QIHM is executed every N times through the OIHM where N is defined in a header file. The QIHM is used to update the console video screen and determine if the state of MOST 10 has changed by looking at parameters in each of the online CABs and SBBs. Changes are recognized by the QIHM. The changes include: New messages sent from the mainframe 12 using the Load Display CCW; Initiating and maintaining system mode disk retrieval and virtual tape mounting in response to mount messages from the mainframe 12; Rewind Unload CCWs which make a drive Not Ready; Tape motion CCWs which erase certain Load Display CCW messages; Any CCW executed which causes the WAIT "LED" on the video screen to blink; Optical drive action which causes the SELECTED "LED" on the video screen to turn on; Jukebox action which causes the messages "SPIN-UP", "SPIN-DOWN", and "UNLOCKED" to appear in the disk message area on the video screen.

Every one-hundred microseconds, the OIHM is executed to determine whether there is any SCSI operation pending for each drive 16. If there is a COMMAND PENDING, the command specified in the Command Descriptor Block structure of the SBB will be issued and the drive 16 remains IN PROCESS until the SCSI command is recognized as completed by the SIHM.

SCSI activity can be set up in the SBB by either the SIHM, VIHM, QIHM or keypress module. At any given time, only one module can initiate this activity. Which software module has this control depends on the state of MOST 10. The keypress module can only initiate SCSI activity when the channel address is logically NOT READY. This means that either no virtual tape is mounted, or the controller 14 is offline, or the Ready/Not Ready switch is in the Not Ready position. Keypress module initiated SCSI activity consists of: spinning up and down disks, reading disk IDs and tape directories when Loading and Unloading disks manually; creating, deleting or editing virtual tapes; and mounting virtual tapes. The QIHM can only initiate SCSI activity when writing tape maps when a virtual tape is rewound and unloaded or when writing a tape directory prior to a disk ejection. The QIHM can also initiate SCSI activity when responding to mount messages when in the system mode, when the controller 14 is online, when the Ready/Not Ready switch is in the ready position, and, when there is no virtual tape currently mounted. Quarter second interrupt SCSI activity consists of: writing tape maps when rewinding and unloading virtual tapes; writing tape directories prior to ejection; spinning up and down disks; and reading disk IDs and tape directories when loading disks in the system mode. The SIHM can only initiate SCSI activity when a virtual tape is mounted, when the Ready/Not Ready switch is in the Ready position and when and the Controller is online, but only if preplanned SCSI activity has been set up in support of mainframe initiated Reads, Read Backwards and Writes. SCSI interrupt initiated SCSI activity consists of Reads and Writes of Data Records in response to and in anticipation of mainframe Read and Read Backwards commands. The VIHM can initiate the first SCSI Read or Write in a sequence of Reads or Writes in response to or anticipation of mainframe requests. This VIHM SCSI initiated activity is subject to the same constraints as is the SIHM SCSI initiated activity. SCSI activity is generally continued by the SIHM. In a similar manner and if there is a COMMAND PENDING for a jukebox, a jukebox command will also be initiated at the one-hundred Microsecond interrupt level. Jukebox commands can be initiated either by the keypress module or by the QIHM when in the system mode. After each call of the OIHM, a counter is decremented. When the counter is zero, the QIHM is called. The QIHM is executed at a lower interrupt level than the OIHM so that one-hundred microsecond interrupts continue to execute even while the QIHM is being executed.

The SIHM is activated whenever a SCSI I/O board 42 issues an interrupt to the SBC 40. The SIHM interprets the status presented by the SCSI I/O board 42 and takes action based on it. SCSI status is stored in the SBB for the appropriate drive 16. Status indicating COMMAND COMPLETE, is also stored in the SBB.

SCSI activity initiated by the VIHM cannot be monitored by the VIHM because the VIHM has a higher interrupt priority than either the SIHM or the OIHM. There is a branch 492 in the SIHM that is executed whenever a Read or Write of channel data to or from the virtual tape is complete. This branch 492 determines if there is sufficient data in the data buffer to justify a successive SCSI Read or Write. If there is, software 494 sets up the SCSI command, and then, returns from interrupt. COMMAND COMPLETE is not indicated, but instead COMMAND PENDING is set in software 494. The next execution of the OIHM will start the command, and later calls of the SIHM will complete it and perhaps reissue new commands at software 494.

The VIHM is responsible for maintaining the internal state of the flags and arrays of the CABs based on channel activity. The channel activity is reported to the SBC 40 through VMEGate interrupts. In the case of Read, Read Backwards and Write CCWs, the VIHM sets up SCSI commands. The next execution of the OIHM will start the processing of the SCSI command and the SIHM will complete the command, possibly initiating further SCSI commands.

In the case Forward Space File, Backward Space File, and, Locate tape motion CCWs, pointers in the CAB are updated directly by the VIHM. Unit status and sense bytes are maintained by the VIHM. Each channel address can be in various states which are defined by the states of bits in the CAB and condition of the optical drives and their SBBs. The states are changed through the actions of the keypress module, the VIHM, and the QIHM.

Each disk drive 16 and disk 20 is either loaded or ejected. When a disk 20 is loaded, the operator can create, delete, edit or mount virtual tapes that reside on that loaded disk. Ejecting a disk 20 makes these functions unavailable for that disk but frees the drive 16 so that another disk 20 can be loaded. The sequence for loading a disk consists of placing the disk in the drive and selecting the load disk function at software 636. The disk 20 is then spun-up and the disk ID and tape directory are read. If the disk ID and tape directory are read successfully, the disk 20 is considered logically loaded. If any of these conditions were not true, such as no disk ID, no tape directory or the disk was not spinning, the operator is presented with the reason on the video screen why the load operation failed. Once a disk is loaded, it remains in that state until the eject disk function is selected, or the load function respecting another disk is selected.

The SBC software keeps the operator from ejecting a disk 20 without first dismounting any virtual tape that may be currently mounted. The logical ready state of a drive 16 means that a virtual tape is capable of being written to or read from by the I/O Channel 34. The keypress module can only initiate SCSI activity for a drive 16 when that drive 16 is logically not ready. SCSI activity includes disk load and unload functions and create, edit, delete and mount virtual tape functions. MOST 10 cannot respond to some CCWs unless the drive 16 is in the logically ready state. The drive 16 is under the control of the I/O Channel 34 when it is logically ready, or, under the control of the operator when it is logically not ready.

A drive 16 is in the logically ready state when the ready/not ready switch is in the ready position, and when a virtual tape is mounted. If one or more of these conditions is not true, the drive 16 is logically not ready. When a drive 16 is logically not ready and becomes ready when the last of these three conditions becomes true. The keypress module recognizes this condition and issues the GO READY command to the VMEGate 36. At this point, the drive 16 can be made logically not ready by a rewind unload CCW from the I/O Channel 34.

The drive 16 can also be made logically not ready by the operator by changing the state of the ready/not ready switch or the controller 14 online/offline switch, but this may risk data destruction if the I/O Channel 34 is transmitting Read or Write CCWs at the time. When the drive 16 is made logically not ready by the operator, the keypress module issues a GO NOT READY command to the VMEGate 36. During normal activity, the VMEGate 36 responds to channel commands with statuses and data transfers.

Upon application of power or a system reset, the boot module is executed. All system memory will be initialized 402 to zero. Next, the Serial I/O board 44 is initialized 404 for RS-232 communications by sending configuration commands to the serial I/O board 44. The SCSI board 42 is then initialized 406. Next, the interrupts are initialized 408 by programming the timer circuitry on the SBC 40. The video screen of the console 24 is then initialized 410 to the normal operating display. The optical drives 16 and jukeboxes 18 are then initialized 412 and 414, respectively. Then, the code will jump 416 to the keypress module.

The VIHM is responsible for taking the appropriate actions in response to CCWs from the I/O Channel 34. Once the VMEGate 36 interrupts the SBC 40, the reason for the VMEGate interrupt is determined 422 by examining the information written into the ICB buffer by the VMEGate 36. If the reason for the VMEGate interrupt is determined to be the result of a CCW command 424, then the appropriate function which sets up and initiates the appropriate response 426, is executed followed by a return from interrupt 428.

If the VMEGate interrupt is determined to require the completion of a CCW 530, then it is determined whether any errors occurred during the execution of the CCW command. Next, the channel status byte is determined and set 432. The VMEGate 36 is then sent this status byte. The VMEGate 36 in turn sends this status byte 434 to the I/O Channel 34 and then returns from interrupt 436. If the VMEGate interrupt is in response to a channel exception 438, the SBC will either perform an interface disconnect, selective reset, or system reset action 440 followed by return from interrupt 442. If the VMEGate interrupt requires the reporting of a channel error 444, then the error is handled at 446 by updating the channel sense bytes and channel status byte followed by a return from interrupt 448.

The JIHM occurs in response to a jukebox interrupt which occurs when a jukebox 18 sends a message through the RS-232 interface port 19. The JIHM first determines 452 which of the four possible jukeboxes 18 caused this jukebox interrupt. Then, pointers are set to the appropriate JCB buffer. Next, the JIHM determines to which level, or sequence number of a sequence of commands, the message is in response 454. The level number is included in the message and indicates to which command in a sequence of commands the message is responding. A check sum of the message string is sent at the end of the string for verification 456. If the check sum is incorrect a minus character is sent 458 to the jukebox 18 followed by a return from interrupt 460. If the check sum is correct, a plus character is sent to the jukebox 18 and the message string is checked for an error indicator 462 to verify if the command completed successfully. If an error occurred, a flag is set in the current level 466 to indicate the condition followed by a return from interrupt 468. If there was no error, then a command complete indicator is set in the current level 470 followed by a return from interrupt 472.

The SIHM responds to SCSI interrupts. Once a SCSI interrupt occurs, the SIHM first determines 482 what SCSI device 42 or 48 caused the SCSI interrupt. If the SCSI interrupt was from the SCSI board 42, the interrupt would indicate that a SCSI command has completed. The SIHM copies the SCSI status byte from the SCSI board 42 into the SCSI block buffer 484. Next the SCSI board is checked for an error indicator 486. If an error occurred, a flag is set 490 followed by a return from interrupt 500. If there was no error, a flag is set to indicate that the SCSI command was completed 488 followed by a return from interrupt 500.

If SCSI interrupt was from the magnetic media controller 48, the progress of the command is checked 502. The progress is determined by which phase that the SCSI bus 17a was in at the time of the SCSI interrupt. If it is determined that the command is not complete 504, then the proper action is execute 506 for the present SCSI phase. Once the SCSI phase has been serviced, a return from interrupt 508 occurs. If it had been determined that this interrupt was the result of the SCSI command completing 504, an error indicator is checked 510 to verify that the command completed successfully. If the error flag is not set 516, then a status word is set 512 to indicate a command complete followed by a return from interrupt 514.

The OIHM responds to one hundred microsecond interrupts. Once the one hundred microsecond interrupt occurs, the OIHM first checks the first SCSI block buffer to see if a command is pending 521. If a SCSI command is pending, it will be initiated at 526. If a SCSI command is not pending, then the next SCSI block buffer will be checked 528. Once all SCSI block buffers are checked, the first jukebox command buffer is checked to see if a jukebox command is pending 530. If no jukebox command is pending for this jukebox command buffer then the next jukebox command buffer is checked 544. Once all jukebox command buffers have been checked, a return from interrupt 546 occurs.

A level is a command sequence number. Each level has a level command flag. A previous level must be completed before a subsequent level can be initiated. This insures that jukebox commands are executed in the required order. The level command flag, juke-flag-word, has four bits which can be set to either COMMAND PENDING, IN PROCESS, ERROR, or COMMAND COMPLETE.

Once the OIHM determines that a SCSI command is pending for a jukebox 18, the OIHM must determine which command at the highest priority level is pending 532. If a SCSI command is pending at a level, then the string required to execute the command is initiated and sent to the jukebox 18. Then, level command flag is set to IN PROCESS followed by a return from interrupt 546. If no command is pending for a particular level then level is checked to see if a SCSI command is currently in process 534. If the level is in process then the next jukebox is checked 545 if appropriate. The next one hundred microsecond interrupt will check this level to determine if it has completed. If the level command flag is not IN PROCESS, then the level command flag is checked to see if it is set to COMMAND COMPLETE 538. If the level command flag is not set to COMMAND COMPLETE, then an error occurred and the jukebox error flag is set 540 and the jukebox COMMAND PENDING flag is cleared 529 to indicate that no other operations will occur to this jukebox 18 until another module sets up the appropriate levels and sets the jukebox COMMAND PENDING flag again. If the level is command complete, that is the command level flag is set by JIHM to COMMAND COMPLETE, then OIHM determines if all levels have been checked 541. If there are no more levels to be checked, then the jukebox COMMAND PENDING flag is cleared 543. If there are more levels to be checked then the next level 547 is processed during the execution of the loop 532–541.

Once the jukebox COMMAND PENDING flag is cleared 543, OIHM determines 545 whether there-are more jukeboxes to be checked. If there are no more jukeboxes 18 to check then a return from interrupt 546 occurs. If there are more jukeboxes to be check 545 then the loop 530–545 is executed again for the next jukebox 18.

The QIHM responds to Quarter Second Interrupts. Once a quarter second interrupt occurs, the QIHM determines 552 whether MOST is booting or if there is currently a message being sent to the video screen, and if so, then a return from interrupt 554 occurs. If not, then the QIHM determines whether the real time clock is being set 556, and if so, then a return from interrupt 558 occurs.

If MOST 10 is not booting, nor is there a message being sent to the screen, then the wait flag is checked 560. If the wait flag is set, it indicates that there is I/O Channel activity being processed. If wait flag is set, the wait LEDs are blinked 562. If the wait flag is not set or the wait LEDs have been blinked, then the QIHM determines whether SCSI activity is occurring for a displayed Drive Operator Panel 564. If there is SCSI activity, then the selected LED in the panel is lit 566. In both cases, then the QIHM determines whether a optical drive 16 spin-up or spin-down command is in process for a displayed panel 568. If so, then the message is updated 570 on the video screen.

Next the real time clock is updated on the video screen 572. Then the QIHM determines if a system mode mount is in process 574. If this is true, then the video screen is updated as required 576.

The QIHM then determines 578 whether a Load Display command has been received from the I/O Channel 34. If a new Load Display command has been received, then the load display message is sent to video screen 580. Then, the QIHM determines 582 whether there has been a Rewind or Rewind/Unload command received from the I/O Channel 34. If this is the case, then the tape map is written to the optical disk 20 if the tape map has been changed 584. A return from interrupt 586 then occurs.

After a system boot, the keypress module polls to recognize when a key on the keyboard has been struck. Once a key is struck on the console 24, the keypress module executes the corresponding code depending on which key was struck. After executing the appropriate code, the keypress module will return to its polling loop waiting for the next key to be struck. If a key that is not defined is struck, then no action is taken.

If the F1 key is struck 602, then the normal/test menu appears and the user is then instructed for the next operation. If the F2 key is struck 606, the online/offline routine 608 will be called which will cause online/offline status to be toggled from its current state. If the F3 key is struck 610, a menu will be displayed which prompts the operator to enter a new channel address. This will allow the VMEGate 36 to respond to a new channel address. If the F6 key is struck 614, the rewind function 616 is called which will perform a rewind of the tape mounted on the selected drive operator panel. If the F7 key is struck 618, the rewind/unload routine 620 is called which will perform the rewind/unload operation upon the tape mounted on the selected drive operator panel. If the tape had been changed, then the tape map will also be written to the optical disk 20. If the F8 key is struck 622, the ready/not ready routine 624 is called which will toggle the state from its current state of drive corresponding to the selected drive operator panel. If the F12 key is struck 626, the Tape Create/Delete/Edit routine 628 is called which will display a menu that will allow the operator to perform the selected operation on a optical disk 20 loaded into a drive 16 corresponding to the selected drive operator panel. If the F13 key is struck 630, the tape mount routine 632 is called which will allow the operator to choose an available tape to be mounted. If the tape is on an optical disk 20 that is not currently loaded into an optical drive 16, then the jukebox 18 will be used to retrieve the appropriate optical disk 20. If the F14 key is struck 636, the disk load/eject function 636 is called which will allow the operator to load or eject an optical disk 20 to or from the drive corresponding to the selected drive operator panel. If the F15 key is struck 638, a disk directory (data base) routine 640 is called depending on the choice that is given to the operator. The operator may cause the importation of an optical disk 20 or may view the contents of the disk directory. If the F16 key is struck 642, the help routines 644 will be called. If the 'M' key is struck 646, the selected drive operator panel will be changed to manual mode 648. If the 'S' key is struck 650, the selected drive operator panel will be changed to system mode 652. If the '0' through 'F' hex key is struck 654, the requested drive operator panel will be selected 656. If there is no drive associated with the selected panel, then no action will occur. If the 'R' key is struck 658, then the video screen will be refreshed 660. This would be required in situations where the screen may have been temporarily powered off.

Buffers

System memory, comprising SBC memory and cache memory 38, is necessary for the VMEGate 36 to process I/O Channel transactions. The memory of the SBC 40 and cache memory 38 are referred to as either buffers or registers. The VMEGate 36 requests additional cache memory space when needed. The SBC 40 performs cache memory buffer management to prevent overruns. There are several buffers in SBC memory which define the state of MOST and are used for communication between the software modules. The primary buffers are the sixteen Channel Address Buffers (CABs) and the SCSI Block Buffers (SBBs). The CABs define the state of each channel address for both online and offline channel addresses. These sixteen CABs are used primarily by the SBC 40 and the VMEGate 36. There is one SBB for each optical drive 16. There is a one to one assignment between each CAB and each SBB and each online channel address. This assignment is dynamic in that it can change during operation of MOST. SCSI Commands for and SCSI statuses of the optical drives 16 are contained in the SBBs. There are several other buffers that are used.

Jukebox Command Buffers

For each jukebox 18 there is a Jukebox Command Buffer (JCB). The SBBs contain pointers to the JCBs in the SBC memory to indicate which jukebox 18 houses the optical drive 16. The JCB is used to set up jukebox RS232 commands for the jukeboxes 18 and to monitor the states of the jukeboxes 18. The JCB contains information regarding the number and placement of optical drives 16 within the jukebox 18. The JCB contains a juke-flag-word containing COMMAND PENDING, COMMAND COMPLETE, IN PROCESS and ERROR bits for controlling command processing.

Channel Address Buffers

The CAB is an array of sixteen identical structures. Each CAB represents either an online or an offline drive. The first N CABs are online where N is the number of optical drives 16. Each structure has buffers containing values that are used by the VMEGate 36 and the MOST software modules.

The sense-byte buffer is eight bytes and holds the first eight sense data bytes for the SENSE CCW. The responsibility for maintaining these bytes is divided between the VMEGate microcode and the VIHM 420–448. The last sense-byte will normally be 21H. After presentation of Unit Check unit status, the VIHM sets the last sense-byte to 20H indicating to the VMEGate 36 that the sense data is valid.

The format-20-sense-bytes and format-21-sense-bytes are twenty-four bytes each holding the remaining twenty-four sense data bytes for the SENSE CCW. Which of these two arrays is used for the remaining twenty-four bytes following the sense-bytes depends on whether the last sense-byte is 20h or 21h. The responsibility for maintaining these bytes belongs to the VIHM.

The locate-block-buffer is four bytes and used by the VMEGate 36 to store the data on Locate Block CCWs. The block-id-buffer is eight bytes and is used to supply the block id for the READ BLOCK ID CCW. It is loaded by the VIHM at the time of the CCW. It is invalid all other times.

The set-sense-path-group-id-buffer is twelve bytes and is used for both the SET and the SENSE PATH GROUP ID CCWs. The assign-buffer is twelve bytes and is used for the ASSIGN CCW. The unassign-buffer is twelve bytes and is used for the UNASSIGN CCW. The control-access-buffer is twelve bytes and is used for the CONTROL ACCESS CCW.

The load-display-buffer is eighteen bytes and is used to transfer data from the LOAD DISPLAY CCW to the screen. This buffer is used by the VMEGate 36 to store the incoming data on a LOAD DISPLAY CCW. The LOAD DISPLAY CCW sends seventeen bytes. The VMEGate 36 places a zero in the eighteenth byte. On interruption for the LOAD DISPLAY CCW, the VIHM increments the eighteenth byte bypassing zero. The QIHM keeps track of what was in the eighteenth byte. If there is a difference between what is there and what was there on the previous interrupt, the QIHM will evaluate the format control byte, load-display-buffer [0], and determine whether to display the message for the LOAD DISPLAY CCW. If the eighteenth byte is zero, nothing is changed until the next activation of the QIHM. By that time, the VIHM 550–586 will have overwritten the eighteenth byte.

The Tape-Motion-flag is cleared each time that a VIHM interrupt occurs for a LOAD DISPLAY CCW. It is set whenever a CCW that involves tape motion is executed. This bit is polled by the QIHM to determine if a LOAD DISPLAY message is to be displayed.

The VIH-flag-word word is used by the VIHM and the SIHM to determine what actions to take on the SCSI bus depending on which CCW is pending and what SCSI activities are taking place. The bits are set by the VIHM, but some bits are cleared by the SIHM. VIH-flag-word bits are ABORT, SYNCHRONIZE, DEVICE END PENDING, WRITING, READING and BUFFER PENDING.

ABORT is set when a non read tape motion CCW arrives and look-ahead SCSI reads are occurring, that is, when READING is set and when IN PROCESS or COMMAND PENDING in SCSI-flag-word and the SCSI-GO-flag are set. This type of CCW implies that the look-ahead reads are no longer necessary. ABORT is set after presentation of delayed Channel Command Retry unit status. DEVICE END PENDING is always set along with ABORT. When a Command Complete message is presented by the SCSI device and if the SIHM 480–516 determines that READING and ABORT are set, it will set COMMAND COMPLETE in the SCSI-flag-word, reset all data buffer pointers and tape map entry pointers, set WRITE BUFFER READY, clear DEVICE END PENDING, READING and ABORT, and present status of DEVICE END to the Channel 34. Once ABORT is set, the VIHM may not alter the VIH-flag-word or the DB-flag-word until ABORT is cleared by the SIHM.

SYNCHRONIZE is set when a SCSI write is occurring and the remaining data in the Data Buffer is to be flushed to the disk 20. This occurs when a non-write tape motion CCW occurs following data being left in the Data Buffer. On these CCWs delayed Channel Command Retry unit status will be presented to the Channel 34. If there is a SCSI write occurring, the VIHM sets SYNCHRONIZE and DEVICE END PENDING.

When the SIHM detects the setting of WRITING and SYNCHRONIZE, it will create SCSI commands designed to flush the Data Buffer. Once all data has been transferred, the SIHM will update the data buffer pointers and tape map entry pointers; set CMD COMPLETE in the SCSI-flag-word; set WRITE BUFFER READY; clear DEVICE END PENDING, WRITING, and SYNCHRONIZE; and present status of DEVICE END to the Channel 34. Once SYNCHRONIZE is set, the VIHM may not alter the VIH-flag-word or the DB-flag-word until SYNCHRONIZE is cleared by the SIHM.

WRITING is set by the VIHM when a SCSI write is initiated. The SIHM clears WRITING when SYNCHRONIZE is set and all data has been written to the disk 20. WRITING will remain set from the first WRITE CCW in a chain until the first CCW that causes a synchronization. The SIHM tests WRITING after a SCSI command is completed to see if it must set up any further SCSI writes. If WRITING is set, the SIHM updates the data buffer pointers and tape map entry pointers to reflect the most recent SCSI command completion. The SIHM sets up SCSI writes if WRITING is set and there is data that is ready to be written. Data is ready to be written when the amount of sequential unwritten data in the Data Buffer exceeds a threshold value, when the unwritten data extends to within a MAX BLOCK LENGTH of the end of the Data Buffer so no more data will be written, or when SYNCHRONIZE is set.

READING is set by the VIHM when a READ CCW is issued. It is cleared by the VIHM when a non-READ CCW is issued and the SCSI command IN PROCESS or COMMAND PENDING are not set and SCSI-GO-flag is set. READING is cleared by the SIHM when ABORT is set and the current SCSI command is complete. The SIHM tests READING when a SCSI command is complete. If READING is set, the SIHM updates the data buffer pointers and tape map entry pointers to reflect the completion of the SCSI read. If there is room in the Data Buffer for the next SCSI read and ABORT is not set, the SIHM will set up the next SCSI read. If there is no more room in the Data Buffer, the SIHM will set COMMAND COMPLETE.

DEVICE END PENDING is set by the VIHM when a CCW on the Channel 34 is pending and waiting for presentation of DEVICE END unit status. DEVICE END could be pending due to the splitting of CHANNEL END and DEVICE END or because of a delayed Channel Command Retry unit status. DEVICE END PENDING is always set when ABORT or SYNCHRONIZE is set. DEVICE END PENDING is cleared by the SIHM after presenting DEVICE END unit status to the Channel 34. Once the DEVICE END PENDING is set, the VIHM may not alter the VIH-flag-word or the DB-flag-word until DEVICE END PENDING is cleared by the SIHM.

BUFFER PENDING is set when a READ CCW is received but no data is pending in the data buffer. BUFFER PENDING is set by the VIHM. It is cleared when the data is in the data buffer by the SIHM.

The DB-flag-word word contains status that is read by the VMEGate 36 and the VIHM. The bits are set and cleared by either the VIHM or the SIHM depending on bits in the VIH-flag-word. There is no state where both the VIHM and the SIHM may set or clear bits in the DB-flag-word. The DB-flag-word indicates whether data is valid in the Data Buffer and indicates to the VMEGates 36 certain tape conditions. The DB-flag-word includes READ DATA VALID, WRITE BUFFER READY, PHYS EOT, LOG EOT, READ BKWD DATA VALID, and LONG RECORD bits.

READ DATA VALID indicates to the VMEGate 36 that the data in the Data Buffer holds the next record of the virtual tape. If READ DATA VALID is set when the Channel 34 issues a READ CCW, the VMEGate 36 will transfer data from the Data Buffer to the Channel 34. READ DATA VALID is set by the SIHM when READING is set. ABORT and READ DATA VALID are clear when a SCSI command completes. READ DATA VALID is not set by the VIHM. READ DATA VALID is cleared by the VIHM following a type 01h interrupt for a VMEGate READ CCW if the next record is not yet in the Data Buffer. If this occurs, the VIHM will present delayed Channel Command Retry unit status to the Channel 34 and set DEVICE END PENDING. If the COMMAND COMPLETE is set, the VIHM will set up the next SCSI read, otherwise a SCSI read is IN PROCESS. In either case, the SIHM will set READ DATA VALID and present DEVICE END unit status to the Channel 34 once the current SCSI read is complete. READ DATA VALID, is not cleared by the SIHM.

WRITE BUFFER READY, when set, indicates to the VMEGate 36 that the Data Buffer has room to hold the data from a WRITE CCW and that there is no danger of an ongoing SCSI read overwriting that data. WRITE BUFFER READY is set initially when a virtual tape is mounted. WRITE BUFFER READY is set by the VIHM and the SIHM. It is cleared by the VMEGate 36 prior to interrupting after a successful WRITE CCW. It is also cleared by the VIHM during READ and READ BACKWARD CCWs. If the VMEGate 36 receives a WRITE CCW and WRITE BUFFER READY is set, initial status of 00 is presented to the Channel 34 and data is transferred into the Data Buffer. The VMEGate 36 then clears WRITE BUFFER READY before interrupting. If WRITE BUFFER READY is clear, the VMEGate 36 will interrupt and the VIHM makes a determination as to whether the Data Buffer is capable of being written to. If it is, WRITE BUFFER READY is set and immediate Channel Command Retry unit status is presented to the Channel 34. If the Data Buffer cannot be written to, in the case of IN PROCESS SCSI reads or IN PROCESS SCSI writes, delayed Channel Command Retry unit status is presented to the Channel 34 and DEVICE END PENDING and ABORT. When WRITING is set and a SCSI command completes, the SIHM updates data buffer and tape map entry pointers and then checks if DEVICE END PENDING is set. If it is and the WRITE BUFFER READY is clear, the SIHM checks if there is room in the Data Buffer for a WRITE CCW. If there is room, the SIHM 480–516 will set WRITE BUFFER READY and present unit status of DEVICE END to the Channel 34. Similarly if READING and ABORT are set, the SIHM will set WRITE BUFFER READY and present unit status of DEVICE END to the Channel 34.

PHYS EOT indicates to the VMEGate 36 that the tape has reached the Physical EOT. This causes the VMEGate 36 to present appropriate status to the Channel 34. PHYS EOT is set and cleared exclusively by the VIHM in response to tape motion CCWs. The determination is made during each tape motion CCW and is valid for the next CCW.

LOG EOT indicates to the VMEGate 36 that the tape has reached the Logical EOT. This causes the VMEGate 36 to present appropriate status to the Channel 34. LOG EOT is set and cleared exclusively by the VIHM in response to tape motion CCWs. The determination is made during each tape motion CCW and is valid for the next CCW.

READ BKWD DATA VALID is set by the SBC 40 to indicate that the data pointed to by the DB-Channel-ptr is ready to be read by the VMEGate 36. Data begins at the location DB-Channel-ptr plus Channel-block-length. Data is passed to the Channel 34 in reverse order from the way it is stored in the Data Buffer, that is, the last byte to be transferred is pointed to by DB-Channel-ptr. The VMEGate 36 must interrupt the SBC after Channel-block-length bytes have been transferred. The SBC 40 will then either point to more data to be transferred as part of a Long Record, if LONG RECORD is set, or present ending status. If the data for the next READ CCW is in the Data Buffer, the SBC 40 will leave READ BKWD DATA VALID set. If the data is not yet available, READ BKWD DATA VALID is cleared by the SBC 40.

The tape map entry pointers are used during the processing of SCSI reads and writes and READ and WRITE CCWs. The tape map entry pointers point to the most recently accessed data records. The tape map entry pointers are of three type, TM-Channel-ptr, TM-SCSI-ptr, and TM-Marker. The VIHM is responsible for the TM-Channel-ptr and the SIHM is responsible for the TM-SCSI-ptr. The TM-Marker is maintained by both the VIHM and the SIHM. The tape map entry pointers are made equal to each other and made to point at the current virtual tape position following REWIND WRITE TAPE MARK, FORWARD SPACE BLOCK, FORWARD SPACE FILE, BACK SPACE BLOCK and BACK SPACE FILE CCWs. In this case, the VIHM performs a synchronize operation and sets the value of the tape map entry pointers.

During Write operations, the TM-Channel-ptr is ahead of the TM-SCSI-ptr and the TM-Marker is used to mark the difference between the two at the initiation of SCSI writes. During Read operations, the TM-SCSI-ptr is ahead of the TM-Channel-ptr and the TM-Marker is used to mark the difference between the two at the initiation of SCSI reads. TM-Channel-ptr is used to keep track of the Channels position within the tape map 340. The TM-Channel-ptr moves through the tape map 340 one entry at a time during READ and WRITE CCWs. The TM-Channel-ptr may advance several entries at a time during FORWARD SPACE FILE, BACK SPACE FILE, and LOCATE CCWs. During WRITE CCWs, the TM-Channel-ptr is pointing into the tape map 340 at the next available tape map 340. This position will have an END OF TAPE MAP indicator in byte zero of the map data 348 entry. The TM-Channel-ptr is incremented by the VIHM as part of the interrupt for each WRITE CCW. Between DEVICE END presentation and initial selection for successive READ CCWs, the TM-Channel-ptr points to the record that the Channel 34 will read next. During READ CCWs, the TM-Channel-ptr points to the record that the Channel 34 is currently reading. The TM-Channel-ptr is incremented by the VIHM within the interrupt for each READ CCW. The TM-Channel-ptr is decremented by the VIHM within the interrupt for each READ BACKWARD CCW. During READ and WRITE CCWs, the TM-Channel-ptr can be tested to see how far the Channel 34 is through the tape map 340 when determining Physical and Logical EOT conditions.

The TM-SCSI-ptr points to the map data 348 entry at the point where the SCSI commands have left it. Unlike the TM-Channel-ptr, the TM-SCSI-ptr may advance through the tape map 340 more than one entry at a time because a single SCSI read or write may encompass several records. When a SCSI write completes, the SIHM updates the TM-SCSI-ptr to equal the value of the TM-Marker. In this case, the TM-SCSI-ptr will point to the first map data 348 entry that has not yet been written to the disk 20. This entry may be the END OF TAPE MAP entry if no WRITE CCWs occurred after the initiation of the SCSI write that just completed. If the TM-SCSI-ptr does not equal the TM-Channel-ptr, then there is data in the Data Buffer which remains to be written to the disk 20. When a SCSI read completes, the SIHM updates the TM-SCSI-ptr to equal the TM-Marker. The TM-Marker is pointing to the first map data 348 entry after those which have just been read into the Data Buffer.

The TM-Marker is used as a marker in the tape map 340 in order to note what records have not been written to disk on SCSI writes and to keep track of records that have not been read into the Data Buffer on SCSI reads. When a READ CCW is received and COMMAND COMPLETE is set, the VIHM sets up the SCSI read. In this case, the VIHM will also set the TM-Marker to the first record which will not be part of the SCSI read. When the SCSI read is complete, and if there is room for another SCSI read in the Data Buffer, the SIHM will set up a look-ahead read and the TM-Marker will be adjusted by the SIHM. When a WRITE CCW is received, COMMAND COMPLETE is set and there is enough data in the Data Buffer to justify a SCSI write, the VIHM will set up a SCSI write and set the TM-Marker to the current position of the TM-Channel-ptr. After the SCSI write, the SIHM will update the TM-SCSI-ptr to the value of the TM-Marker and, if there is enough unwritten data in the Data Buffer to justify a subsequent SCSI write, the SIHM will set it up and again update the TM-Marker to the value of the TM-Channel-ptr.

The data buffer pointers are used to keep track of data in the Data Buffer. As with the tape map entry pointers, the data buffer pointers are DB-Channel-ptr, DB-SCSI-ptr and DB-Marker. The data buffer pointers are maintained by both the VIHM and the SIHM. The data buffer pointers are valid only during READ and WRITE CCWs unlike the tape map pointers which are valid at all times.

The DB-Channel-ptr is used to keep track of where data for the Channel 34 is written to or read from. The DB-Channel-ptr is used by the VMEGate 36. The DB-Channel-ptr is set by the VIHM. On WRITE CCWs, when WRITE BUFFER READY is set, the DB-Channel-ptr points to the position in the Data Buffer where the data from the next WRITE CCW is to be stored. On READ CCWs, when READ DATA VALID is set, the DB-Channel-ptr points to the position in the Data Buffer where the next record to be read is stored.

The DB-SCSI-ptr is used by the VIHM and the SIHM to indicate where to store SCSI read data and where to start SCSI writes. It is set by the VIHM and the SIHM. On SCSI writes, the DB-SCSI-ptr points to the start of sequential data which has not yet been written to disk. After the SCSI writes have completed, the SIHM updates the DB-SCSI-ptr to the value of the DB-Marker indicating that all the data between the two has been written to disk. When the DB-SCSI-ptr is equal to the DB-Channel-ptr, there is no data in the Data Buffer which has not been written to disk.

On SCSI reads, the DB-SCSI-ptr points to the start of the location in the Data Buffer where data is going to be placed. That is, the SCSI read data is stored starting at the DB-SCSI-ptr. When the SCSI read is complete, the SIHM updates the DB-SCSI-ptr to point to the first Data Buffer location that does not contain valid data. If there is not enough room in the Data Buffer for the next SCSI read, the DB-SCSI-ptr is set to the beginning of the Data Buffer.

The DB-Marker is used for SCSI writes only. The DB-Marker is used to store the position where the DB-Channel-ptr was at the start of a SCSI write. In this way, even if the DB-Channel-ptr has advanced while the SCSI write was occurring, the SIHM will know where to update the DB-SCSI-ptr upon completion of the SCSI write.

The Channel-block-length is used to communicate between the VMEGate 36 and the VIHM. After WRITE CCWs, the Channel-block-length is set by the VMEGate 36 to the length of the record just written. The VIHM then moves this value into the block length 354 of the map data 348 entry pointed to by the TM-Channel-ptr. Prior to a READ CCW, the Channel-block-length holds the length of the record to be transferred. The VIHM moves this value from the block length 354 of the Tape Map entry pointed to by the TM-Channel-ptr to the Channel-block-length before setting READ DATA VALID.

The SCSI-Length is used to calculate the number of bytes which are to be transferred over the SCSI bus. The SCSI-Length is calculated by either the VIHM or the SIHM depending on which one is setting up the next SCSI read or write. The length to be placed in the SCSI Command Descriptor block for the SCSI write is the SCSI-Length shifted to the right ten bits, i.e. divided by 1K. On SCSI writes, the SCSI-Length is calculated by adding the block length 354 from each map data 348 entry between the TM-SCSI-ptr and the TM-Marker. Each block length 354 is rounded up to the next even value before the addition to take account of the VMEGate word transfer requirements. The SCSI-Length is then rounded to the next 1K byte boundary. On SCSI reads, the SCSI-Length is calculated by adding the block length 354 of successive records. Successive means that the absolute address of a record of one map data 348 entry is equal to the absolute address of the record of the previous entry plus the block length 354 of the previous entry rounded to the next even value. As with the SCSI writes, all block lengths 354 are rounded to the next even value.

The Cumulative-Length variable is used to keep track of the overall length of the virtual tape. Each time a map data 348 entry is passed, the block length 354 of that entry 384 is added to the Cumulative-Length and a fixed value is added to account for the interblock gap which is approximately four kilo bytes. The Cumulative-Length is added to or subtracted from every time the TM-Channel-ptr is changed. The VIHM performs this function.

The Phys-Max-Tape-Length is a constant that is entered by the user when a virtual tape is created. The number represents the maximum amount of data, in bytes, including simulated IBGs that a virtual tape can hold. This number is loaded from the tape directory by the keypress module 600–660 when a virtual tape is mounted. The Log-Max-Tape-Length is calculated by subtracting a fixed fraction, e.g. one percent, from the Phys-Max-Tape-Length. Thus, if the Phys-Max-Tape-Length was two-hundred mega bytes, the Log-Max-Tape-Length would be two-hundred minus two-hundred multiplied by one percent, that is, one-hundred-and-ninty-eight mega bytes. The Phys-Max-Tape-Length and Log-Max-Tape-Length are compared to the Cumulative-Length by the VIHM to set and clear the PHYS EOT and LOG EOT bits.

The Next-LBA variable keeps track of the first unwritten LBA on the disk. This number is stored in the tape directory as a continuation pointer 326 and is moved into the Channel Address Buffer by the keypress module when a disk is Logically Loaded. The Next-LBA is checked to determine whether there is any more room on the disk are made. The Next-LBA is maintained by the SIHM which adds the length of SCSI writes to the Next-LBA. Skips are not added to the Next-LBA during SCSI writes of virtual tape data. At certain points, the Next-LBA is adjusted to equal the value of the next physical block address. When the tape map 340 is written to disk, the location it is written to is the next physical block address and the Next-LBA is updated accordingly. When the Next-LBA is inserted in the tape directory prior to being written back to the disk 20 by the keypress module the value is adjusted to the next unwritten physical block address.

SCSI Block Buffers

The SBB is a structure which is used to initiate and execute SCSI activity. SBC software writes into the SBB. There are sixteen SBBs available, one for each of the drives 16. When an optical drive 16 is Logically Ready, only the VIHM and the SIHM may set up SCSI activities by writing into its SBB. When an optical drive is Logically Not Ready, only the keypress module may use its SBB.

The floppy disk drive 50 and the hard disk drive 52 are controlled over the SCSI bus 17a and use similar SBBs independent of whether the optical disk drives 16 are controlled by either the SCSI bus 17b though the SCSI board 42 or just the SCSI port 17a when the SCSI board 42 is not used. The QIHM is the only module which may use the floppy drive SBB. This may occur at any time. The OIHM 520-546 and the SIHM 480-516 both use the other SBBs to keep track of their activities.

The first six bytes of the SBB constitute a SCSI Command Descriptor Block. These bytes are sent to the SCSI device during the Command Phase of the SCSI transfer. The command byte of the SBB is the actual SCSI command that is to be issued, e.g. 03 for Request Sense. The next three bytes, LBA-msb, LBA-mid and LBA-lsb, have various meanings depending on the value of the command byte. In most cases, however, there contents are the LBA that the command refers to. For some commands, the names LBA-msb, mid, and lsb may be a misnomer. The fifth byte of the SBB is the length. For most commands, the fifth byte characterizes the length of the Data Phase of the SCSI transfer. This is not always the case. Sometimes the name, length, may be inappropriate. The last byte of the Command Descriptor Block is the terminator byte, which will always be zero.

The SCSI-GO-flag is used to inform higher level interrupts that the OIHM is currently servicing the device whose SCSI-GO-flag is set. In a few instances, particularly during look-ahead SCSI reads, the VIHM may cancel a SCSI command before it is executed, while COMMAND PENDING is set. If the SCSI-GO-flag is zero, COMMAND PENDING may be changed to COMMAND COMPLETE and the SCSI activity will not be executed. When the SCSI-GO-flag is set, changing the COMMAND PENDING to COMMAND COMPLETE may not stop the command.

The SCSI-flag-word is used to determine when a command is ready to be issued, when it is being worked on, and when it has completed. The SCSI-flag-word includes, COMMAND PENDING, IN PROCESS, COMMAND COMPLETE and ERROR.

COMMAND PENDING, when set, indicates to the OIHM that a SCSI command has been set up and is waiting to be issued. The OIHM sets the SCSI-GO-flag and then tests the SCSI-flag-word. If it detects COMMAND PENDING set, the OIHM sets IN PROCESS and begin arbitrating for the SCSI bus.

If the SCSI Board 42 is not used, the OIHM will transfer the Command Descriptor Block to the SCSI device under DMA and the SCSI-GO-flag is then cleared. Upon completion of the transfer, the SIHM will be activated and command processing will continue. The IN PROCESS bit is set when arbitration for the SCSI bus begins when without a SCSI board 42 or upon initiation of the command in the SCSI board 42 when the board 42 is used. Throughout the SCSI command, IN PROCESS remains set. IN PROCESS indicates to other routines that there is a SCSI command issued to the device associated with the CAB that has not yet been completed. When the SCSI device presents a message of COMMAND COMPLETE, the SIHM change the SCSI-flag-word from IN PROCESS to COMMAND COMPLETE. This indicates to the calling routine that the SCSI-status byte is valid and that the OIHM can start another command to that device.

The SCSI-sense-data buffer is a sixteen byte buffer and is used to hold the data received during a Request Sense command. This command is issued so often that a permanent storage location is provided for it. In this way, more than one routine may access a known location for information on the state of the SCSI device.

The current-SCSI-DB-ptr is a pointer into memory that indicates where the data is to be stored during Data In Phase or where the data is to come from during Data Out Phase. The module which initiates the SCSI command sets up this value initially and the SIHM maintains its value between disconnection and reconnection. In this way, the pointer is always valid, pointing to the next byte to be transferred or the first byte not yet read in.

The SCSI-status byte has the value passed from the SCSI device to MOST during the Status Phase. The values of this byte are typically GOOD STATUS, CHECK CONDITION, and CONDITION MET.

When the SCSI board 42 is not used, a cmd-flag is set by the OIHM which indicates to the SIHM that a DMA interrupt which activated it came from the completion of a Command Phase rather than the completion of a Data In Phase or a Data Out Phase. Knowing this, the SIHM will not over store the current-SCSI-DB-ptr with the value of the last address in the Command Descriptor Block.

The SCSI-sense-flag is set by the SIHM routine when a command is complete and READING or WRITING is set and when the command returned CHECK. CONDITION in the SCSI-status byte. The SIHM issues sense commands. The SCSI-sense-flag is set so that sense commands are not treated as normal SCSI read or SCSI write commands when the command completes and the SIHM is reactivated.

Data Buffers

The cache memory 38 is primarily used as a Data Buffer for transferring data between the channel 34 and the optical drives 16. Data for READ CCWs and WRITE CCWs are stored in the Data Buffers. There is one Data Buffer for each valid Channel Address and several more which are available for use by any Channel Address. It is the responsibility of the SBC 40 to allocate Data Buffers to Channel Addresses. Prior to reading or writing data between the VMEGate 36 and the channel, the VMEGate 36 will access the DB-flag-word for the Channel Address and ensure that Read Data is Valid or that the Write Buffer is Ready. Data is transferred into the buffer starting at the location pointed to by the DB-Channel-ptr and continues for the length specified by the Channel-block-length. These variables are found in fixed locations in the CABs.

Interrupt Communication Buffer

The Interrupt Communication Buffer (ICB) is used by the VMEGate 36 to store information regarding specific status conditions which require immediate action by the SBC 40. The ICB buffer is first loaded by the VMEGate 36 just prior to issuing a VME bus interrupt. The information contained in this buffer will describe the type of interrupt, status flags to identify the particular condition and the I/O address of the device which was being serviced when this condition occurred.

The ICB allows the VMEGate 36 to place into system memory the data which will allow the SBC software to determine the event which resulted in the interrupt and perform the proper actions to process the interrupt. The data to be written into the ICB is as follows: Word one MSB equals Interrupt Type; Word one LSB equals Sub Category; Word two MSB equals Device Address; Word two LSB equals Error Code.

The Interrupt type codes and associated Sub Category Codes are defined by Interrupt Type code and Sub Category Code. 01h is the Channel Command and Channel Command Code. The defined error codes for a Type 01h Interrupt are as follows: 01h equals Tape Write Immediate Mode for 01h Channel Command Code only; 02h equals Long Write for 01h Channel Command Code only. 02h is the Channel Exception and Channel Command Code. The Defined Error Codes for a Type 02 Interrupt are as follows: 01h equals System Reset; 02h equals Selective Reset; 03h equals Interface Disconnect. 04h is the VMEGate Exception and Channel Command Code. An interrupt type 04 will be generated when the VMEGate 36 detects an error while testing specified conditions for a channel command. If an error condition is detected, the error will be reflected in the Error Code. The Defined Error Codes for a Type 04 Interrupt are as follows: 01h equals Command Reject; 02h equals File Protected; 03h equals Supervisor Inhibit; 04h equals Retry; 05h equals Logical End of Tape (EOT); 06h equals Drive not ready/offline; 07h equals Overrun; and 08h equals Bus Out Parity Error.

Initialization Buffer

The Initialization Buffer contains information which is required by the VMEGate 36 before an Online command can be issued. The information contained in this buffer is as follows: VME bus address modifier code which is one word; eight bit interrupt vector which is one word; Pointer to VMEGate Command Status Word which pointer is two words; Pointer to VMEGate Ending Status Word which pointer is two words; Pointer to VMEGate Interrupt Communication Buffer which pointer is two words; and Pointer to Command Validator Buffer which pointer is two words.

Command Buffers

The VMEGate Command Status Word is a single word buffer in SBC memory which is used by the VMEGate 36 to inform the SBC 40 that the VMEGate 36 is busy processing the last command. When the SBC 40 issues a command to the VMEGate 36, it must first read the VMEGate Command Status Word to insure that it contains a 0000h. If so, the SBC 40 will write a 0001h into the VMEGate Command Status Word and then write the desired command code into the VMEGate Command Register. If the VMEGate Command Status Word does not contain 0000h, it indicates that the VMEGate 36 is still busy processing the last SBC command. When the VMEGate 36 completes execution, the VMEGate 36 will reset the Command Status Word.

The Command Validator Buffer is two-hundred-fifty-six bytes, is located in SBC memory and is a buffer for storing valid commands from the channel 34. The Command Validator Buffer is downloaded into the CVM 126, so that the VMEGate 36 can determine if a channel command is valid or not. SBC Status Buffer is located in SBC memory, is four bytes and is a buffer for storing SBC status, device address and unit status which is channel status to be returned to the channel 34. Sense ID Buffer is located in SBC memory, is fourteen bytes with seven bytes used at a time, and it stores sense identification strings.

VMEGate Initialization

The software interface between the SBC 40 and VMEGate includes the method of passing commands, data, and status between the SBC 40 and the VMEGate 36. The software interface utilizes the VMEGate START/STATUS and COMMAND registers to control the actions and determine the status of the VMEGate 36. The thirty-two kilo bytes of VME address space allocated to the VMEGate 36 are established by jumpers installed on the VMEGate Interface board. These jumpers establish the BASE for accessing VMEGate registers and memory.

The BASE is E30000 for the first VMEGate 36 and E38000 for a second VMEGate 36 when a dual channel interface is installed. The value of the BASE must be incorporated in the SBC software which communicates with the VMEGate 36. The START/STATUS register is accessed via VME address BASE plus six, while the COMMAND register is accessed via VME address BASE plus E. The VMEGate microprogram, downloaded by the SBC 40, responds to the VMEGate commands as well as channel interface sequences and channel commands.

Data, status, and control information associated with commands and sequences reside in system memory accessible to both the SBC 40 and VMEGate 36. The pointers to these locations are passed to the VMEGate 36 during the initialization process. System memory refers to the SBC memory and the cache memory 38. Data bytes transmitted from the VMEGate 36 to the cache memory 38 are organized as follows: cache memory location xxxx for first byte bits fifteen to eight and second byte bits seven to zero; cache memory location xxxx plus two for third byte bits fifteen to eight and forth byte bits seven to zero; cache memory location xxxx plus four for fifth byte bits fifteen to eight and sixth byte bits seven to zero; etc. Data transmitted to the VMEGate 36 from cache memory 38 is in this same order. Bit fifteen is the most significant bit whereas bit zero is the least significant bit.

In connection with address pointers, all data passed from the SBC 40 to one of the VMEGate communication areas, where the communication area functions as a VME bus address pointer, is in the following format: location xx has zero-zero in bits fifteen to eight and address twenty-three to sixteen in bits seven to zero, location xx plus two has address fifteen to eight in bits fifteen to eight and address seven to zero in bits seven to zero.

In order for the VMEGate 36 to use these address pointers, the VMEGate 36 will shift the entire word down one bit towards the LSB. After shifting, the VMEGate 36 will mask the uppermost byte with an address modifier. The address modifier shall be 39h when accessing data in single word transfers and shall be 3Bh when accessing data in block mode across the VME bus 46.

During the Power-on sequence or a recovery sequence, the SBC Software will download the microprogram to the WCS 80. The SBC software ensures that the clock generator 78 is stopped by writing 00h to the START/STATUS register, BASE plus six. Upon power up, the VMEGate 36 is stopped and in the offline mode. If the contents of STATUS equals XXXXXXXXXXXXXXX1B, the VMEGate 36 is stopped and microprogram is downloaded. The microprogram is loaded by setting "Address" to BASE where BASE is the address of WCS selected by VMEGate jumpers, opening a microprogram file, and reading words from the file, until end of file. The SBC then verifies the download by rereading the file and comparing the data to the WCS 80.

The use of the START/STATUS register is limited to stopping the clock generator 78, activating the VMEGate 36, and checking status. Stopping the clock generator 78 of the VMEGate 36 allows access to the WCS 80. This is done by the a write 0000h to BASE plus six. The clock generator 78 should only be stopped if the VMEGate 36 has been placed in the offline mode. Activating the VMEGate 36 is done by starting the clock generator 78. This is done by a write 0001h to BASE plus six. Determining the status of the VMEGate 36 is done by a read status from BASE plus six. If the contents of status equals XXXXXXXXXXXXXXX1B, the VMEGate 36 is stopped and microprogram download may proceed. If the contents of status equals XXXXXXXXXXXXXX10B, the VMEGate 36 is active with no VMEGate fail condition. If the contents of status equals XXXXXXXXXXXXXX00B, the VMEGate 36 is active with a VMEGate fail condition.

During initialization, two pointers and a word value are passed to the VMEGate 36. The first pointers points to a block of parameters common to all channel addresses while the second pointer points to the base Channel Address Buffer. The word value is the length of a single Channel Address Buffer. From these last two values, the VMEGate 36 calculates the location of all sixteen CABs. The pointers and parameter contents, in initialization order, are: A pointer to the common interface parameter block; A pointer to the CAB for the First Valid Channel Address with the device address being Base Device Address plus 00h and with the Base Device Address determined by the first valid address in the CVM 126; A word length value which is the length of a single CAB; A word containing the VME bus address modifier bits, in the MSB, and the interrupt number, in the LSB, in location x plus 00h; The VMEGate Command Status Word in location x plus 02h; The SBC Present Status Word in location x plus 04h; The SBC Status Buffer in location x plus 06h; The VMEGate ICB in location x plus 10h; The VMEGate Command Validator Buffer in location x plus 14h; and the "3480" SENSE ID Buffer in location x plus 270h which contains fourteen bytes of hex data, FF348022348022FF348022000000. The first seven bytes of the Sense ID Buffer will be returned if the drive 16 is present while the second seven bytes will be returned if the drive 16 is not present. Present is determined by bits in the CVM. Location x is the addresses passed in the first pointer.

After microprogram validity is verified, the clock generator 78 is started and the VMEGate 36 is initialized. This is accomplished by the following steps: Obtain the Channel addresses to which the VMEGate 36 is to respond and write them in to the high byte of each pointer to parameters for a Valid Channel Address; Start the VMEGate microprogram by writing 0001h to BASE plus six then waiting five milliseconds and testing the STATUS register at BASE plus six to ensure that the clock was started without an error condition. If the contents of STATUS equals XXXXXXXXXXXXXXX10B, the VMEGate 36 is active with no VMEGate fail condition and initialization may proceed; Set the Busy Flag in the Command Status Word and Write the INITIALIZE command and the initialization parameters to BASE plus Eh; Wait at least two milliseconds then check that the Busy Flag in the Command Status Word has been reset and that the STATUS register does not indicate an error condition; and Downloading and verifying the CVM 126 prior to placing the VMEGate 36 online. Before executing the DOWN LOAD CVM command, the SBC software will read the Command Validator file into an array and set the valid address bit in each byte corresponding to a valid channel address. The SBC software will also set the Not Present bit in each byte corresponding to a valid channel address if the drive is logically Not Present.

The CVM 126 is loaded and verified using the following sequence of Operations. The modified data from the Command Validator file is copied into the Command Validator Buffer. The Busy bit is set in the VMEGate Command Status Word. The DOWN LOAD CVM command is written to BASE plus E then waiting at least two milliseconds before checking for completion of the download. The Busy Flag is set in the Command Status Word. The UP LOAD CVM command is written to BASE plus E then waiting at least two milliseconds before checking for completion of the upload. Proper loading is verified by comparing the data in the Command Validator Buffer with the modified data from the Command Validator File. At this time, the SBC 40 reads the VMEGate status buffer to ensure correct initialization. If STATUS contents equals XXXXXXXXXXXXXXX10B, the VMEGate 36 is successfully initialized and the SBC 40 may issue the Online command.

A System Reset occurs upon depression of a reset button, not shown. All devices are affected by a system reset. The SBC 40 will reset the Set Sense Path Group ID Buffer, the Assign and Unassign Buffers, the Control Access Buffer; and the Sense Byte Buffer. All data in the Data Buffers intended for writing will be written to disk. When the process is complete, the SBC 40 will issue a System Reset Ready command to the VMEGate 36. With Selective Reset, only the specified device is affected by a selective reset. The SBC 40 will reset the Sense Byte Buffer. If there is any data in the Data Buffers to be written to disk, this will be done. The drive will remain busy until this is finished. Once this is completed, the SBC 40 will issue a Selective Reset Ready command to the VMEGate 36. When an Interface Disconnect occurs, the VMEGate 36 will interrupt the SBC 40. The SBC 40 will halt continuing operations and present appropriate ending status.

When a channel interface sequence indicates System Reset, Selective Reset, or Disconnect, the VMEGate 36 will write the data for a type 02h interrupt into the ICB and interrupt the SBC 40 for appropriate action. The action to be taken will depend on the processing state when the interrupt occurs. The SBC 40 is responsible for setting and clearing all Sense bytes based on the error codes presented during VMEGate type 04 interrupts and on the internal state of MOST.

VMEGate Commands

The VMEGate Command Status Word is used to synchronize the issuance of VMEGate commands by the SBC 40 and the command completion, reissue, or failure by the VMEGate 36. The VMEGate Command Status Word bit definitions are that bit zero is the busy flag and is set by the SBC 40 when a VMEGate command has been issued, and, bit zero is reset by the VMEGate 36 when another VMEGate command may be issued, that bit one is set by the VMEGate 36 during the Reissue of the previous VMEGate Command, and that bit three is set by the VMEGate 36 when a command or diagnostic test failed.

Once the VMEGate 36 interprets a command, it clears the busy flag in the VMEGate Command Status Word. It may also set either the Reissue Command bit or the Command Failed bit in the VMEGate Command Status Word. The Command Failed bit is set if the VMEGate 36 was not in the required state when a VMEGate command was issued. The Reissue Command bit is set if there is a detection of an Initial Selection sequence from the channel to another device at the same time. The channel command has higher priority in this case and the VMEGate 36 informs the SBC 40 that it must reissue the command when the VMEGate 36 is not busy with the channel. The Commands required to direct the VMEGate 36 in responding to Channel Interface Sequences and Channel commands are INITIALIZE, DIAGNOSTIC, DOWN LOAD CVM, UP LOAD CVM, PRESENT STATUS, ONLINE, OFFLINE, GO NOT READY, INTERRUPT PROCESSED, GO READY, BUFFER READY, SELECTIVE RESET READY, SYSTEM RESET READY, and DEFERRED UNIT CHECK.

The INITIALIZE, 0000h, is the first VMEGate command to be executed after the clock generator 78 is started. This command allows the pointers to be transferred to VMEGate memory according to the algorithm defined for the parameter and common interface block pointer description with a requirement that the VMEGate 36 be offline.

The DIAGNOSTIC, 0001h, command is a go no-go test of the VMEGate 36 and a required state is that the VMEGate 36 be offline.

The DOWNLOAD COMMAND VALIDATOR MEMORY, 0002h, command allows the VMEGate 36 to transfer data from the Command Validator Buffer into the CVM 126 with a required VMEGate offline state. The sequence to be followed for this command is that the SBC 40 makes sure that the Busy flag in the Command Status Word indicates a successful completion of the last command, that the SBC 40 sets the Busy flag in the Command Status Word and writes the command code of the DOWN LOAD CVM into the VMEGate Command/Data Register, and that the VMEGate 36 reads the data file from the Command Validator Buffer. The data file is transferred as words and placed in byte order in the CVM. The MSB of each word is written into CVM 126 followed by the LSB.

The UPLOAD COMMAND VALIDATOR MEMORY, 0004h, command is similar to the DOWN LOAD CVM command except it transfers the contents of the CVM into Command Validator buffer for verification of the download with a required VMEGate offline state.

The PRESENT STATUS, 0008h, command is used to send status and the channel address. The required status is written into the Present Status Word, then the command code for PRESENT STATUS is written into the VMEGate command register. The status is in the LSB of the word while the channel address is in the MSB of the word. Before presenting status which includes Unit Check set, the SBC 40 must prepare Sense data which supports the Unit Check indication. The required state of the VMEGate 36 is online and device ready.

The ONLINE, 0010h and 0011h, commands are for online and is to be written into the VMEGate Command Register. The VMEGate 36 will respond to the initial selection sequences for those channel addresses defined as valid by the bits set in the CVM. A command of 10h implies that the VMEGate 36 is to respond as a 3480 Tape Drive. The required state of the VMEGate 36 is offline.

The OFFLINE, 0020h, command is for offline and is written into the VMEGate Command Register. The VMEGate 36 will no longer respond to the initial selection sequences for those channel addresses defined as valid by the bits set in the CVM. The required state for the VMEGate 36 is online and all devices not-ready.

GO NOT READY, 0040h, command informs the VMEGate 36 that a drive is Logically Not Ready. This happens when the Ready/Not Ready switch is moved to the Not Ready position. When this happens, the VMEGate 36 responds differently to many CCWs. The device to be made Not Ready is specified in the SBC Present Status Word.

The INTERRUPT PROCESSED, 0080h, command is issued when a VMEGate interrupt has been processed and the SBC 40 is prepared to accept another VMEGate interrupt. Before the command is issued, the SBC status buffer must be updated. The SBC status is in the first word of the buffer while the channel address and ending status is in the second word of the buffer. The status is in the LSB of the word while the channel address is in the MSB of the word. The required state of the VMEGate 36 is online. The definitions of the SBC status bits are that the bits zero and four to fifteen are reserved, bit one is Sense Ready, bit two is No Status to be presented, and bit three is Buffered Log Overflow.

The GO READY, 0100h, command instructs the VMEGate 36 to make ready the device specified in the Present Status Word. If the device address was primed, the VMEGate 36 will present status of 85h. This command is called when the Ready/Not Ready switch is in the Ready position, a tape is mounted in the Drive, and the control unit is online. If a tape that is being made Ready is file protected, the SBC 40 sets the Present Status Word to one. Otherwise, the Present Status Word is cleared to zero.

The BUFFER READY, 0200h, command is used when a long record is encountered on a READ CCW or a WRITE CCW and the VMEGate 36 interrupts before the read data is completed or when there is no buffer available for the next write data. The SBC 40 will issue Interrupt Processed with no Data Buffer ready. When a Data Buffer becomes available, this command is issued. If this command is rejected, that means that the buffer is no longer needed and an interrupt for a channel exception will occur. The required state of the VMEGate 36 is online.

The SELECTIVE RESET READY, 04xxh, command resets a busy device to ready. Following a Selective Reset, the device will remain BUSY until the SELECTIVE RESET READY command is received by the VMEGate 36. The xx device is overwritten with the Channel Address that was reset.

The SYSTEM RESET READY, 0800h, command resets all devices. Following a System Reset, all devices will remain BUSY until the SYSTEM RESET READY command is received by the VMEGate 36.

The DEFERRED UNIT CHECK, 10xxh, command causes the VMEGate 36 to present Unit Check status to the next Channel sequence presented to Channel Address xx. This command is used when errors occur writing data to the optical disks after DEVICE END has been presented for the WRITE CCW.

Channel Commands

The SBC 40 and the VMEGate 36 together execute standard checks and sequences for the defined channel commands words. There is sequence common to all of the channel commands. Any supervisor inhibit due to a Mode Set Command will be reset at any ending sequence which does not indicate command chaining. The VMEGate 36 will respond to the block of addresses X0 through XF. The response of those valid addresses with the NOT PRESENT bit set will be controlled via the CVM 126 for those addresses.

The ASSIGN, B7h, command invokes a sequence of events upon receipt as follows: i) The VMEGate 36 tests for an error condition that the Supervisor Command Inhibit bit is set. If so, the VMEGate 36 sets Unit Check bit of the channel status byte. The error code is set to Supervisor Inhibit. If the error is detected, the VMEGate 36 will present 02h initial status, disconnect from the channel, then write the data for a type 04h interrupt into the ICB and interrupt the SBC 40. If no error was detected, the VMEGate 36 will present initial status of 00h, transfer up to eleven bytes of data into the assign buffer. The VMEGate 36 tests an error condition that the drive is not operational or offline. If an error, the Unit Check bit is set. The error code is set to not ready/offline. The VMEGate tests an error condition that fewer than eleven bytes were transferred. If this error is detected, then the Unit Check bit is set and the error code is set to Command Reject. If either error is detected, then the VMEGate 36 will write the data for a type 04h interrupt into the ICB and interrupt the SBC 40. If no error condition is detected, the VMEGate 36 will write the data for a type 01h interrupt into the ICB and interrupt the SBC 40; ii) When the SBC 40 receives a type 04h interrupt, the SBC 40 will check the error code. If the error code is Supervisor Inhibit, the SBC 40 will update the sense byte buffer, write 0006h into the SBC status buffer, and issue the Interrupt Processed command. Otherwise the SBC 40 will write 0000h into the SBC status buffer, set the status byte to 0Eh, issue the Interrupt Processed command, and then update the sense byte buffer; iii) When the SBC 40 receives a type 01h interrupt, the SBC 40 will compare the first 11 bytes of the assign buffer to the path group ID buffer. If they are not identical, the SBC 40 will write 0000h into the SBC status buffer, set the status byte to 0Eh, issue the Interrupt Processed command, and then update the sense byte buffer. If they are identical, The SBC 40 will write 0000h into the SBC status buffer, set the status byte to 0Ch, and then issue the Interrupt Processed command; and iv) The VMEGate 36 will present to the channel the status associated with the Interrupt Processed command.

The BACK SPACE BLOCK, 27h, command invokes a sequence of events upon receipt as follows: i) The VMEGate tests for an error condition that the drive is not ready or offline. If an error is detected, the Unit Check bit is set and the error code is set to not ready/offline. If the error is detected, the VMEGate 36 will present 02h initial status, disconnect from the channel, and then write the data for a type 04h interrupt into the ICB and interrupt the SBC 40. If an error was not detected, the VMEGate 36 will present initial status of 08h, then write the data for a type 01h interrupt into the ICB and interrupt the SBC 40; ii) When the SBC 40 receives a type 04h interrupt, the SBC 40 will update the sense byte buffer, write 0006h into the SBC status buffer, then issue the Interrupt Processed command; iii) When the SBC 40 receives a type 01h interrupt, the SBC 40 will test to see if a SCSI Write to the optical drive is occurring. If it is, the SBC 40 will set up the SCSI Writes to flush the buffer, and set SYNCHRONIZE and DEVICE END PENDING. The SBC 40 then sets the SBC status buffer to 0004 and issues interrupt processed. When the SIHM write completes, the tape map entry pointers will be adjusted and Device End is presented through a Present Status command. If a SCSI Write is not occurring, the SBC 40 tests for SCSI Reads. If a SCSI Read is occurring, the SBC 40 sets ABORT and DEVICE END PENDING. When the SIHM write completes, the tape map entry pointers will be adjusted and Device End is presented. The SBC 40 then sets the SBC status buffer to 004 and issues interrupt processed. If neither a SCSI write or read is occurring, the SBC 40 subtracts one from the TM-Channel-ptr and the TM-SCSI-ptr, and test BOT or PHYS EOT, TM. If BOT or PHYS EOT is encountered prior to adjustment of tape map entry pointers, the SBC sets the channel status byte to 26h and updates the sense byte buffer. The SBC 40 will then write 0002h into the SBC status buffer and then issue the Interrupt Processed command. If a tape mark is encountered, the SBC 40 sets the channel status byte to 25h and sets the tape mark bit in the Drive Status Word. The SBC 40 will then write 0000h into the SBC status buffer and then issue the Interrupt Processed command. If neither BOT or PHYS EOT or tape mark is encountered, that is no error condition exists, the SBC 40 sets the channel status byte to 04h. The SBC 40 will write 0000h into the SBC status buffer and then issue the Interrupt Processed command; and iv) The VMEGate 36 will present to the channel the status associated with the Interrupt Processed command.

The BACKSPACE FILE, 2Fh, command invokes a sequence of events upon receipt as follows: i) The VMEGate 36 tests for an error condition that the drive is not ready or offline. If so, the VMEGate 36 sets the Unit Check bit and sets the error code to not ready/offline. If the error is detected, the VMEGate 36 will present 02h initial status, disconnect from the channel, then write the data for a type 04h interrupt into the ICB and interrupt the SBC 40. If the error is not detected, the VMEGate 36 will present initial status of 08h, set control unit busy, then write the data for a type 01h interrupt into the ICB and interrupt the SBC 40; ii) When the SBC 40 receives a type 04h interrupt, the SBC 40 will update the sense byte buffer, write 0006h into the SBC status buffer and then issue the Interrupt Processed command; iii) When the SBC 40 receives a type 01h interrupt, the SBC 40 will test to see if a Write to the optical drive is occurring. If it is, the SBC 40 will set up the SCSI Writes to flush the buffer and set SYNCHRONIZE and DEVICE END PENDING. The SBC 40 then sets the SBC status buffer to 0004 and issues interrupt processed. When the SIHM write completes, the tape map entry pointers will be adjusted and Device End is presented via a Present Status command. If a SCSI Write is not occurring, the SBC 40 tests for SCSI Reads. If a SCSI Read is occurring, the SBC 40 sets ABORT and DEVICE END PENDING. The SBC 40 then sets the SBC status buffer to 0004 and issues interrupt processed. When the SIHM write completes, the tape map entry pointers will be adjusted and Device End presented via a Present Status command. If the SCSI is not being written to or read from, the SBC 40 subtracts one from the TM-Channel-ptr and the TM-SCSI-ptr until they are pointing to a tape mark entry. Then the SBC tests for an error that BOT or PHYS EOT occurred prior to adjustment of tape map entry pointers. If so the SBC 40 sets the channel status byte to 26h and updates the sense byte buffer. The SBC 40 will then write 0002h into the SBC status buffer and then issue the Interrupt Processed command. If no error condition exists, the SBC sets the channel status byte to 04h. The SBC 40 will then write 0000h into the SBC status buffer and then issue the Interrupt Processed command; and iv) The VMEGate 36 will present to the channel the status associated with the Interrupt Processed command.

The CONTROL ACCESS, E3h command invokes a sequence of events upon receipt as follows: i) The VMEGate 36 tests for an error condition that the Supervisor Command Inhibit bit is set. If so, the VMEGate sets Unit Check bit and sets the error code to Supervisor Inhibit. If the error is detected, the VMEGate 36 will present 02h initial status, disconnect from the channel, then write the data for a type 04h interrupt into the ICB and interrupt the SBC 40. If the error was not detected, the VMEGate 36 will present initial status of 00h, transfer up to twelve bytes of data into the control access buffer. Then the VMEGate 36 tests for an error condition that fewer than twelve bytes were transferred. If this error was detected, the VMEGate 36 sets the Unit Check bit and sets the error code to Command Reject. The VMEGate 36 also tests for an error condition that byte zero is not 00h, 01h, 02h, 40h or 80h. If this error is detected, then the VMEGate 36 sets the Unit Check bit and sets the error code to Command Reject. The VMEGate 36 also tests for error condition that byte zero is 01h or 02h and byte one is not 01h or 02h and tests that bytes two and three are not 0200h. If this error is detected, the VMEGate 36 sets the Unit Check bit and sets the error code to Command Reject. The VMEGate 36 also tests for an error condition that byte zero is not 40h and bytes one through eleven are zero. If this error is detected, the VMEGate 36 sets the Unit Check bit and sets error code to Command Reject; ii) If an error condition is detected, the VMEGate 36 will write the data for a type 04h interrupt into the ICB and interrupt the SBC 40; iii) If no error condition is detected, the VMEGate 36 will write the data for a type 01h interrupt into the ICB and interrupt the SBC 40; iv) When the SBC 40 receives a type 04h interrupt, the SBC 40 will check the Error code. If the Error code is set to Supervisor Inhibit, the SBC 40 will update the sense byte buffer, write 0006h into the SBC status buffer, and issue the Interrupt Processed command. If the error code is not set to Supervisor Inhibit, the SBC 40 will write 0000h into the SBC status buffer, set the status byte to 0Eh, issue the Interrupt Processed command and then update the sense byte buffer; v) When the SBC 40 receives a type 01h interrupt, the SBC 40 will test to determine if byte zero is 40h or 80h, and if the control access buffer and password buffer are a not match. If they do not match, an error condition, then the SBC 40 will write 0000h into the SBC status buffer, set the channel status byte to 0Eh, issue the Interrupt Processed command and then update the sense byte buffer. If byte zero is 00h, an error condition, the SBC 40 transfers the contents of the control access buffer to the password buffer. If neither of these two error conditions exists, the SBC 40 will write 0000h into the SBC status buffer, set the status byte to 0Ch, and then issue the Interrupt Processed command; and vi) The VMEGate 36 will present to the channel the status associated with the Interrupt Processed command.

The DATA SECURITY ERASE, 97h, command invokes a sequence of events upon receipt as follows: i) The VMEGate 36 will present initial status of 08h and disconnect; ii) The VMEGate 36 tests for an error condition that the Data Security Erase was not chained from an Erase Gap command. If this error is detected, the VMEGate 36 sets Unit Check bit and sets the error code to Command Reject. If an error condition is detected, the VMEGate 36 will write the data for a type 04h interrupt into the ICB and interrupt the SBC 40. If no error condition is detected, the VMEGate 36 will write the data for a type 01h interrupt into the ICB and interrupt the SBC 40; iii) When the SBC 40 receives a type 04h interrupt, the SBC 40 will update the sense byte buffer, write 0002h into the SBC status buffer, set the channel status byte to 26h and then issue the Interrupt Processed command; iv) When the SBC 40 receives a type 01h interrupt, the SBC 40 will write FF through to the end of the Tape Map Buffer, set the PHYS EOT DB-flag-word, write 0000h into the SBC status buffer, set the channel status byte to 04h, and then issue the Interrupt Processed command; and v) The VMEGate 36 will present to the channel the status associated with the Interrupt Processed command.

The ERASE GAP, 17h, command invokes a sequence of events upon receipt as follows: i) The VMEGate 36 tests for an error condition that the drive is not ready or offline. If an error is detected, the VMEGate 36 sets Unit Check bit and sets the error code to not ready/offline. The VMEGate 36 also tests for an error condition that the drive is file protected. If this error is detected, the VMEGate 36 sets Unit Check bit and sets the error code to File Protected; ii) If one of these error conditions is detected, the VMEGate 36 will present 02h initial status, disconnect from the channel, and then write the data for a type 04h interrupt into the ICB and interrupt the SBC 40; iii) If no error condition is detected, the VMEGate 36 will present initial status of 08h and disconnect then interrupt the SBC 40 with interrupt type 01h; iv) When the SBC 40 receives a type 04h interrupt, the SBC 40 will update the sense byte buffer, write 0006h into the SBC status buffer and then issue the Interrupt Processed command. When the SBC 40 receives a type 01h interrupt, the SBC 40 will test to see if a Write to the optical drive is occurring. If it is, the SBC 40 will set up the SCSI Writes to flush the buffer, set SYNCHRONIZE. The SBC 40 then sets the SBC status buffer to 0004h and issues interrupt processed. When the SIHM write completes, the tape map entry pointers will be adjusted and Device End presented. If a SCSI Write is not occurring, the SBC 40 tests for SCSI Reads. If a SCSI Read is occurring, the SBC 40 sets ABORT. The SBC 40 then sets the SBC status buffer to 0004h and issues interrupt processed. When the SIHM write completes, the tape map entry pointers will be adjusted and Device End presented. If a SCSI write or read is not occurring, the SBC 40 writes 04h into the channel status byte, 0000h into the SBC status buffer and issues Interrupt Processed command to the VMEGate 36; and v) The VMEGate 36 will present to the channel the status associated with the Interrupt Processed command.

The FORWARD SPACE BLOCK, 37h, command invokes a sequence of events upon receipt as follows: i) The VMEGate 36 tests for an error condition that the drive is not ready or offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 08h, set control unit busy and then write the data for a type 01h interrupt into the ICB and interrupt the SBC 40; ii) When the SBC 40 receives a type 04h interrupt, the SBC 40 will update the sense byte buffer, write 0006h into the SBC status buffer and then issue the Interrupt Processed command; When the SBC 40 receives a type 01h interrupt, the SBC 40 will test to see if a Write to the optical drive is occurring. If it is, the SBC 40 will set up the SCSI Writes to flush the buffer and set SYNCHRONIZE. The SBC 40 then sets the SBC status buffer to 0004h and issues an interrupt Processed command. When the SIHM write completes, the tape map entry pointers will be adjusted and Device End with Unit Check is presented. If a SCSI Write is not occurring, the SBC 40 tests for SCSI Reads. If a SCSI Read is occurring, the SBC 40 sets ABORT. When the SIHM read completes, the tape map entry pointers will be adjusted and Device End is presented. The SBC 40 then sets the SBC status buffer to 0004 and issues an Interrupt Processed command. If a SCSI write or read is not occurring, the SBC 40 adds one to the TM-Channel-ptr and the TM-SCSI-ptr. The SBC 40 tests for an error condition that the PHYS EOT occurred after adjustment of tape map entry pointers. If an error condition is detected, the SBC 40 sets the channel status byte to 26h and updates the sense byte buffer. The SBC 40 will write 0002h into the SBC status buffer then issues the Interrupt Processed command. The SBC 40 tests for an error condition that a tape mark was encountered. If an error condition is detected, the SBC 40 sets the channel status byte to 25h and sets the tape mark bit in the Drive Status Word. The SBC 40 will write 0000h into the SBC status buffer and then issue the Interrupt Processed command. If neither of these two errors are detected, the SBC 40 sets the channel status byte to 04h. The SBC 40 will write 0000h into the SBC status buffer and then issue the Interrupt Processed command; and iv) The VMEGate 36 will present to the channel the status associated with the Interrupt Processed command.

The FORWARD SPACE FILE, 3Fh, command invokes a sequence of events upon receipt as follows: i) The VMEGate 36 tests for an error condition that the drive is not ready or offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 08h, set control unit busy and then write the data for a type 01h interrupt into the ICB and interrupt the SBC 40; ii) When the SBC 40 receives a type 04h interrupt, the SBC 40 will update the sense byte buffer, write 0006h into the SBC status buffer and then issue the Interrupt Processed command; iii) When the SBC 40 receives a type 01h interrupt, the SBC 40 will test to see if a Write to the optical drive is occurring. If it is, the SBC 40 will set up the SCSI Writes to flush the buffer and set SYNCHRONIZE. The SBC 40 then sets the SBC status buffer to 0004h and issues interrupt processed. When the SIHM write completes, the tape map entry pointers will be adjusted and Device End with Unit Check is presented. If a SCSI Write is not occurring, the SBC 40 tests for SCSI Reads. If a SCSI Read is occurring, the SBC 40 sets ABORT. The SBC 40 then sets the SBC status buffer to 0004h and issues interrupt processed. When the SIHM read completes, the tape map entry pointers will be adjusted and Device End is presented. If a SCSI write or read is not occurring, the SBC 40 adds one to the TM-Channel-ptr and the TM-SCSI-ptr until they are pointing to a tape mark entry. The SBC 40 tests for an error conditions that BOT or PHYS EOT occurred after adjustment of tape map entry pointers. If an error conditions exists, the SBC 40 sets the channel status byte to 26h and updates the sense byte buffer. The SBC 40 will write 0002h into the SBC status buffer and then issue the Interrupt Processed command. If this error condition does not exist, the SBC 40 sets the channel status byte to 04h. The SBC 40 will write 000h into the SBC status buffer and then issue the Interrupt Processed command; and iv) The VMEGate 36 will present to the channel the status associated with the Interrupt Processed command.

The LOAD DISPLAY, 9Fh, command invokes a sequence of events upon receipt as follows: i) The VMEGate 36 tests for an error condition that the Supervisor Command Inhibit bit is set. If an error is detected, the VMEGate 36 sets the Unit Check bit and sets the error code to Supervisor Inhibit. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 00h and transfer up to seventeen bytes of data into the load display buffer. The eighteenth byte is set to zero. The VMEGate 36 then tests the for an error condition that fewer than seventeen bytes were transferred. If an error is detected, the VMEGate 36 sets the Unit Check bit and sets the error code to Command Reject. If an error condition is detected, the VMEGate 36 will present ending status of 0Eh and write the data for a type 04h interrupt into the ICB and interrupt the SBC 40. If no error condition is detected, the VMEGate 36 will present 08h ending status, disconnect and then write the data for a type 01h interrupt into the ICB and interrupt the SBC 40 for action based on the format control byte; ii) When the SBC 40 receives a type 04h interrupt, the SBC 40 will update the sense byte buffer, write 0006h into the SBC status buffer, and then issue the Interrupt Processed command; iii) When the SBC 40 receives a type 01h interrupt, the SBC 40 will alter the value in the eighteenth byte of the load display buffer, write 0000h into the SBC status buffer, set the channel status byte to 04h and then issue the Interrupt Processed command; iv) The load display data is processed by the next call of the QIHM; and v) The VMEGate 36 will present to the channel the status associated with the Interrupt Processed command.

The LOCATE BLOCK, 4Fh, command invokes a sequence of events upon receipt as follows: i) The VMEGate 36 tests for an error condition that the drive is not ready or offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 00h, transfer up to four bytes of data into the locate block buffer and then test for an error condition. The error condition is that fewer than four bytes transferred. If an error is detected, the VMEGate 36 sets the Unit Check bit and sets the error code to Command Reject. If an error condition is detected, the VMEGate 36 will present ending status of 0Eh, write the data for a type 04h interrupt into the ICB and interrupt the SBC 40. If no error condition is detected, the VMEGate 36 will present 08h ending status, disconnect and then write the data for a type 01h interrupt into the ICB and interrupt the SBC 40; ii) When the SBC 40 receives a type 04h interrupt, the SBC 40 will update the Sense Byte buffer, write 0006h into the SBC status buffer and issue the Interrupt Processed command; iii) When the SBC 40 receives a type 01h interrupt, the SBC 40 will test to determine if a Write to the optical drive is occurring. If it is, the SBC 40 will set up the SCSI Writes to flush the buffer, and set SYNCHRONIZE. The SBC 40 then sets the SBC status buffer to 0004h and issues an Interrupt Processed command. When the SIHM write completes, the tape map entry pointers will be adjusted and then Device End is presented. If a SCSI Write is not occurring, the SBC 40 tests for SCSI Reads. If a SCSI Read is occurring, the SBC 40 sets ABORT. The SBC 40 then sets the SBC status buffer to 0004h and issues an Interrupt Processed command. When the SIHM write completes, the tape map entry pointers will be adjusted and then Device End is presented. If a SCSI write or read is not occurring, the SBC 40 will mask off the most significant byte of the four byte argument and then set the TM-Channel-ptr and TM-SCSI-ptr to the tape map base plus two, to skip the tape map identifier bytes and then adds the masked argument of the Locate Block CCW. In this way, the pointers will now point to the Located Block. The SBC then tests for an error condition that Prior Block Not Found and Argument Block Not Found. If an error is detected, the SBC sets the channel status byte to 26h and updates the sense byte buffer. The SBC 40 will then write 0002h into the SBC status buffer and then issue the Interrupt Processed command. The SBC also tests for an error conditions that Argument Block Not Found but Prior Block Found. If an error condition is detected, the SBC 40 sets the tape map entry pointers back one location and sets a flag indicating that the next command cannot be a READ CCW. The SBC 40 will then set the channel status byte to 04h. The SBC 40 will write 0000h into the SBC status buffer then issue the Interrupt Processed command. If neither of these two error conditions are detected, the SBC 40 will set the channel status byte to 04h. The SBC 40 will then write 0000h into the SBC status buffer and then issue the Interrupt Processed command; and iv) The VMEGate 36 will present to the channel the status associated with the Interrupt Processed command.

The MODE SET, DBh, command invokes a sequence of events upon receipt as follows: i) The VMEGate 36 tests for an error condition that the Supervisor Command Inhibit bit is set. If an error is detected, the VMEGate 36 sets the Unit Check bit and sets the error code to Supervisor Inhibit. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 00h and accept the Mode Set byte. The VMEGate 36 then tests for an error condition that bits zero, one and four to six of the Mode Set Byte are not zero. If an error is detected, the VMEGate 36 sets the Unit Check bit and sets the error code to Command Reject. If an error condition is detected, the VMEGate 36 will present ending status of 0Eh and then write the data for a type 04h interrupt into the ICB and interrupt the SBC 40. If no error condition is detected, the VMEGate 36 will present 08h ending status, disconnect, and note for future use the state of bits two and three of the argument. The VMEGate 36 then will interrupt the SBC 40 with a type 01h interrupt; ii) When the SBC 40 receives a type 04h interrupt, the SBC 40 will update the sense byte buffer, write 0006h into the SBC status buffer and issue the Interrupt Processed command; iii) When the SBC 40 receives a type 01h interrupt, the SBC 40 will write 04h into the channel status byte and write 0000h into the SBC status buffer and issue an Interrupt Processed command.

The NOP, 03h, command invokes a sequence of events upon receipt as follows: i) The VMEGate 36 tests for an error condition that drive is not ready or offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If the error is not detected, the VMEGate 36 will present initial status of 0Ch and disconnect; ii) When the SBC 40 is interrupted it will set up the sense data and place 0006h in the SBC status buffer and then issue an Interrupt Processed command. The following command codes are all handled as NOP commands: 23h, 2Bh, 33h, 3Bh, 53h, 63h, 6Bh, 73h, 7Bh, 93h, B3h, BBh, A3h, ABh, CBh, and D3h.

The READ, 02h, command invokes a sequence of events upon receipt as follows: i) The VMEGate 36 tests for an error condition that the drive is not ready or offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 00h. If an error is not detected, the VMEGate 36 is test current system state that the READ DATA VALID bit is set in the DB-flag-word. If this state is true, the VMEGate 36 will access system memory based on the buffer pointer and transfer the number of bytes specified in the Channel Block Length word or until the channel raises CMD OUT. Upon completion, the VMEGate 36 will interrupt the SBC 40 with a type 01h interrupt. The VMEGate 36 will test another current system state, that the READ DATA VALID bit is clear, for a Command Retry Condition, or a tape mark or EOT occurrence. If this condition is true, the VMEGate 36 sets the error code to Retry. The VMEGate 36 will then write the data for a type 04h interrupt into the ICB and interrupt the SBC 40; ii) When the SBC 40 receives a type 01h interrupt, it checks to determine if the segment just transferred is not part of a Long Record. If it is not or CMD OUT was raised, the SBC 40 writes 0Ch into the channel status byte and sets the SBC status buffer to 0000h and then issues an Interrupt Processed command. If the segment transferred was part of a Long Record and CMD OUT was not raised, the SBC 40 determines if the next segment is in memory. If it is, the SBC 40 sets up the DB-Channel-ptr, Channel-block-length and sets READ DATA VALID in the DB-flag-word. If the next segment is not in memory, READ DATA VALID is cleared and BUFFER PENDING is set in the VIH-flag-word. When the segment is available, the SBC 40 will issue a Buffer Ready command to the VMEGate 36 and the VMEGate 36 will continue the transfer; iii) When the SBC 40 receives a type 04h interrupt with not ready/offline set, the SBC 40 will update the sense byte buffer, write 0006h into the SBC status buffer and then issue the Interrupt Processed command. If the SBC 40 receives a type 04h interrupt with retry set, it will determine if a SCSI write is occurring. If it is, the SBC 40 will set the channel status byte to 4Ah, set the SBC status buffer to 0000h and then issue the Interrupt Processed command. The SBC 40 will then set SYNCHRONIZE and flush the data buffer to disk. When the SCSI write is complete, Device End will be presented, and the READ CCW retried. If the SCSI is not involved in a write, the SBC 40 will read at the TM-Channel-ptr contents. If the contents show END OF TAPE MAP, the SBC 40 will set to 0000h and then issue the Interrupt Processed command. The SBC 40 will then update the sense data to indicate Block ID Out Of Sequence. If the TM-Channel-ptr entry type is not END OF TAPE MAP, the SBC 40 determines if it is a Tape Mark. If it is, the SBC 40 will set the channel status byte to 0Dh and set the SBC status buffer to 0000h and then issue the interrupt processed command. If the TM-Channel-ptr entry type is a Normal Record, the SBC 40 sets the channel status byte to 4Ah, and then issues the Interrupt Processed command. The SBC 40 then sets up a SCSI Read based on the TM-Channel-ptr absolute address of the record entry, sets READING in the VIH-flag-word and sets DEVICE END PENDING in the DB-flag-word. When the SCSI Read is finished, the SBC 40 will set READ DATA VALID in the DB-flag-word and the presents Device End status.

The READ BACKWARD, 0Ch, command invokes a sequence of events upon receipt as follows: i) The VMEGate 36 tests for an error condition that the drive is not ready or offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 00h. The VMEGate 36 will then test if READ BKWD DATA VALID is set in the DB-flag-word. If set, the VMEGate 36 will access VME memory based on the buffer pointer and transfer the number of bytes specified in the data length word or until the channel raises CMD OUT. Data will be transferred out of memory backwards. Because of this, VME block transfer cannot be used. Upon completion, the VMEGate 36 will interrupt the SBC 40 with a type 01h interrupt. The VMEGate then tests for an error condition that READ BKWD DATA VALID is clear from a Command Retry Condition, or tape mark or BOT occurrence. If an error is detected, the VMEGate 36 sets the error code to Retry. The VMEGate 36 will then write the data for a type 04h interrupt into the ICB and interrupt the SBC 40; ii) When the SBC 40 receives a type 01h interrupt, it will determines if the record being transferred is not a Long Record, or if CMD OUT was raised. If either of these cases are true, the SBC 40 will write 0Ch into the channel status byte, 0000h into the SBC status buffer and issue the Interrupt Processed command. If the segment transferred was part of a Long Record and CMD OUT was not raised, the SBC 40 determines if the next segment is in memory. If it is, the SBC 40 sets up the DB-Channel-ptr and Channel-block-Length and sets READ BKWD DATA VALID in the DB-flag-word. If the next segment is not in memory, READ BKWD DATA VALID is cleared and BUFFER PENDING is set in the VIH-flag-word. When the segment is available, the SBC 40 will issue a Buffer Ready command to the VMEGate 36 and the VMEGate 36 will continue the transfer; iii) When the SBC 40 receives a type 04h interrupt with not ready/offline set, the SBC 40 will update the sense byte buffer, write 0006h into the SBC status buffer and then issue the Interrupt Processed command. If the SBC 40 receives a type 04h interrupt with retry set, it will determine if a SCSI write is occurring. If it is, the SBC 40 will set the channel status byte to 4Ah, set the SBC status buffer to 0000h and then issue the Interrupt Processed command. The SBC 40 will then set SYNCHRONIZE and flush the data buffer to disk. When the SCSI write is complete, Device End will be presented and the READ BACKWARD CCW is retried. If the SCSI is not involved in a write, the SBC 40 determine if the TM-Channel-ptr is at BOT. If it is, the SBC 40 will set the channel status byte to 0Eh, will set the SBC status buffer to 0000h and then issue the Interrupt Processed command. The SBC 40 will then update the sense data to indicate Backwards Motion at BOT. The SBC 40 will then decrement the TM-Channel-ptr. If the TM-Channel-ptr was not at BOT, the SBC 40 determines if the entry type is a tape mark. If it is, the SBC 40 will set the channel status byte to 0Dh, will set the SBC status buffer to 0000h and then issue the Interrupt Processed command. If the TM-Channel-ptr entry type is a Normal Record, the SBC 40 sets the channel status byte to 4Ah and then issues the Interrupt Processed command. The SBC 40 then sets up a SCSI Read based on the TM-Channel-ptr absolute address of the record entry, sets READING in the VIH-flag-word and sets DEVICE END PENDING in the DB-flag-word. When the SCSI Read is finished, the SBC 40 will set READ BKWD DATA VALID in the DB-flag-word and present status of Device End.

The READ BLOCK ID, 22h, command invokes a sequence of events upon receipt as follows: i) The VMEGate 36 will present initial status of 00h and write the data for a type 01h interrupt into the ICB and interrupt the SBC 40; ii) When the SBC 40 receives a type 01h interrupt, the SBC 40 will create the data for the block id buffer. The first four byte block will represent the TM-Channel-ptr position while the second four byte block is from the TM-SCSI-ptr. After creating the data, the SBC 40 will write 0004h into the SBC status buffer and then issue the Interrupt Processed command; iii) The VMEGate 36 will access the block id buffer and transfer eight bytes of data or until the channel raises CMD OUT; and iv) The VMEGate 36 will present 0Ch ending status.

The READ BUFFER, 12h, command invokes a sequence of events upon receipt as follows: i) The VMEGate 36 presents initial status of 00h and interrupts the SBC 40 with a type 01h interrupt; ii) When the SBC 40 receives a type 01h interrupt, it will determine if a SCSI write is occurring. If it is, the SBC 40 will set the channel status byte to 4Ah, will set the SBC status buffer to 0000h and then issue the Interrupt Processed command. The SBC 40 will then set SYNCHRONIZE and flush the data buffer to disk. When the SCSI write is complete, Device End will be presented, and the READ BUFFER CCW retried. If the SBC 40 was not performing a SCSI write when the type 01h interrupt occurred the SBC 40 will set the channel status byte to 0Ch, set the SBC status buffer to 0000h and then issue the Interrupt Processed command. The VMEGate 36 will present the status. No data will be transferred.

The READ BUFFERED LOG, 24h, command invokes a sequence of events are as follows: i) The VMEGate 36 will present initial status of 00h and write the data for a type 01h interrupt into the ICB and interrupt the SBC 40; ii) When the SBC 40 receives a type 01h interrupt, the SBC 40 will either validate or create the data for the READ BUFFERED LOG CCW, write 0006h into the SBC status buffer and then issue the Interrupt Processed command; iii) The VMEGate 36 will pass sense bytes zero through seven followed by format 21 sense bytes zero through twenty-three until the channel raises CMD OUT or all bytes are transferred; and iv) The VMEGate 36 will present 0Ch ending status.

The REWIND, 07h, command invokes a sequence of events as follows: i) The VMEGate 36 tests for an error condition that drive is not ready/offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If no error condition is detected, the VMEGate 36 will present initial status of 08h, disconnect and then write the data for a type 01h interrupt into the ICB and interrupt the SBC 40; ii) When the SBC 40 receives a type 04h interrupt, the SBC 40 will update the sense byte buffer, write 0006h into the SBC status buffer and then issue the Interrupt Processed command; iii) When the SBC 40 receives a type 01h interrupt, the SBC 40 will determine if a Write to the optical drive is occurring. If it is, the SBC 40 will set up the SCSI Writes to flush the buffer and set SYNCHRONIZE. The SBC 40 then sets the SBC status buffer to 0004h and issues the Interrupt Processed command. When the SIHM write completes, the tape map entry pointers will be adjusted and Device End is presented. If a SCSI Write is not occurring, the SBC 40 tests for SCSI Reads. If a SCSI Read is occurring, the SBC 40 sets ABORT. The SBC 40 then sets the SBC status buffer to 0004h and issues the Interrupt Processed command. When the SIHM write completes, the tape map entry pointers will be adjusted and Device End is presented. If a SCSI write or read is not occurring, the SBC 40 will set the DB-Channel-ptr and the DB-SCSI-ptr to the data buffer base. The SBC 40 will then set the TM-Channel-ptr and the TM-SCSI-ptr to the tape map base plus two, after which the SBC 40 will set BOT in the sense bytes. Finally, the SBC 40 will write 0000h into the SBC status buffer, set the channel status byte to 04h and then issue the Interrupt Processed command; and iv) The VMEGate 36 will present to the channel the status associated with the Interrupt Processed command.

The REWIND UNLOAD, 0Fh, command invokes a sequence of events upon receipt as follows: i) The VMEGate 36 tests for an error condition that the drive is not ready or offline. If an error is detected, the VMEGate 36 sets the Unit Check bit and sets the error code to not ready/offline. If the error is detected, the VMEGate 36 will present 02h initial status, disconnect from the channel and then write the data for a type 04h interrupt into the ICB and interrupt the SBC 40. If no error condition is detected, the VMEGate 36 will present initial status of 08h, disconnect and then write the data for a type 01h interrupt into the ICB and interrupt the SBC 40; ii) When the SBC 40 receives a type 04h interrupt, the SBC 40 will update the sense byte buffer, write 0006h into the SBC status buffer and then issue the Interrupt Processed command; iii) When the SBC 40 receives a type 01h interrupt, the SBC 40 will determine if a Write to the optical drive is occurring. If it is, the SBC 40 will set up the SCSI Writes to flush the buffer and set SYNCHRONIZE. The SBC 40 then sets the SBC status buffer to 0004h and issues the Interrupt Processed command. When the SIHM write completes, the tape map entry pointers will be adjusted and Device End is presented. If a SCSI Write is not occurring, the SBC 40 tests for SCSI Reads. If a SCSI Read is occurring, the SBC 40 sets ABORT. The SBC 40 then sets the SBC status buffer to 0004h and issues the Interrupt Processed command. When the SIHM write completes, the tape map entry pointers will be adjusted and Device End is presented. If a SCSI write or read is not occurring, the SBC 40 will set the DB-Channel-ptr and the DB-SCSI-ptr to the data buffer base. The SBC 40 will then set the TM-Channel-ptr and the TM-SCSI-ptr to the tape map base plus two, after which the SBC 40 will set BOT in the sense bytes. The SBC 40 will set the tape unloaded flag in the CAB; iv) The SBC 40 will then set the Intervention Required bit in the sense byte buffer and buffered log, set Buffered Log Data ERPA code to 2Bh, update the buffered log, write 0002h into the SBC status buffer, set the channel status byte to 26h and then issue the Interrupt Processed command; and v) The VMEGate 36 will present to the channel the status associated with the Interrupt Processed command.

The SENSE, 04h, command invokes a sequence of events upon receipt as follows i) The VMEGate 36 will present initial status of 00h; ii) If the VMEGate internal Sense Ready flag is set in response to the VMEGate interrupt, the VMEGate 36 will transfer the sense bytes zero through seven followed by either format 20 sense bytes or format 21 sense bytes depending on the value of sense byte seven. The VMEGate 36 will then present 0Ch ending status; iii) If the VMEGate internal Sense Ready flag is not set, the VMEGate 36 will test its internal Sense Pending flag. If it is set, the VMEGate 36 will test sense byte seven. If sense byte seven is equal to 20h, the VMEGate 36 will transfer the data as described above. If sense byte seven is not 20h, the VMEGate 36 will present status of Temporary Control Unit Busy. This will continue until sense byte seven becomes 20h; iv) If a SENSE CCW arrives and the VMEGate 36 has neither Sense Ready nor Sense Pending, the VMEGate 36 will set up a type 01h interrupt; v) If the SBC 40 receives a type 01 interrupt, it will either validate or create the data for the sense byte buffer or Buffered log data, write 0006h into the SBC status buffer and then issue the Interrupt Processed command. The VMEGate 36 will transfer the sense bytes and either format 20 sense bytes or format 21 sense bytes; and vi) The VMEGate 36 will present 0Ch ending status.

The SENSE ID, E4h, command invokes a sequence of events upon receipt as follows: i) The VMEGate 36 will present initial status of 00h; ii) The VMEGate 36 will access VME memory and transfer either the seven Drive Present bytes or the seven Drive Not Present bytes or until the channel raises CMD OUT; and iii) The VMEGate 36 will present 0Ch ending status.

The SENSE PATH GROUP ID, 34h, command invokes a sequence of events upon receipt as follows: i) The VMEGate 36 will present initial status of 00h. The VMEGate 36 tests for an error condition that the command was chained to the preceding command. If an error is detected, the VMEGate 36 sets the Unit Check bit and sets the error code to Command Reject. If an error condition is detected, the VMEGate 36 will write the data for a type 04h interrupt into the ICB and interrupt the SBC 40. If no error was detected, the VMEGate 36 will transfer the data from the set sense path group id buffer then present status of 0Ch. The SBC 40 will not be interrupted; ii) When the SBC 40 receives a type 04h interrupt, the SBC 40 will write 0000h into the SBC status buffer, set the channel status byte to 0Eh, issue the Interrupt Processed command and then update the sense byte buffer; and iii) The VMEGate 36 will present to the channel the status associated with the Interrupt Processed command.

The SET PATH GROUP ID, AFh, command invokes a sequence of events upon receipt as follows: i) The VMEGate 36 will present initial status of 00h, transfer up to twelve bytes of data into the set sense path group id buffer and then test an error conditions that the command was chained to the preceding command. If an error is detected, the VMEGate 36 sets the Unit Check bit and sets the error code to Command Reject. The VMEGate 36 also tests for an error condition that fewer than twelve bytes were transferred. If this error is detected, the VMEGate 36 sets the Unit Check bit and sets the error code to Command Reject. The VMEGate 36 also tests for an error condition that bit one is zero and bit one and two are both one of byte zero of the twelve bytes transferred. If an error is detected, the VMEGate 36 sets the Unit Check bit and sets error code to Command Reject. The VMEGate 36 also tests for an error condition that bytes one through eleven of the twelve bytes transferred are zero. If an error is detected, the VMEGate 36 sets the Unit Check bit and sets the error code to Command Reject. If an error condition is detected, the VMEGate 36 will write the data for a type 04h interrupt into the ICB and interrupt the SBC 40. If no error condition is detected, the VMEGate 36 will write the data for a type 01h interrupt into the ICB and interrupt the SBC 40; ii) When the SBC 40 receives a type 04h interrupt, the SBC 40 will write 0000h into the SBC status buffer, set the channel status byte to 0Eh, issue the Interrupt Processed command and then update the sense byte buffer; iii) When the SBC 40 receives a type 01h interrupt, the SBC 40 will set the appropriate bits in byte zero of the set sense path group id buffer, set the channel status byte to 0Ch, issue the Interrupt Processed command, then update the sense byte buffer; and iv) The VMEGate 36 will present to the channel the status associated with the Interrupt Processed command.

The SET TAPE WRITE IMMEDIATE, C3h, command invokes a sequence of events upon receipt as follows: i) The VMEGate 36 tests for an error condition that the drive is not ready or offline. If an error is detected, the VMEGate 36 sets the Unit Check bit. The error code is set to not ready/offline. If the error is detected, the VMEGate 36 will present 02h initial status, disconnect from the channel and then write the data for a type 04h interrupt into the ICB and interrupt the SBC 40. If no error condition is detected, the VMEGate 36 will present initial status of 08h, disconnect and then reconnect and present 04h ending status; ii) When the SBC 40 receives a type 04h interrupt, the SBC 40 will update the sense byte buffer, write 0006h into the SBC status buffer and then issue the Interrupt Processed command; iii) The VMEGate 36 will present to the channel the status associated with the Interrupt Processed command.

The SUSPEND MULTIPATH RECONNECTION, 5Bh, command invokes a sequence of events upon receipt as follows: i) The VMEGate 36 tests for an error condition that the Supervisor Command Inhibit bit is set. If an error is detected, the VMEGate 36 sets the Unit Check bit and sets the error code to Supervisor Inhibit. If the error is detected, the VMEGate 36 will present 02h initial status, disconnect from the channel and then write the data for a type 04h interrupt into the ICB and interrupt the SBC 40. If an error is not detected, the VMEGate 36 will present initial status of 08h and then reconnect and present 04h status; ii) If the SBC 40 receives a type 04h interrupt, the SBC 40 will update the sense byte buffer, write 0006h into the SBC status buffer and the issue the Interrupt Processed command.

The SYNCHRONIZE, 43h, command invokes a sequence of events upon receipt as follows: i) The VMEGate 36 tests for an error condition that the drive is not ready/offline. If an error is detected, the VMEGate 36 sets the Unit Check bit, The error code is set to not ready/offline. If the error is detected, the VMEGate 36 will present 02h initial status, disconnect from the channel and then write the data for a type 04h interrupt into the ICB and interrupt the SBC 40. If no error condition is detected, the VMEGate 36 will present initial status of 00h and then interrupt the SBC 40 with a type 01h interrupt; ii) When the SBC 40 receives a type 04h interrupt, the SBC 40 will write 0006h into the SBC status buffer, update the sense byte buffer and then issue the Interrupt Processed command; When the SBC 40 receives a type 01h interrupt, it will determine if the SCSI is writing data. If it is, the SBC 40 will set the channel status byte to 4A, set the SBC status buffer to 0000h set DEVICE END PENDING and then issue the Interrupt Processed command. The SBC 40 will then set the synch byte to SYNCHRONIZE, and set up the SCSI writes to flush the buffer. When the writes are finished, the SBC 40 will present 04h status. If SCSI writes are not occurring, the SBC 40 determines if SCSI reads are occurring. If they are, the SBC 40 will set the channel status byte to 4A, set the SBC status buffer to 0000h set DEVICE END PENDING and then issue the Interrupt Processed command. The SBC 40 will then set the synch byte to SYNCHRONIZE and set ABORT. When the SCSI read is complete, the SBC 40 will present 04 status. If a SCSI write or read is not occurring, the SBC 40 will set the channel status byte to 0Ch, set the SBC status buffer to 0000 and then issue the Interrupt Processed command; and iii) The VMEGate 36 will present to the channel the status associated with the Interrupt Processed command.

The UNASSIGN, C7h, command invokes a sequence of events upon receipt as follows: i) The VMEGate 36 tests for an error condition that Supervisor Command Inhibit bit is set. If an error is detected, the VMEGate 36 sets the Unit Check bit and sets the error code to Supervisor Inhibit. If the error is detected, the VMEGate 36 will present 02h initial status, disconnect from the channel and then write the data for a type 04h interrupt into the ICB and interrupt the SBC 40. If 02h initial status is not presented, the VMEGate 36 will present initial status of 00h and then transfer up to eleven bytes of data into the unassigned buffer. The VMEGate then tests for an error condition that fewer than eleven bytes were transferred. If an error is detected, the VMEGate 36 sets the Unit Check bit and sets the error code to Command Reject. If an error condition is detected, the VMEGate 36 will write the data for a type 04h interrupt into the ICB and interrupt the SBC 40. If no error was detected, the VMEGate 36 will present 0C ending status; ii) When the SBC 40 receives a type 04h interrupt, the SBC 40 will test the Unit Check bit. If set, the SBC 40 will update the sense byte buffer, write 0006h into the SBC status buffer and then issue the Interrupt Processed command. If the Unit Check bit is not set, the SBC 40 will write 0000h into the SBC status buffer, set the channel status byte to 0Eh, issue the Interrupt Processed command, and then update the sense byte buffer; iii) The VMEGate 36 will present to the channel the status associated with the Interrupt Processed command.

The WRITE, 01h, command invokes a sequence of events upon receipt as follows: i) The VMEGate 36 tests for an error condition that the drive is not ready/offline. If an error is detected, the VMEGate 36 sets the Unit Check bit. The error code is set to not ready/offline. The VMEGate 36 also test for an error condition that the drive is file protected. If this error is detected, the VMEGate 36 sets the Unit Check bit and sets the error code to File Protected. If either of these error conditions is detected, the VMEGate 36 will present 02h initial status, disconnect from the channel and then write the data for a type 04h interrupt into the ICB and interrupt the SBC 40. If an error is not detected, the VMEGate 36 will present initial status of 00h. The VMEGate then tests the current system state that the DB-flag-word has WRITE BUFFER READY set. If set, the VMEGate 36 will access VME memory based on the DB-Channel-ptr and transfer the number of bytes specified in the Channel-block-length or until the channel raises CMD OUT. If the Channel-block-Length is not the size of a complete buffer, two-hundred-and-fifty-six minus twenty eight, and more Channel Block Length bytes are transferred, the VMEGate 36 will set the error code to Retry and interrupt the SBC 40 with a type 04h interrupt. If less than Channel Block Length bytes are transferred, the VMEGate 36 will then write the data for a type 01h interrupt into the ICB and interrupt the SBC 40. If Tape Write Immediate mode is in effect, the VMEGate 36 will set the error code byte in the Interrupt Command Buffer to 01h. If a complete data buffer is filled, the VMEGate 36 writes the data for a type 01 interrupt into the ICB and interrupt the SBC 40. The VMEGate 36 also tests for an error condition that the current state is the Command Retry Condition by testing that the WRITE BUFFER READY bit is cleared. If an error is detected, the VMEGate 36 sets the error code to Retry. The VMEGate 36 will then write the data for a type 04h interrupt into the ICB and interrupt the SBC 40; ii) When the SBC 40 receives a type 04h interrupt with Unit Check bit set, the SBC 40 will update the sense byte buffer, write 0006h into the SBC status buffer and then issue the Interrupt Processed command; iii) If the SBC 40 receives a type 04h interrupt with the error code set to Retry, the SBC 40 will determine if a Physical End of Tape has been reached. If a Physical End of Tape has been reached, the SBC 40 will write 0000h into the SBC status buffer, set the channel status byte to 0Eh, issue the Interrupt Processed command and then update the sense byte buffer. If a Physical End of Tape has not been reached, the SBC 40 will determine if a SCSI Read is occurring. If one is, the SBC 40 will set the channel status byte to 4Ah, set the SBC status buffer to 0000h, set DEVICE END PENDING and issue the Interrupt Processed command. The SBC 40 will present Device End and set WRITE BUFFER READY when the Read or Write is complete. If no Read is occurring, the SBC 40 attempts to find an available data buffer. If it does, the SBC 40 will set the channel status byte to 4Eh, set WRITE BUFFER READY, set the SBC 40 status buffer to 0000h and then issue the Interrupt Processed command. If no data buffer is available, the SBC 40 will present 4A status as described for SCSI Read in the previous paragraph; iv) When the SBC 40 receives a type 01h interrupt, it determines if Long Record is set in the error code. If it is, the SBC 40 attempts to find an available data buffer. If successful, the SBC 40 sets WRITE BUFFER READY, DB-Channel-ptr and Channel-block-length, writes 0004h into the SBC status buffer and then issues the Interrupt Processed command to the VMEGate 36. If no data buffer is available, the SBC 40 clears WRITE BUFFER READY and sets BUFFER PENDING in the VIH-flag-word. When a data buffer is available, the SBC 40 will issue a Buffer Ready command to the VMEGate 36 and the transfer will continue. If LONG RECORD bit is not set when the SBC 40 receives a type 01h interrupt, the SBC 40 will determine if Logical EOT is set. If it is, the SBC 40 will write 0000h into the SBC status buffer, set the channel status byte to 08h and then issue the Interrupt Processed command. After issuing the Interrupt Processed command, the SBC 40 will set status to 25h and issue the Present Status Command. If Logical EOT is not set, the SBC 40 will set the channel status byte to 0Ch, set the SBC status buffer to 0000h and then issue the Interrupt Processed command; v) The VMEGate 36 will present to the channel the status associated with the Interrupt Processed command; vi) After issuing Interrupt Processed on a type 01h write, the SBC 40 will determine if there is room in the buffer for the next WRITE and set WRITE BUFFER READY accordingly; and vii) The SBC 40 will then update the tape map 340 with the new record, and set up the record for writing to disk 20.

The WRITE TAPE MARK, 1Fh, command invokes a sequence of events upon receipt as follows: i) The VMEGate 36 tests for an error condition that the drive is not ready or offline. If an error is detected, the VMEGate 36 sets the Unit Check bit and sets the error code to not ready/offline. The VMEGate 36 also tests for an error condition that the drive is file protected. If this error is detected, the VMEGate 36 sets the Unit Check bit and sets the error code to File Protected. If either of these error conditions is detected, the VMEGate 36 will present 02h initial status and disconnect from the channel. If an error is not detected, the VMEGate 36 will present initial status of 08h, disconnect and then write the data for a type 01h interrupt. If an error condition is detected, the VMEGate 36 will write the data for a type 04h interrupt into the ICB and interrupt the SBC 40; ii) When the SBC 40 receives a type 04h interrupt, the SBC 40 will update the sense byte buffer, write 0006h into the SBC status buffer and then issue the Interrupt Processed command; iii) When the SBC 40 receives a type 01h interrupt, the SBC 40 will determine if a Write to the optical drive is occurring. If it is, the SBC 40 will set up the SCSI Writes to flush the buffer and will set SYNCHRONIZE and DEVICE END PENDING. When the SIHM write completes, the tape map entry pointers will be adjusted and Device End is presented. The SBC 40 then sets the SBC status buffer to 0004h and issues the interrupt Processed command. If a SCSI Write is not occurring, the SBC 40 tests for SCSI Reads. If a SCSI Read is occurring, the SBC 40 sets ABORT and DEVICE END PENDING. When the SIHM read completes, the tape map entry pointers will be adjusted and Device End is presented. The SBC 40 then sets the SBC status buffer to 0004h and issues Interrupt Processed. If a SCSI write or read is not occurring, the Physical EOT condition is tested. If PHYS EOT has occurred, 26h is placed in the channel status byte, the sense data is updated, 0002h is written to the SBC status buffer and Interrupt Processed command is issued. If PHYS EOT has not occurred, the SBC 40 sets type identifier 350 to tape mark 05h, increments the TM-Channel-ptr and the TM-SCSI-ptr, then sets the next Map Data 348 entry to END OF TAPE MAP. The Cumulative Length is also incremented by a GAP OVERHEAD amount. The Logical EOT condition is tested. If Log EOT has occurred, the channel status byte is set to 25h. Otherwise, the channel status byte is set to 04h. In either case, the SBC status buffer is set to 0000h and the Interrupt Processed command is issued.

The TEST I/O, 00h, command invokes a sequence of events upon receipt as follows: i) The VMEGate 36 will present status of 0Ch plus any other pending status. Status of 0Eh will be presented if the drive is not ready and no status is stacked or pending. If 0Eh is presented, the SBC 40 will be interrupted by a type 04h interrupt.

We claim:

1. A system for recording a plurality of virtual magnetic tapes, each of which includes user records, on optical disk, said optical disk recording system comprising:

a record recording means for recording said user records of each of said plurality of virtual magnetic tapes on said optical disk, and for, at a later time, supplementally recording still further user records as represent any additions or alterations to any one or ones of the plurality of virtual magnetic tapes, a tape map recording means for recording on said optical disk a tape map respective of each one of the plurality of virtual magnetic tapes, each tape map including pointer data pointing to a location on said optical disk of the user records of an associated one of said plurality of virtual magnetic tapes, and each tape map being recorded on the optical disk separately from an associated one of said plurality of virtual magnetic tapes, and for, at a later time, supplementally recording a new tape map or maps respective of any one or ones of said plurality of virtual magnetic tapes as are, commensurate with the ability of the recording means to record further user records, updated, and means for recording upon the disc which individual one of possibly several historically sequential occurrences of each of the plurality of tape maps as correspond to each of the plurality of virtual magnetic tapes is newest, which newest tape maps will, in accordance with being supplementally recorded in accordance with all most recent revisions to the user records of a virtual magnetic tape, include pointer data to all most current revision user records of each virtual magnetic tape, wherein the user records of each and any of the plurality of virtual magnetic tapes are accessed during reading by reference to the pointer data of a newest associated tape map, wherein when a read reference proceeds through a newest tape map that is supplanting of, different than, and revised from a former tape map than such read reference is permissively to new user records that are supplanting of, and permissively different than and revised from, such User records as were accessed by the former tape map, wherein the virtual magnetic tapes are susceptible of being any of added, deleted or altered in whole or in part by (i) the supplemental recording by the record recording means of such further added or revised user records as prove pertinent, plus (ii) the supplemental recording by the tape map recording means of a new tape map that is referenceable during reading to access said added, deleted or altered virtual magnetic tape.

2. The optical disk recording system of claim 1 further comprising;

a disk identification recording means for recording disk identification data identifying said optical disk.

3. The optical disk recording system of claim 1 further comprising:

a tape directory recording means for recording tape directory data identifying each of said plurality of virtual magnetic tapes, the tape directory including tape map pointer data pointing to a tape map respective of an associated one of the plurality of virtual magnetic tapes.

4. A system for recording on an optical disk in an optical disk drive a plurality of magnetic tapes each having user records as a corresponding plurality of virtual magnetic tapes, said optical disk recording system comprising:

a record recording means for recording said user records of each of said plurality of virtual magnetic tapes, a tape map recording means for recording on said optical disk tape maps respective of each one of the plurality of virtual magnetic tapes, each tape map including pointer data pointing to a location on said optical disk of the user records of an associated one of said plurality of virtual magnetic tapes, and each tape map being recorded separately from an associated one of said plurality of virtual magnetic tapes, and a tape directory recording means for recording tape directory data., the tape directory data including tape map pointer data pointing to a tape map of a respective one of the plurality of virtual magnetic tapes, and virtual tape directory identification data recording means for recording data identifying each respective one of the plurality of virtual magnetic tapes, said virtual tape directory data being recorded separate from any of said user records.

5. The optical disk recording system of claim 4 wherein said tape directory recording means is recording a tape directory having respective tape data for each of said plurality of virtual magnetic tapes, each said respective tape data including, in addition to the pointer data pointing to a tape map of a respective one of the plurality of virtual magnetic tapes, write protect data indicating whether the respective one of the plurality of virtual magnetic tapes is write protected, pool type data indicating that the respective one of the plurality of virtual magnetic tapes is a one of a scratch virtual magnetic tape and a user virtual magnetic tape, tape length data specifying the length of the respective one of the plurality of virtual magnetic tapes, and volume serial number data for identifying the respective one of the plurality of virtual magnetic tapes.

6. The optical disk recording system of claim 4 wherein said optical disk has two sides each of which has a part of said user records, said tape maps and said tape directory, and wherein said tape directory recording means is recording tape directory data including pointer data pointing to a respective tape map of an associated one of said plurality of virtual magnetic tapes, and respective identification data for identifying said a respective one of said .plurality of virtual magnetic tapes.

7. The optical disk recording system of claim 4 wherein said record recording means is recording magnetic tape data including user records and tape marks separated by interblock gaps, and wherein said tape map recording means is recording tape map data including, in addition to the pointer data pointing to a tape map of a respective one of the plurality of virtual magnetic tapes, simulated tape mark data to indicate the presence of tape marks within a respective one of said plurality of virtual magnetic tapes, simulated interblock gap data to indicate the presence of interblock gaps within a respective one of said plurality of virtual magnetic tapes.

8. The optical disk recording system of claim 4 wherein each of said plurality of magnetic tapes has tape marks and user records, and wherein said tape map recording means is recording tape map data for each of said plurality of magnetic tapes having tape marks and user records, said tape map data including, in addition to the pointer data pointing to a tape map of a respective one of the plurality of virtual magnetic tapes, type data indicating whether the pointer data is to one of said tape marks or one of said user records, accumulated length data indicating an accumulative position within a respective one of said plurality of virtual magnetic tapes of said tape marks or said user records, and wherein the pointer data is pointing to said user record only when said type data so indicates.

9. The optical disk recording system of claim 4 wherein said optical disk is recorded with data in sectors, wherein each of said plurality of magnetic tapes has tape marks and user records, and wherein said tape map recording means is recording tape map data for each of said plurality of magnetic tapes having tape marks and said user records, said tape map data including type data serving to indicate one of said tape marks or one of said user records, accumulated length data serving to indicate an accumulated position within a respective one of said plurality of virtual magnetic tapes of said tape marks or said user records, wherein said pointer data serves to point to a beginning user record of all said user records of a respective one of said plurality of virtual magnetic tapes when said type data indicates one of said user records, said pointer data serving to point to one of said sectors on said optical disk in which is recorded the start of said user records of the respective one of said plurality of virtual magnetic tapes, block length data serving to indicate the length of said user record that is pointed to by said pointer data, and record offset data for said user record serving to indicate an offset from the beginning of said sector that is indicated by said pointer data to a location where a user record is first recorded within said sector.

10. The optical disk recording system of claim 4 wherein each of said plurality of magnetic tapes has tape marks and user records separated by interblock gaps, wherein said tape map recording means is recording respective tape map data for each of said tape marks and said user records, wherein said tape map data includes, in addition to the pointer data pointing to a tape map of a respective one of the plurality of virtual magnetic tapes, type data serving to indicate one of said tape marks or one of said user records, and accumulated length data serving to indicate an accumulative position within said virtual magnetic tape of said tape marks or said user records, said accumulated length data including the length of said user record when indicated by said type data, said accumulated length data serving to simulate said tape mark by including a predetermined tape mark length when indicated by said type data, said accumulated length data serving to simulate a respective one of said interblock gaps including a predetermined interblock gap length, wherein said pointer data serves to point to said user record when said type data indicates one of said user records.

11. The optical disk recording system of claim 4 wherein said magnetic tape has tape marks and user records separated by interblock gaps, wherein said tape map recording means is for recording tape map data for each of said tape marks and said user records, each of said tape map data including, in addition to the pointer data pointing to a tape map of a respective one of the plurality of virtual magnetic tapes, type data indicating one of said tape marks or one of said user records, accumulated length data indicating the accumulative position within said virtual magnetic tape of said tape marks or said user records, said accumulative length data including the length of said user record when indicated by said type data, said accumulative length data simulating said tape mark by including a predetermined tape mark length when indicated by said type data, said accumulative data simulating a respective one of said interblock gaps by including a predetermined interblock gap length, wherein said pointer data point a to said user record when said type data indicates said user record, and block length data indicating a size of said user record when said type data indicates said user record.

12. The optical disk recording system of claim 4 wherein said magnetic tape has tape marks and user records, wherein said tape map recording means is for recording respective tape map data for each of said tape marks and said user records, each of said tape map data including, in addition to the pointer data pointing to a tape map of a respective one of the plurality of virtual magnetic tapes, type data indicating one of said tape marks or one of said user records, block length data indicating a size of said user record when said type data indicates said user record, wherein the pointer data points to a sector in which the start of said user record is recorded when said type data indicates said user record, and record offset data pointing to said user record within said sector addressed by said pointer data, said user record being recorded across sector boundaries when said size of said user record exceeds a predetermined length of said sector minus said record offset data.

13. An optical disk recording system for recording, on an optical disk where data is recorded in sectors and that is insertable in an optical disk drive, a plurality of magnetic tapes each of which has user records as a corresponding plurality of virtual magnetic tapes, said optical disk recording system comprising:

a record recording means for recording user records of said plurality of magnetic tapes as a corresponding plurality of virtual magnetic tapes, a tape map recording means for recording a plurality of tape maps corresponding to said plurality of virtual magnetic tapes, each of said plurality of tape maps being recorded on said optical disk separate from, but pointing to, said user records of a respective one of said plurality of virtual magnetic tapes, and a tape directory recording means for recording a plurality of tape directories each having a plurality of sectors, etch tape directory containing both an outdated tape directory and also an updated tape directory data having at least pointer data and identification data pointing to an associated one of said plurality of tape maps and identifying an associated one of said plurality of virtual magnetic tapes, said outdated tape directory data being recorded in a first sector of said tape directory so as to firstly identify an associated one of said plurality of virtual magnetic tapes, said updated tape directory data recorded in a current sector of said tape directory to currently identify an associated one of said plurality of virtual magnetic tapes.

14. The optical disk recording system of claim 13 wherein said optical disk records data in sectors, said optical disk recording system further comprising:

an identification recording means for recording upon a plurality of said sectors what comes over time to be both outdated and updated disk identification data, said disk identification data serving to identify said optical disk wherein the optical disk is re-identified by recording updated identification data, said outdated identification data being recorded in a first sector of a multi-sector tape directory to firstly identify said optical disk, said updated identification data being recorded in a current sector of said multi-sector tape directory to currently identify said optical disk, said identification data forebearing to be recorded in a last one of a predetermined number of sectors of said multi-sector tape directory until and unless a sector between said first sector and said last predetermined number of sectors proves defective.

15. The optical disk recording system of claim 13 further comprising:

an identification recording means for recording disk identification data at a first predetermined sector, said plurality of tape directories being recorded by said tape directory recording means starting at a second predetermined sector, said tape directory containing a continuation pointer serving to point to a next available sector for recording.

16. The optical disk recording system of claim wherein said tape directory recording means is recording a plurality of directories of which directories has a predetermined plurality of sectors for recording said outdated and updated tape directory data, a first directory of said plurality of directories being recorded at a predetermined location, said first directory having a last sector serving to record pointer data pointing to a next directory, and also having a last sector serving to record pointer data pointing to a successive next directory, a of said plurality of directories, and a current directory of said plurality of directories having a current sector serving to record said updated tape directory data, said updated tape directory data forebearing to be recorded in a last predetermined number of sectors of each of said plurality of directories until and unless a sector between said first sector and said last one of a predetermined number of sectors is defective.

17. The optical disk recording system of claim 13 wherein said tape directory recording means is further for recording a plurality of directories each of which has a predetermined plurality of sectors serving to record said outdated and said updated tape directory data, a first directory of said plurality of directories being recorded at a predetermined location, said first directory having a last sector serving to record pointer data pointing to a next directory and also having a last sector serving to record pointer data pointing to a successive next directory of said plurality of directories, said plurality of directories also including a current directory having a current sector serving to record said updated tape directory data, wherein re-recording of said tape directory in a predetermined number of last sectors of each of said directories is foregone until and unless a sector between said first sector and said last predetermined number of sectors is defective, wherein said outdated tape directory data and said updated tape directory each contain a continuation pointer serving to point to a next available sector for separately recording said user records, said tape maps and said next directory, and also wherein the identification recording means serves to record disk identification data at a first predetermined location recorded separately from said first directory.

18. A method for identifying a selected one of a plurality of virtual magnetic tapes recorded on an optical disk that is recording data in sectors and that is insertable in an optical disk drive in a system that includes at least a computer with a memory, said optical disk having directories of virtual magnetic tapes recorded in one or more sectors of a plurality of directories each of which directories spans a plurality sectors, said directories of virtual magnetic tapes identifying all said plurality of virtual magnetic tapes, said method comprising the steps of first searching the optical disk by reading in sequence said directories and then the sectors of each successive directory until a lowest unrecorded sector in a lowest directory is detected, then causing said reading to back up one sector from the lowest detected unrecorded sector, then reading the directory of virtual magnetic tapes recorded in this next-to-lowest sector into said memory, and then second searching the directory of virtual magnetic tapes in said memory to currently identify a selected one virtual magnetic tape.

19. The method of claim 18 wherein said method further comprises after the reading the steps of updating said directory of virtual magnetic tapes in said memory by deleting data of a one of said one or ones of said plurality of virtual magnetic tapes, or by adding data of another one or ones of said plurality of virtual magnetic tapes, or by both adding and deleting data, and writing said updated tape directory in said lowest unrecorded sector of said lowest directory.

20. The method of claim 18 wherein said tape directory data further includes pointer data pointing to a next directory, said method further comprising, after the reading, the steps of recording pointer data in a last sector of said lowest directory, said pointer data pointing to a next, next-to-lowest, directory, and wherein said reading further comprises determining if said next-to-lowest sector stores pointer data, and IF said next-to-lowest sector stores pointer data THEN searching in sequence said next directory for a first unrecorded sector therein ELSE IF said next-to-lowest sector does not store pointer data THEN reading tape directory data into memory.

21. The method of claim 18 wherein said optical disk has an identification band having a plurality of sectors, the identification band serving to record disk identification data, said optical disk being re-identified by recording updated identification data in successive ones of the sectors of said identification band, said method further comprising the step of searching by reading in sequence the plurality of sectors of said identification band until a first unrecorded sector is detected, then causing said reading to back up one sector so as to read identification data recorded in that sector into said memory, then updating said identification data in said memory with updated identification data, and then recording said updated identification data in said first unrecorded sector.

22. A method of writing a plurality of virtual magnetic tapes on an optical disk in an optical disk drive in and by a system that receives magnetic tape data including user records, said system having at least a computer and memory for writing the plurality of virtual magnetic tapes, said method comprising the steps of organizing said user records of said magnetic tape data into a plurality of virtual magnetic tape user records, writing said plurality of virtual magnetic tape user records on said optical disk, generating a corresponding plurality of tape maps for said plurality of virtual magnetic tapes, said plurality of tape maps having pointers respectively pointing to each said plurality of virtual magnetic tape user records, and writing said plurality of tape maps on said optical disk separate from and after, the writing of said plurality of virtual magnetic tape user records.

23. The method of claim 22 wherein said step of generating said plurality of tape maps comprises the sub-steps of generating block type indicators for indicating respective tape marks or respective ones of said plurality of virtual magnetic tape user records, generating said respective record pointers pointing to respective ones of said plurality of virtual magnetic tape user records, and generating block length indicators indicating the length of respective ones of said plurality of virtual magnetic tape user records.

24. The method of claim 22 wherein said method further comprises the steps of generating a plurality of tape map pointers respectively pointing to respective ones of said plurality of tape maps, and writing said plurality of tape map pointers on said optical disk separate from, and after, writing said at plurality of tape maps.

25. The method of claim 22 wherein said method further comprises the steps of, generating a plurality of tape map pointers respectively pointing to said plurality of tape maps corresponding to said plurality of virtual magnetic tapes, generating a continuation pointer serving to point to an available address space on said optical disk, writing said tape map pointers on said optical disk separate from, and after, writing said plurality of tape maps, and writing said continuation pointer on said optical disk separate from and after, writing said plurality of tape maps, said written continuation pointer serving to point to an available address space on said optical disk.

26. The method of claim 22 wherein said optical disk records data in sectors and wherein said step of generating a plurality of tape maps comprises the substeps of generating block type indicators indicating respective tape marks or respective ones of said virtual magnetic tape user records, generating said record pointers having at least respective sector addresses and respective sector offsets pointing to said respective virtual magnetic tape user records when said block type indicators indicate said respective virtual magnetic tape user records, and generating block length indicators indicating the length of said respective virtual magnetic tape user records, said block length indicators, said sector addresses and said sector offsets for writing said respective virtual magnetic user records across one or more sector boundaries.

27. A method for reading a plurality of magnetic tapes recorded on a single optical disk in an optical disk drive by, and by use of, a pre-existing computer system for reading magnetic tape data from magnetic tapes having user records, the user records that are read from the optical disk being recorded on said optical disk as a plurality of virtual magnetic tapes each of which has virtual magnetic tape user records, said optical disk recording tape map data for said plurality of virtual magnetic tapes, said tape map data including pointers respectively pointing to said virtual magnetic tape user records of said plurality of virtual magnetic tapes, said tape map data being recorded on said optical disk separate from said virtual magnetic tape user records, said method comprising the steps of reading into said memory said tape map data, selecting from tape map data at least one of said record pointers serving to point to at least one of said virtual magnetic tape user records, and reading into said memory said at least one virtual magnetic tape user record.

28. The method of claim 27 wherein said tape map data includes a tape map for each of said plurality of virtual magnetic tapes, each of said tape maps as are associated with each of said plurality of virtual magnetic tapes including a plurality of record pointers respectively pointing to said virtual magnetic tape user records f an associated one of said plurality of virtual magnetic tapes, and wherein said step for generating optical disk drive commands to read into said memory said tape map data further comprises the sub-step of reading into said memory at least one tape map for accessing said user records of a respective one of said plurality of virtual magnetic tapes.

29. The method of claim 27 wherein said tape map data includes at least one tape map for each of said plurality of virtual magnetic tapes, each of said at least one tape map including a plurality of record pointers respectively pointing to said virtual magnetic tape user records, wherein said optical disk records a tape directory pointing to said at least one tape map, and wherein said method further comprises the steps of reading into said memory said tape directory, and selecting from said tape directory said at least one tape map as corresponds to at least one of said plurality of virtual magnetic tapes.

30. A method of maintaining a plurality of virtual magnetic tapes on a plurality of optical disks recorded in optical disk drives in a system that serves to emulate a magnetic tape subsystem that controls magnetic tape drives to read or writing magnetic tape user records and that is connected through a channel to a host computer transmitting channel commands within channel data formats, said system including a computer with memory for communicating through said channel commands within channel data formats, said magnetic tape user records being recorded on optical disks as the plurality of virtual magnetic tapes, each of said optical disks recording a plurality of tape maps each respectively for a corresponding one virtual magnetic tape, each tape map serving to point to respective virtual magnetic tape user records that are recorded separate from the tape map, said method comprising the steps of receiving one or more channel commands through said channel directing the accessing of magnetic tape user records on a one of the plurality of magnetic tapes, and reading said plurality of tape maps in order so as to determine a respective one of said plurality of virtual magnetic tapes in which is recorded said magnetic tape user records.

31. A method of claim 30 wherein each optical disk of said plurality of optical disks further records a plurality of tape directories one of which directories is a current directory that is a last recorded one of said tape directories, each of said plurality of tape directories having tape map pointers serving to point to a tape map and a continuation pointer serving to point to an available address on said optical disk, said method further comprising the steps of reading a current directory into said memory, determining from said current directory an address on said optical disk which address is a location of one tape map of said plurality of tape maps, determining from said current directory an available address, receiving a write command through said channel requesting the writing of at least one user record within said magnetic tape, receiving said at least one user record through said channel, storing said at least one user record in said memory, writing said at least one user record on said optical disk at said available address, updating said one tape map in said memory updated to point to the location of said at least one user record written on said optical disk, writing said updated tape map on said optical disk, updating said current tape directory in said memory with another one of said tape map pointers to point to the location of said updated tape map written on said optical disk, updating said updated tape directory with another available address, and writing said updated tape directory as said current tape directory.

32. The method of claim 31 wherein each optical disk of said plurality of optical disks records on each side a tape directory having tape map pointers pointing to said at least one tape map recorded on a respective optical disk side each recording at least one of said plurality of virtual magnetic tapes, said tape directory listing said respectively recorded virtual magnetic tapes, wherein each optical disk side of said optical disk has a disk identification identifying said optical disk and said optical disk side, said system storing cross reference data cross referencing optical disk sides to virtual magnetic tapes, said method further comprising the steps of reading said disk identification, and updating said cross reference in said memory to cross reference said optical disk side and said respective at least one virtual magnetic tape.

33. The method of claim 30, wherein said method further comprises the steps of receiving a write command through said channel requesting the writing of at least one user record within said magnetic tape, receiving said at least one user record through said channel, storing at least one user record in said memory, generating optical disk drive commands to write said at least one user record on said optical disk, updating in said memory said one tape map to point to the location of said at least one user record written on said optical disk, and writing said one tape map on said optical disk.

34. The method of claim 30 wherein said at least one tape map comprises map data having at least respective record pointers, record lengths and record offsets for said virtual magnetic tape user records recorded across sector boundaries on said optical disk, wherein said optical disks each further record a tape directory having at least tape map pointers pointing to respective said at least one tape map, said method further comprising the steps of reading said tape directory on said optical disk into said memory, receiving a read command through said channel requesting the reading of said a one of said plurality of magnetic tape user records within said magnetic tape, determining an address from said tape map data on said optical disk of a location of a one of said virtual magnetic tape user records as is requested by said read command, reading said the one of said plurality of virtual magnetic tape user records recorded on said optical disk that was requested by said read command, storing said read one virtual magnetic tape user record that was read from said optical disk drive into said memory, and transmitting through said channel said read virtual magnetic tape user record from said memory, said at read virtual magnetic tape user record being formatted during transmission as a magnetic tape user record.

35. The method of claim 30 wherein said optical disks each further record at least one tape directory one of which is a current directory being the last recorded one of said plurality of tape directories, said plurality of directories being recorded in a predetermined band of sectors, each said plurality of tape directories containing tape map pointers serving to point to a respective one of the plurality of tape maps and a continuation pointer serving to point to an available address on said optical disk, said method further comprising the steps of reading into said memory sequential sectors of said predetermined band of sectors, determining a last recorded sector in said predetermined bands of sectors, reading into said memory said last recorded sector containing said current directory, and determining from said current directory an address on said optical disk of the location of a one of said plurality of tape maps.

36. The method of claim 30 wherein said system stores a cross reference between sides of said optical disks and said at least one virtual magnetic tape, wherein said optical disk sides record a tape directory identifying said at least one virtual magnetic tape recorded on said respective optical disk side, and wherein each of said optical disk sides has a disk identification, said disk identification being recorded in a sector before a first available sector in a predetermined band of sectors on said optical disk side, said method further comprising the steps of reading said disk identification into said memory by searching said predetermined band of sectors for a last recorded sector on one of said optical disk sides, determining from said disk identification and from said cross reference that said optical disk side is referenced to one of said plurality of virtual magnetic tape, reading said tape directory into said memory, and determining that said tape directory identifies a one of said plurality of virtual magnetic tapes.

37. A method, performed on an optical disc that may be written but once in each area thereof, of recording a plurality of virtual magnetic tapes each of which virtual magnetic tapes includes user records, and of re-recording revised ones of the virtual magnetic tapes particularly as are so revised by incorporation of new and updated user records, so that each of the user records of each of the virtual magnetic tapes may be addressably accessed in its most currently revised form as if it were a record upon a magnetic tape, the method of recording and re-recording virtual magnetic tapes on an optical disc comprising:

first recording on the optical disc, all in a first area and each at an addressable location, the user records of each of the virtual magnetic tapes, and, at later times, still further user records as represent any additions or alterations to any one or ones of the virtual magnetic tapes; and, at the conclusion of each recording of the user records of one or more virtual magnetic tapes, second recording on the optical disc, at an addressable location of a second area thereof that is separate from the first area, tape maps, each of which tape maps is individually uniquely associated with a corresponding one of the virtual magnetic tapes, each of which tape maps includes pointer data pointing to the addressable locations on said optical disc of all the most current user records of an associated one of the virtual magnetic tapes; and also at the conclusion of each recording of the user records, third recording upon the disc, at a dedicated area thereof that is separate from the first area, a tape directory, which tape directory contains pointers to the addresses of the newest and most current tape map for each and every virtual magnetic tape, which newest tape map for each and any particular virtual magnetic tape will contain pointer data pointing to the addressable locations on the optical disc of all the most current revisions of all the user records of that particular virtual magnetic tape;

wherein each and any particular sought-after one of the user records on each and any particular sought-after one of the virtual magnetic tapes may be addressably accessed in its most currently revised form just as if it were a record upon a magnetic tape by reading tape directories to find a most current one such tape directory, and then, by reading a pointer for to the tape map of a particular sought-after virtual magnetic tape that is contained in this newest tape directory, reading the most current tape map for this particular sought-after virtual magnetic tape, and then, by reference to the pointers to the newest user records that are contained in this newest tape map, reading the particular sought-after one of the user records.

38. A method of addressably recording and re-recording on an optical disc a multiplicity of user records that are contained in plurality of virtual magnetic tapes, the optical disc recording and re-recording method comprising:

recording and re-recording at first times any of the user records, and any selectively updated ones of the user records, of each of the plurality of virtual magnetic tapes, this recording and re-recording serving to record all the user records and all the selectively updated user records each in its own particular addressable location in a first area on the optical disc; and then, at a time subsequent to the each of recording or re-recording of the records at the first times, recording and re-recording at second times after the first times, tape maps, and successor tape maps, each in a second area, separate from the first area, on the optical disk, each tape map being associated with a corresponding one virtual magnetic tape, each tape map including pointer data pointing to addresses on the optical disc of each most-recently recorded one of all the user records of the associated one virtual magnetic tapes;

wherein each successor, newer, tape map as is associated with a one virtual magnetic tape supersedes and renders obsolete when written the immediately earlier and older tape map as was previously associated with the same one virtual magnetic tape;

wherein each successor, newer, tape map, includes, by virtue of being generated at a second time subsequent to the occasion of a previous recording or re-recording of user records at a first time, pointer data pointing to at least one most newly recorded user record of a virtual magnetic tape, but may also contain pointer data pointing to user records of the same virtual magnetic tape that were not immediately just recorded or rerecorded in the immediately preceding first time;

wherein a recording surface of the disc is conserved because, although only changed and selectively updated user records are rewritten, all the most current user records of any particular one virtual magnetic tape may be addressably accessed through a single newest tape map associated with that particular one virtual magnetic tape.

39. A method of recording on an optical disc a plurality of magnetic tapes each having user records, the optical disc recording method comprising:

first recording in a first area of the optical disc the user records of each of the plurality of virtual magnetic tapes; then second recording in a second area, separate from he first area, of the optical disc tape maps respective of each one of the plurality of virtual magnetic tapes, each tape map including pointer data serving to point to a location on said optical disc of the user records of an associated one of said plurality of virtual magnetic tapes; and then third recording, in an area of the optical disc separate from the first area, tape directory data, the tape directory data including tape map pointer data serving to point to a tape map of a respective one of the plurality of virtual magnetic tapes.

40. The optical disc recording method according to claim 39 that, after the third recording, further comprises:

fourth recording, in an area of the optical disc separate from the first area, virtual tape directory identification data, the virtual tape identification data serving to identify each respective one of the plurality of virtual magnetic tapes.

41. A method of recording on an optical disc a plurality of magnetic tapes, each of which magnetic tapes includes user records, as a plurality of virtual magnetic tapes, said method of recording the user records of magnetic tapes as virtual magnetic tapes on optical disc comprising:

first recording user records of a plurality of magnetic tapes on the optical disc at a first area thereof as addressable records corresponding to a plurality of virtual magnetic tapes;

second recording, in a second area of the optical disc separate from the first area, a plurality of tape maps corresponding to the plurality of virtual magnetic tapes, each of which plurality of tape maps points to all the user records of a respective one of the plurality of virtual magnetic tapes;

repeating the first recording and the second recording as is required to do any of add, change and delete user records, and add, change or delete virtual magnetic tapes; while after each iteration of the first and the second recording third recording in a dedicated area of the optical disc a tape directory having at least pointer data pointing to the most recent one of each of the plurality of tape maps as is associated with each of the plurality of virtual magnetic tapes, the dedicated area of the optical disc ultimately coming to containing outdated tape directories and also a most currently updated tape directory, said outdated tape directories being identifiable from the most currently updated one tape directory because all tape directories are recorded seriatim in the dedicated area, and a last one such recorded, which is necessarily presently last in the dedicated area, is the most currently updated one tape directory;

wherein the most currently updated one tape directory contains pointers to the most current tape map as is associated with each of the plurality of virtual magnetic tapes, and each most current tape map, in turn, contains pointers to all the most current ones of all the user records that are upon the associated virtual magnetic tape.

* * * * *